United States Patent
Goetz et al.

(10) Patent No.: US 11,312,908 B2
(45) Date of Patent: Apr. 26, 2022

(54) LIQUID CRYSTAL MEDIUM AND LIQUID CRYSTAL DISPLAY

(71) Applicant: Merck Patent GmbH, Darmstadt (DE)

(72) Inventors: Achim Goetz, Seoul (KR); Hee-Kyu Lee, Pyeongtaek (KR); Mark Goebel, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/405,423

(22) PCT Filed: May 21, 2013

(86) PCT No.: PCT/EP2013/001497
§ 371 (c)(1),
(2) Date: Dec. 4, 2014

(87) PCT Pub. No.: WO2013/182271
PCT Pub. Date: Dec. 12, 2013

(65) Prior Publication Data
US 2015/0184077 A1 Jul. 2, 2015

(30) Foreign Application Priority Data
Jun. 5, 2012 (EP) .................... 12004293

(51) Int. Cl.
| C09K 19/54 | (2006.01) |
| C09K 19/20 | (2006.01) |
| C09K 19/30 | (2006.01) |
| C09K 19/34 | (2006.01) |
| C09K 19/04 | (2006.01) |

(52) U.S. Cl.
CPC ............ *C09K 19/54* (2013.01); *C09K 19/20* (2013.01); *C09K 19/3001* (2013.01); *C09K 19/3098* (2013.01); *C09K 19/3402* (2013.01); *C09K 19/3444* (2013.01); *C09K 19/3458* (2013.01); *C09K 19/3483* (2013.01); *C09K 2019/0459* (2013.01); *C09K 2019/0466* (2013.01); *C09K 2019/3422* (2013.01)

(58) Field of Classification Search
CPC . C09K 19/54; C09K 19/20; C09K 2019/0466
See application file for complete search history.

(56) References Cited

U.S. PATENT DOCUMENTS

| 4,400,293 A | 8/1983 | Romer | |
| 6,315,922 B1* | 11/2001 | Takeshita | C09K 19/42 252/299.61 |
| 7,524,540 B2 | 4/2009 | Saito et al. | |
| 7,714,977 B2 | 5/2010 | Hotaka et al. | |
| 2002/0182345 A1* | 12/2002 | Ichinose | C09K 19/44 428/1.1 |
| 2006/0061699 A1* | 3/2006 | Kirsch | C09K 19/3402 349/24 |
| 2007/0104895 A1 | 5/2007 | Hotaka et al. | |
| 2007/0108411 A1* | 5/2007 | Saito | C09K 19/3458 252/299.61 |
| 2009/0230355 A1* | 9/2009 | Czanta | C09K 19/20 252/299.61 |

(Continued)

FOREIGN PATENT DOCUMENTS

| CN | 1973325 A | 5/2007 |
| CN | 101622577 A | 1/2010 |

(Continued)

OTHER PUBLICATIONS

English Translation of JP60067587.*
English translation of JP6067587. (Year: 1985).*
International Search Report dated Aug. 29, 2013 issued in corresponding PCT/EP2013/001497 application (pp. 1-2).
Chinese Office Action dated Nov. 2, 2015 issued in corresponding CN 201380029208.X application (pp. 1-7).
Chinese Examination Procedure dated Sep. 8, 2016 issued in corresponding CN 201380029208 application (8 pages).
English Abstract of CN 101622577 A published Jan. 6, 2010.

(Continued)

Primary Examiner — Chanceity N Robinson
Assistant Examiner — Anna Malloy
(74) Attorney, Agent, or Firm — Millen White Zelano and Branigan, PC; Richard Traverso

(57) ABSTRACT

Dielectrically positive liquid-crystalline media comprising a compound of the formula TINUVIN 770 and optionally one or more compounds of formula I,

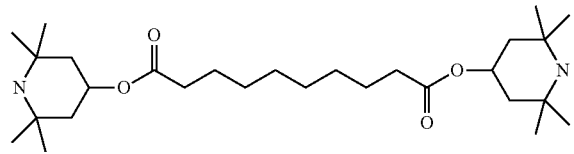

TINUVIN 770

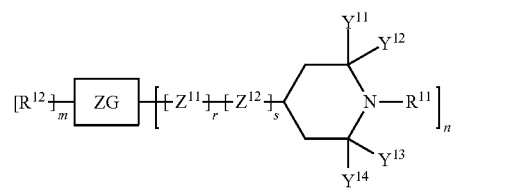

in which the parameters have the respective meanings indicated in the specification, and optionally one or more further dielectrically positive compounds and optionally one or more further dielectrically neutral compounds, and to liquid-crystal displays, especially active-matrix displays and in particular TN, IPS and FFS displays, containing these media.

20 Claims, No Drawings

(56) References Cited

U.S. PATENT DOCUMENTS

| | | | | |
|---|---|---|---|---|
| 2011/0001089 A1* | 1/2011 | Wittek | ............... | C09K 19/42 |
| | | | | 252/299.61 |
| 2011/0095229 A1* | 4/2011 | Lee | .................. | C09K 19/12 |
| | | | | 252/299.61 |
| 2011/0180756 A1 | 7/2011 | Goto | | |
| 2011/0301360 A1 | 12/2011 | Lietzau | | |
| 2013/0148069 A1 | 6/2013 | Archetti et al. | | |

FOREIGN PATENT DOCUMENTS

| | | |
|---|---|---|
| DE | 102011108276 A1 | 2/2012 |
| DE | 102010049441 A1 | 4/2012 |
| EP | 1768117 A1 | 3/2007 |
| EP | 1785466 A1 | 5/2007 |
| JP | 60067587 A * | 4/1985 |
| WO | 2011-107218 A1 | 9/2011 |

OTHER PUBLICATIONS

Taiwan Search Report dated Nov. 25, 2016 issued in corresponding TW 102119837 application (5 pages).
English Abstract of CN 1973325 A published May 30, 2007.
Japanese Examination Report for corresponding Japanese Application No. 2015-515409; dated May 31, 2017.
Machine Translation of Japanese Application No. JP60067587; published Apr. 17, 1985.
Form 892 in corresponding U.S. Appl. No. 15/891,029 dated Oct. 13, 2020 (1 page).
Form 892 in corresponding U.S. Appl. No. 15/891,029 dated Feb. 28, 2022 (1 page).

* cited by examiner

LIQUID CRYSTAL MEDIUM AND LIQUID CRYSTAL DISPLAY

FIELD OF THE INVENTION

The present invention relates to liquid-crystalline media and to liquid-crystal displays containing these media, especially to displays addressed by an active matrix and in particular to displays of the twisted nematic (TN), in-plane switching (IPS) or fringe-field switching (FFS) type.

STATE OF THE ART AND PROBLEM TO BE SOLVED

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is substantially perpendicular to the substrates or the liquid-crystal layer. Besides these modes, there are also electro-optical modes that utilise an electric field which is substantially parallel to the substrates or the liquid-crystal layer, such as, for example, the in-plane switching (IPS) mode (as disclosed, for example, in DE 40 00 451 and EP 0 588 568) and the fringe-field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desktop monitors and are intended for use in displays for TV sets and multimedia applications. The liquid crystals in accordance with the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

For these displays, novel liquid-crystalline media having improved properties are required. The addressing times in particular have to be improved for many types of application. Thus, liquid-crystalline media having lower viscosities ($\eta$), especially having lower rotational viscosities ($\gamma_1$), are required. In particular for monitor applications, the rotational viscosity should be 80 mPa·s or less, preferably 60 mPa·s or less and especially 55 mPa·s or less. Besides this parameter, the media must have a nematic phase range of suitable width and position and an appropriate birefringence ($\Delta n$). In addition, the dielectric anisotropy ($\Delta \varepsilon$) should be sufficiently high to allow a fairly low operating voltage. $\Delta \varepsilon$ should preferably be greater than 2 and very preferably greater than 3, but preferably not greater than 20 and in particular not greater than 17, as this would prevent an at least fairly high resistivity.

For applications as displays for notebooks or other mobile applications, the rotational viscosity should preferably be 120 mPa·s or less and particularly preferably 100 mPa·s or less. The dielectric anisotropy ($\Delta \varepsilon$) here should preferably be greater than 8 and particularly preferably greater than 12.

The displays in accordance with the present invention are preferably addressed by an active matrix (active-matrix LCDs, AMDs for short), preferably by a matrix of thin-film transistors (TFTs). However, the liquid crystals according to the invention can also advantageously be used in displays having other known addressing means.

There are numerous different display modes which use composite systems of low-molecular-weight liquid-crystal materials together with polymeric materials. These are, for example, polymer dispersed liquid crystal (PDLC), nematic curvilinearly aligned phase (NCAP) and polymer network (PN) systems, as disclosed, for example, in WO 91/05 029, or axially symmetric microdomain (ASM) systems and others. In contrast to these, the modes that are especially preferred in accordance with the present invention use the liquid-crystal medium as such, oriented on surfaces. These surfaces are typically pretreated in order to achieve uniform alignment of the liquid-crystal material. The display modes in accordance with the present invention preferably use an electric field which is substantially parallel to the composite layer.

Liquid-crystal compositions which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521. However, these compositions have severe disadvantages. Amongst other deficiencies, most of them result in disadvantageously long addressing times, have inadequate values of the resistivity and/or require excessively high operating voltages. In addition, there is a need to improve the low-temperature behaviour of LCDs. Both an improvement in the operating properties and also in the shelf life and, in particular, in the stability to visible light and UV radiation, but also to heat and, in particular, to a combination of heat and light and/or UV radiation, are necessary here.

The compound TEMPOL, of the following formula:

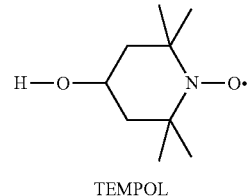

TEMPOL is known; it is mentioned, for example, in Miéville, P. et al, Angew. Chem. 2010, 122, pages 6318-6321. It is commercially available from various manufacturers and is employed, for example, as polymerisation inhibitor and, in particular in combination with UV absorbers, as light or UV stabiliser in formulations for precursors of polyolefins, polystyrenes, polyamides, coatings and PVC.

Compounds of the following formula:

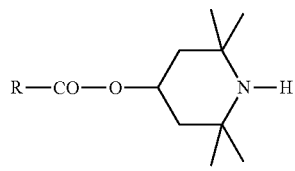

are constituents of the product commercially available under the name "Cyasorb UV-3852S" from Cytec, West Paterson, USA, which is employed as light stabiliser, for example in formulations for polypropylene plastic parts for the automobile industry and for garden furniture.

The as yet unpublished patent application DE 102011117937.6 describes liquid-crystal mixtures having negative dielectric anisotropy which comprise TINUVIN 770® for stabilisation.

The likewise as yet unpublished patent applications DE 102011119144.9 and PCT/EP2011/005692 describe liquid-crystal mixtures having positive dielectric anisotropy which comprise, inter alia, HALS N-oxides for stabilisation.

The likewise as yet unpublished patent application U.S. Ser. No. 13/451,749 pro-poses stabilising liquid-crystal mixtures having negative dielectric anisotropy using compounds of the formula I of the present application.

Many liquid-crystal media, particularly those having large polarities or high dielectric anisotropy, do not meet the high stability requirements necessary for practical applications.

There is therefore a considerable demand for liquid-crystalline media having suitable properties for practical applications, such as a broad nematic phase range, suitable optical anisotropy Δn corresponding to the display type used, a high Δε and particularly low viscosities for particularly short response times.

PRESENT INVENTION

Surprisingly, it has now been found that it is possible to achieve liquid-crystalline media having a suitably high Δε, a suitable phase range and suitable Δn which do not have the disadvantages of the materials from the prior art, or at least only do so to a significantly reduced extent.

Surprisingly, it has been found here that the compounds of the formula I, as indicated below, result in considerable, in many cases adequate, stabilisation of liquid-crystal mixtures and in particular in combination with other stabilisers, in particular with ortho-(tert-butyl)phenol derivatives or diortho-(tert-butyl)phenol derivatives, i.e. compounds which contain a structural element of the formula

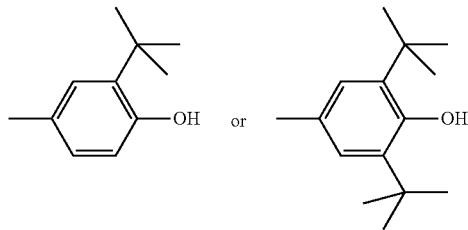 [SMILES: Cc1ccc(O)c(C(C)(C)C)c1 ; Cc1cc(C(C)(C)C)c(O)c(C(C)(C)C)c1]

and/or compounds which contain a structural element of the formula

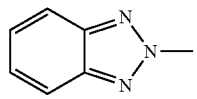

where these structural elements may optionally carry further substituents, preferably alkyl or halogen.

The invention relates to a liquid-crystalline medium having a nematic phase and positive dielectric anisotropy which comprises a) one or more compounds selected from the group of the compounds of the formula I and TINUVIN 770®, preferably in a concentration in the range from 1 ppm to 2,000 ppm, preferably in the range from 1 ppm to 600 ppm, particularly preferably in the range from 1 ppm to 250 ppm, very particularly preferably in the range from 10 ppm to 200 ppm,

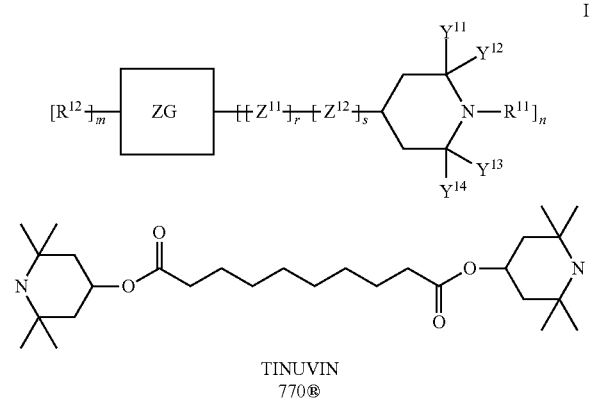

TINUVIN 770® in which n denotes an integer from 1 to 4, preferably 1, 2 or 3, particularly preferably 1 or 2, and very particularly preferably 2, m denotes (4-n),

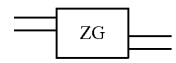

denotes an organic radical having 4 bonding sites, preferably an alkanetetrayl unit having 1 to 20 C atoms, in which, in addition to the m groups $R^{12}$ present in the molecule, but independently thereof, a further H atom may be replaced by $R^{12}$ or a plurality of further H atoms may be replaced by $R^{12}$, preferably a straight-chain alkanetetrayl unit having one valence on each of the two terminal C atoms, in which one —$CH_2$— group or a plurality of —$CH_2$— groups may be replaced by —O— or —(C=O)— in such a way that two O atoms are not bonded directly to one another, or denotes a substituted or unsubstituted aromatic or heteroaromatic hydrocarbon radical having 1 to 4 valences, in which, in addition to the m groups $R^{12}$ present in the molecule, but independently thereof, a further H atom may be replaced by $R^{12}$ or a plurality of further H atoms may be replaced by $R^{12}$, $Z^{11}$ and $Z^{12}$, independently of one another, denote —O—, —(C=O)—, —(N—$R^{14}$)— or a single bond, but do not both simultaneously denote —O—, r and s, independently of one another, denote 0 or 1, $Y^{11}$ to $Y^{14}$ each, independently of one another, denote alkyl having 1 to 4 C atoms, preferably methyl or ethyl, particularly preferably all denote either methyl or ethyl and very particularly preferably methyl, and alternatively, independently of one another, one or both of the pairs ($Y^{11}$ and $Y^{12}$) and ($Y^{13}$ and $Y^{14}$) together also denote a divalent group having 3 to 6 C atoms, preferably having 5 C atoms, particularly preferably 1,5-pentylene, $R^{11}$ denotes O—$R^{13}$, O. or OH, preferably O—$R^{13}$ or O., particularly preferably O., isopropoxy, cyclohexyloxy, acetophenoxy or benzoxy and very particularly preferably O., $R^{12}$ on each occurrence, independently of one another, denotes H, F, $OR^{14}$, $NR^{14}R^{15}$, a straight-chain or branched alkyl chain having 1-20 C atoms, in which one —$CH_2$— group or a plurality of —$CH_2$— groups may be replaced by —O— or —C(=O)—, but two adjacent —$CH_2$— groups cannot be replaced by —O—, or denotes a hydrocarbon radical which contains a cycloalkyl or alkylcycloalkyl unit, and in which one —$CH_2$— group or a plurality of —$CH_2$— groups may be replaced by —O— or —C(=O)—, but two adjacent —$CH_2$— groups cannot be replaced by —O—, and in which one H atom or a plurality of H atoms may be replaced by $OR^{14}$, $N(R^{14})(R^{15})$ or $R^{16}$, or denotes an aromatic or heteroaromatic hydrocarbon radical, in which one H atom or a plurality of H atoms may be replaced by $OR^{14}$, $N(R^{14})(R^{15})$ or $R^{16}$, $R^{13}$ on each occurrence, independently of one another, denotes a straight-chain or branched alkyl chain having 1-20 C atoms, in which one —$CH_2$— group or a plurality of —$CH_2$— groups may be replaced by —O— or —C(=O)—, but two adjacent —$CH_2$— groups cannot be replaced by —O—, or denotes a hydrocarbon radical which contains a cycloalkyl or alkylcycloalkyl unit, and in which one —$CH_2$— group or a plurality of —$CH_2$— groups may be replaced by —O— or —C(=O)—, but two adjacent —$CH_2$— groups cannot be replaced by —O—, and in which one H atom or a plurality of H atoms may be replaced by $OR^{14}$, $N(R^{14})(R^{15})$ or $R^{16}$, or denotes an aromatic or heteroaromatic hydrocarbon radical, in which one H atom or a plurality of H atoms may be replaced by $OR^{14}$, $N(R^{14})(R^{15})$ or $R^{16}$, or can be

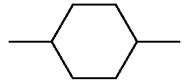

(1,4-cyclohexylene), in which one or more —$CH_2$— groups may be replaced by —O—, —CO— or —$NR^{14}$—, or an acetophenyl, isopropyl or 3-heptyl radical, $R^{14}$ on each occurrence, independently of one another, denotes a straight-chain or branched alkyl or acyl group having 1 to 10 C atoms, preferably n-alkyl, or an aromatic hydrocarbon or carboxyl radical having 6-12 C atoms, preferably with the proviso that, in the case of $N(R^{14})(R^{15})$, at least one acyl radical is present, $R^{15}$ on each occurrence, independently of one another, denotes a straight-chain or branched alkyl or acyl group having 1 to 10 C atoms, preferably n-alkyl, or an aromatic hydrocarbon or carboxyl radical having 6-12 C atoms, preferably with the proviso that, in the case of $N(R^{14})(R^{15})$, at least one acyl radical is present, $R^{16}$ on each occurrence, independently of one another, denotes a straight-chain or branched alkyl group having 1 to 10 C atoms, in which one —$CH_2$— group or a plurality of —$CH_2$— groups may be replaced by —O— or —C(=O)—, but two adjacent —$CH_2$— groups cannot be replaced by —O—, with the provisos that, in the case where n=1, $R^{11}$=O. and —$[Z^{11}$—$]_r$—$[Z^{12}$—$]_s$=—O—, —(CO)—O—, —O—(CO)—, —O—(CO)—O—, —$NR^{14}$ or —$NR^{14}$—(CO)—,

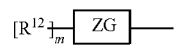

does not denote straight-chain or branched alkyl having 1 to 10 C atoms, also cycloalkyl, cycloalkylalkyl or alkylcycloalkyl, where in all these groups one or more —$CH_2$— groups may be replaced by —O— in such a way that no two O atoms in the molecule are bonded directly to one another, in the case where n=2 and $R^{11}$=O.,

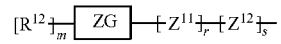

does not denote

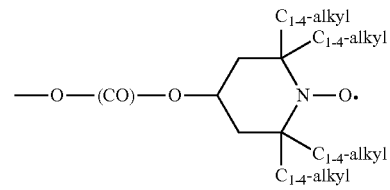

and
in the case where n=2 and $R^{11}$=O—$R^{13}$,
$R^{13}$ does not denote n-$C_{1-9}$-alkyl, and b) one or more compounds selected from the group of the compounds of the formulae II and III

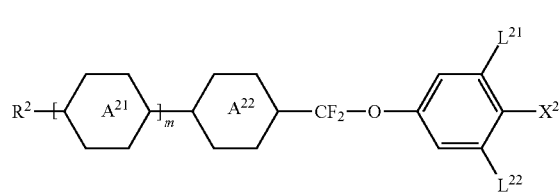

II

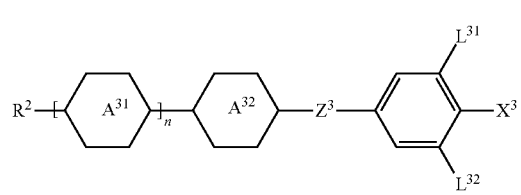

III in which $R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and $R^2$ and $R^3$ preferably denote alkyl or alkenyl,

to

on each appearance, independently of one another, denote

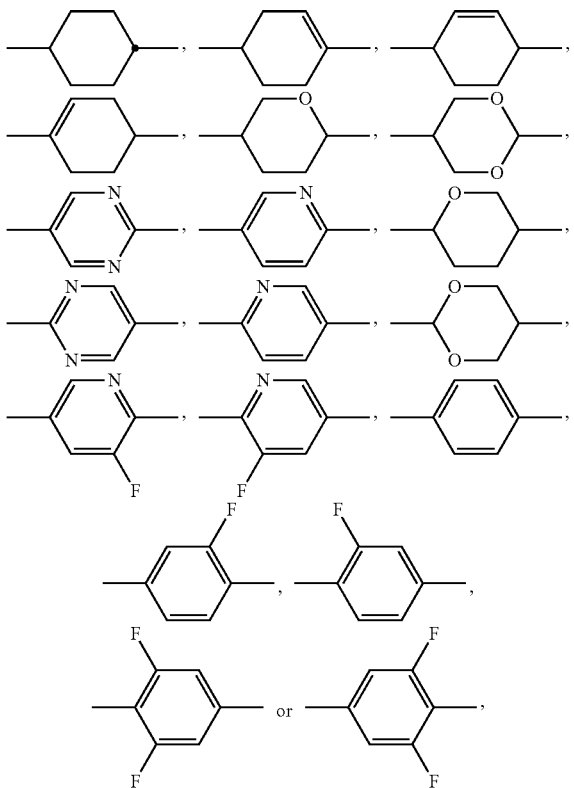

preferably

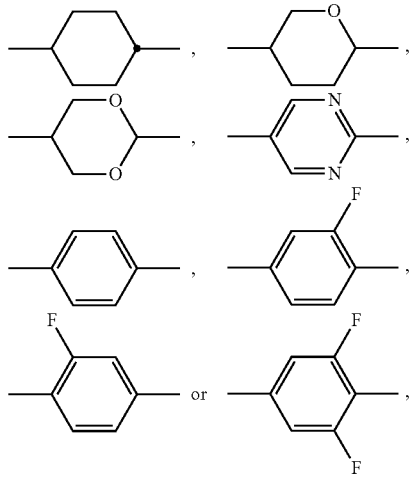

$L^{21}$, $L^{22}$, $L^{31}$ and $L^{32}$, independently of one another, denote H or F, preferably
$L^{21}$ and/or $L^{31}$ denote F,
$X^2$ and $X^3$, independently of one another, denote halogen, halogenated alkyl or alkoxy having 1 to 3 C atoms or halogenated alkenyl or alkenyloxy having 2 or 3 C atoms, preferably F, Cl, —OCF$_3$ or —CF$_3$, very preferably F, Cl or —OCF$_3$,
$Z^3$ denotes —CH$_2$CH$_2$—, —CF$_2$CF$_2$—, —COO—, trans-CH=CH—, trans-CF=CF—, —CH$_2$O— or a single bond, preferably —CH$_2$CH$_2$—, —COO—, trans-CH=CH— or a single bond and very preferably —COO—, trans-CH=CH— or a single bond, and
m and n, independently of one another, denote 0, 1, 2 or 3,
m preferably denotes 1, 2 or 3, and
n preferably denotes 0, 1 or 2 and particularly preferably 1 or 2,
and/or
c) one or more compounds of the formula IV

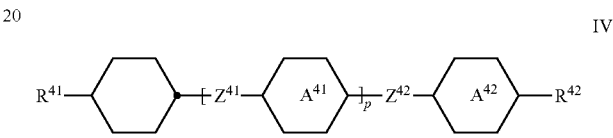

IV in which
$R^{41}$ and $R^{42}$, independently of one another, have the meaning indicated for $R^2$ above under formula II, preferably $R^{41}$ denotes alkyl and $R^{42}$ denotes alkyl or alkoxy or $R^{41}$ denotes alkenyl and $R^{42}$ denotes alkyl,

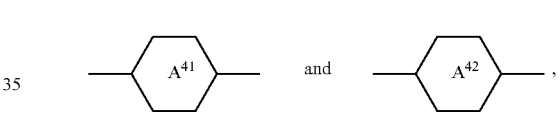

independently of one another and, if

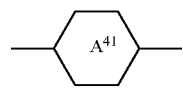

occurs twice, also these independently of one another, denote

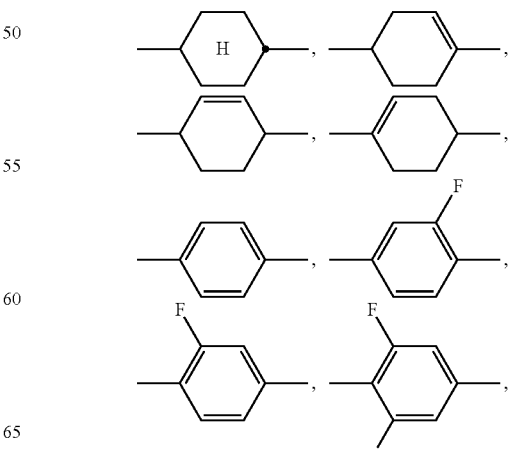

-continued

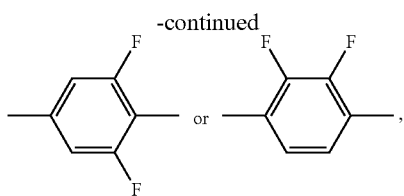

preferably one or more of

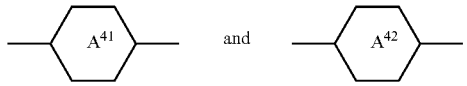

denote(s)

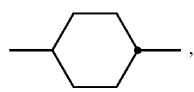

$Z^{41}$ and $Z^{42}$, independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more of them denote(s) a single bond, and p denotes 0, 1 or 2, preferably 0 or 1.

Preference is given to the following embodiments:

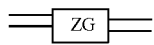

denotes

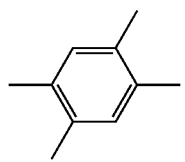

(benzene-1,2,4,5-tetrayl) or
—CH$_2$—(CH—)—[CH$_2$]$_q$—(CH—)—CH$_2$— or
>CH—[CH$_2$]$_p$—CH<, (where p∈{0, 1, 2, 3, 4, 5 to 18} and
q∈{0, 1, 2, 3 to 16}) or

denotes
>CH—[CH$_2$]$_p$—CH$_2$— (where p∈{0, 1, 2, 3, 4, 5 to 18}) or

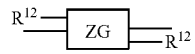

denotes
—CH$_2$—[CH$_2$]$_p$—CH$_2$— (where p∈{0, 1, 2, 3, 4, 5 to 18}),
propane-1,2-diyl, butane-1,2-diyl, ethane-1,2-diyl,

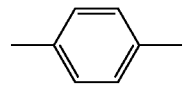

(1,4-phenylene),

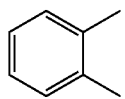

(1,2-phenylene) or

(1,4-cyclohexylene).

In the present application, the elements all include their respective iso-topes. In particular, one or more H in the compounds may be replaced by D, and this is also particularly preferred in some embodiments. A correspondingly high degree of deuteration of the corresponding compounds enables, for example, detection and recognition of the compounds. This is very helpful in some cases, in particular in the case of the compounds of the formula I.

In the present application, alkyl particularly preferably denotes straight-chain alkyl, in particular CH$_3$—, C$_2$H$_5$—, n-C$_3$H$_7$—, n-C$_4$H$_9$— or n-C$_5$H$_{11}$—, and alkenyl particularly preferably denotes CH$_2$=CH—, E-CH$_3$—CH=CH—, CH$_2$=CH—CH$_2$—CH$_2$—, E-CH$_3$—CH=CH—CH$_2$—CH$_2$— or E-(n-C$_3$H$_7$)—CH=CH—.

The liquid-crystalline media in accordance with the present application preferably comprise in total 1 ppm to 1000 ppm, preferably 1 ppm to 500 ppm, even more preferably 1 to 250 ppm, particularly preferably up to 200 ppm and, very particularly preferably, 1 ppm to 100 ppm, of compounds of the formula I.

The concentration of the compounds of the formula I and/or TINUVIN 770® in the media according to the invention is preferably 90 ppm or less, particularly preferably 50 ppm or less. The concentration of the compounds of the formula I and/or TINUVIN 770® in the media according to the invention is very particularly preferably 1 ppm or more to 100 ppm or less.

In a preferred embodiment of the present invention, in the compounds of the formula I,

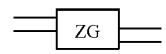

denotes

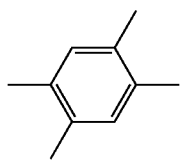

(benzene-1,2,4,5-tetrayl) or

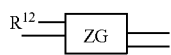

denotes

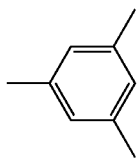

(benzene-1,3,5-triyl) or

denotes —(CH$_2$—)$_2$, —(CH$_2$—)$_4$, —(CH$_2$—)$_6$, —(CH$_2$—)$_8$,
propane-1,2-diyl, butane-1,2-diyl, ethane-1,2-diyl,

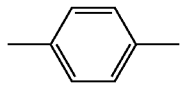

(1,4-phenylene),

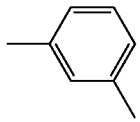

(1,3-phenylene),

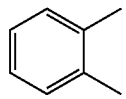

(1,2-phenylene) or

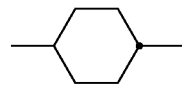

(trans-1,4-cyclohexylene) and/or

—[Z$^{11}$—]$_r$—[Z$^{12}$—]$_s$ on each occurrence, independently of one another, denotes —O—, —(C=O)—O— or —O—(C=O)—, —(N—R$^{14}$)— or a single bond, preferably —O— or —(C=O)—O— or —O—(C=O)—, and/or R$^{11}$ denotes —O·, OH or O—R$^{13}$, preferably:
—O·, —O—CH(—CH$_3$)$_2$, —O—CH(—CH$_3$)(—CH$_2$)$_3$—CH$_3$,
—O—CH(—C$_2$H$_5$)(—CH$_2$)$_3$—CH$_3$,

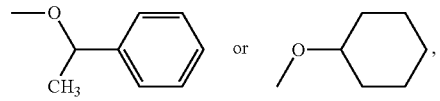

and/or

R$^{12}$, if present, denotes alkyl or alkoxy, and/or

R$^{13}$ denotes isopropyl or 3-heptyl, acetophenyl or cyclohexyl.

In a preferred embodiment of the present invention, the group

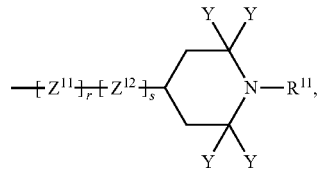

in the compounds of the formula I on each occurrence, independently of one another, denotes

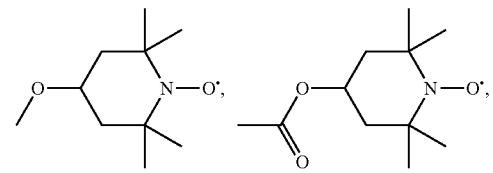

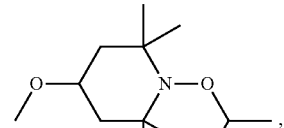

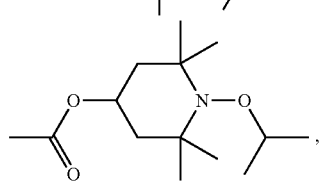

-continued

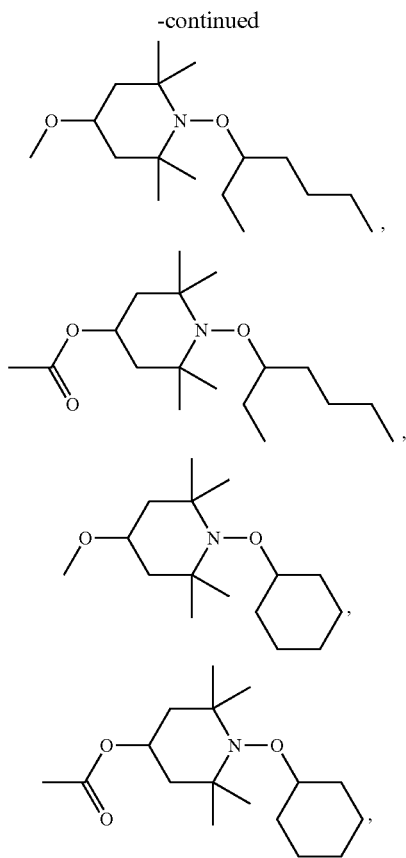

preferably

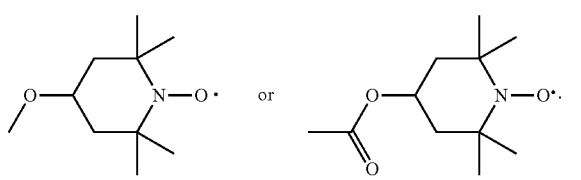

In a particularly preferred embodiment of the present invention, all groups

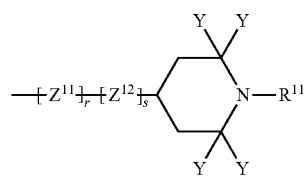

present in the compounds of the formula I have the same meaning.

These compounds are highly suitable as stabilisers in liquid-crystal mixtures. In particular, they stabilise the VHR of the mixtures against UV exposure.

In a preferred embodiment of the present invention, the media according to the invention in each case comprise one or more compounds of the formula I selected from the group of the compounds of the formulae I-1 to I-9, preferably selected from the group of the compounds of the formulae I-1 to I-4,

I-1

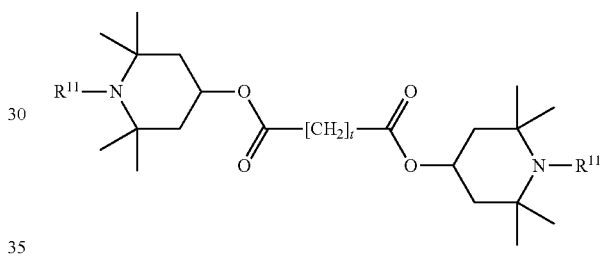

I-2

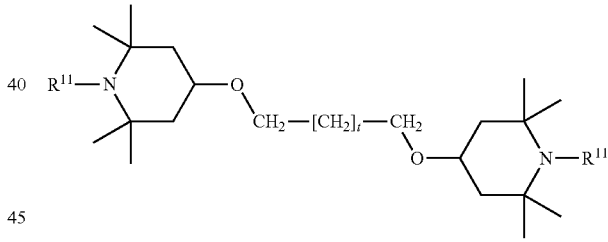

I-3

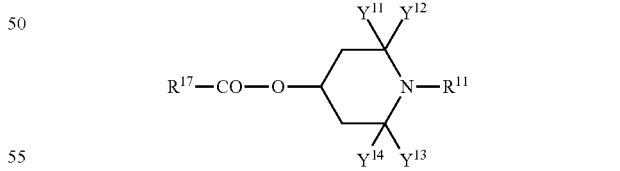

I-4

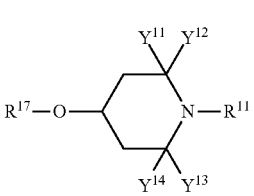

I-5

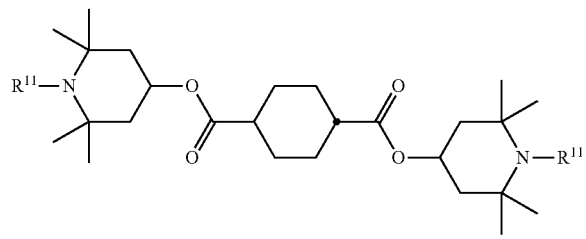

I-6

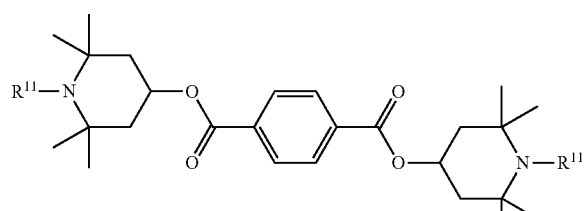

I-7

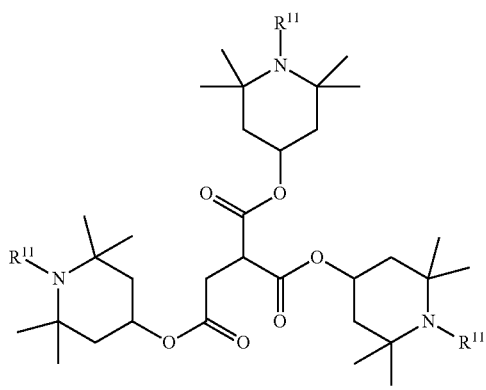

I-8

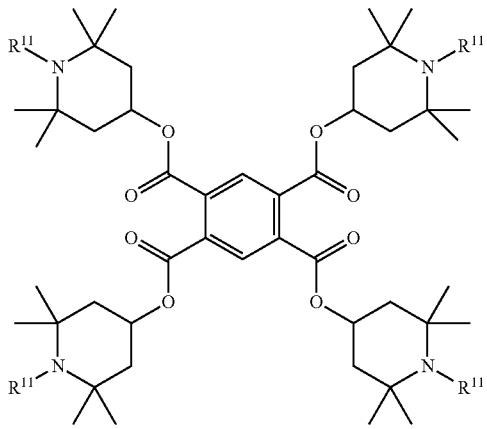

in which the parameters have the meanings indicated above under formula I, and t denotes an integer from 1 to 12, $R^{17}$ denotes a straight-chain or branched alkyl chain having 1-12 C atoms, in which one —$CH_2$— group or a plurality of —$CH_2$— groups may be replaced by —O— or —C(=O)—, but two adjacent —$CH_2$— groups cannot be replaced by —O—, or denotes an aromatic or heteroaromatic hydrocarbon radical, in which one H atom or a plurality of H atoms may be replaced by $OR^{14}$, $N(R^{14})(R^{15})$ or $R^{16}$.

In an even more preferred embodiment of the present invention, the media according to the invention in each case comprise one or more compounds of the formula I selected from the group of the following compounds, of the formulae I-1a-1 to I-8a-1:

I-1a-1

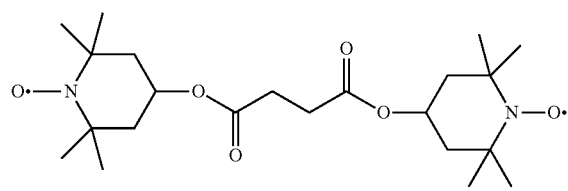

I-1a-2

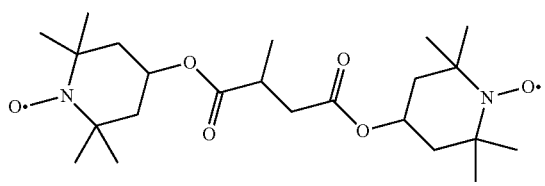

I-1a-3

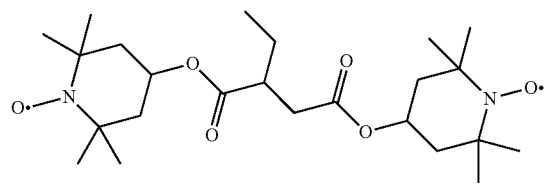

I-1a-4

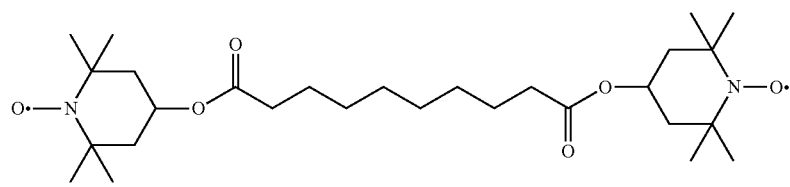

-continued
I-1a-5
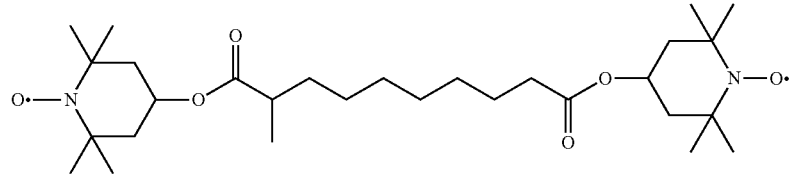
I-2a-1
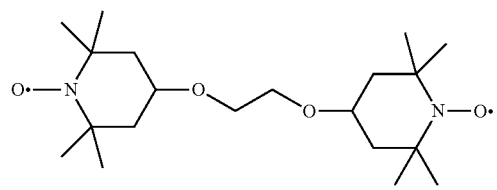
I-2a-2
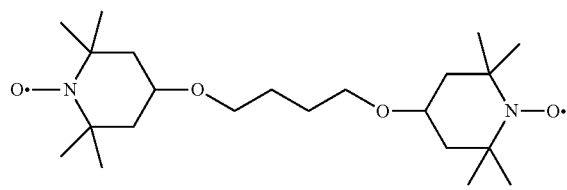
I-3a-1
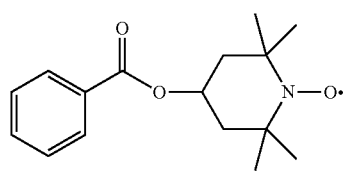
I-3a-2
I-3a-3
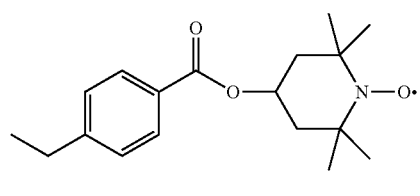
I-3a-4
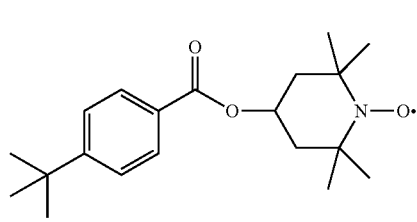
I-3a-5
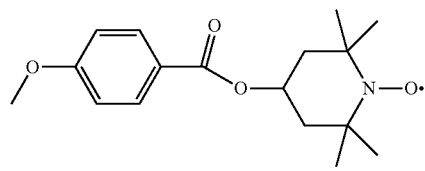
I-3a-6
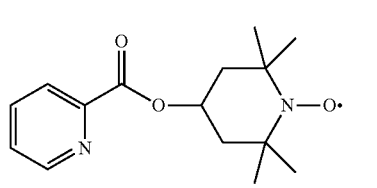
I-5a-1
I-6a-1
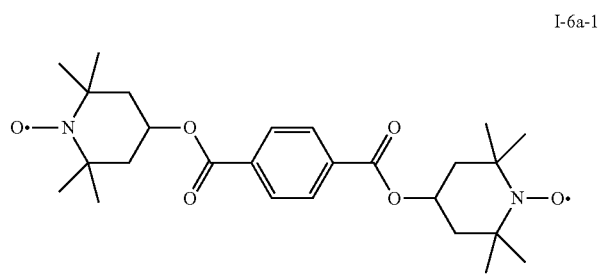

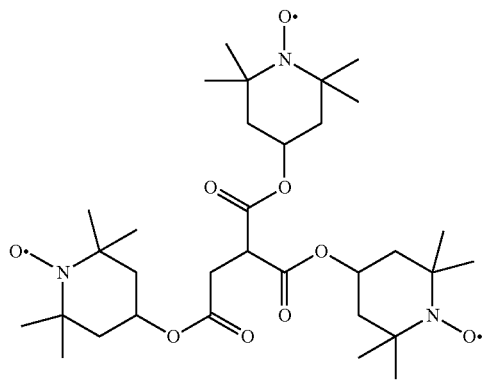

I-7a-1

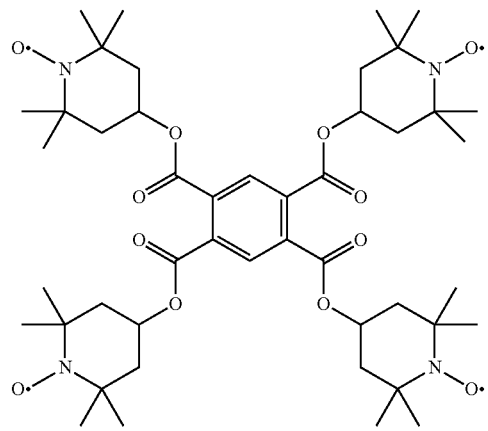

I-8a-1

In an even more preferred embodiment of the present invention, the media according to the invention in each case comprise one or more compounds of the formula I selected from the group of the following compounds, of the formulae I-2a-1 and I-2a-2:

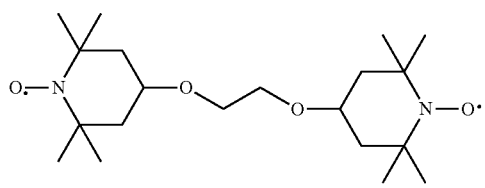

I-2a-1

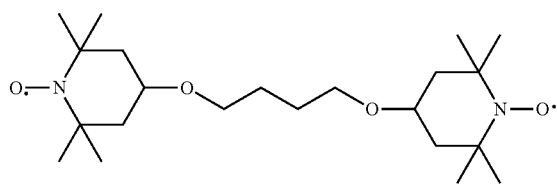

I-2a-2

In an alternative, preferred embodiment of the present invention, the media according to the invention in each case comprise one or more compounds of the formula I selected from the group of the following compounds, of the formulae I-1 b-1 and I-1 b-2,

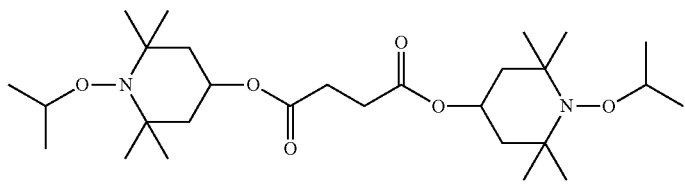

I-1b-1

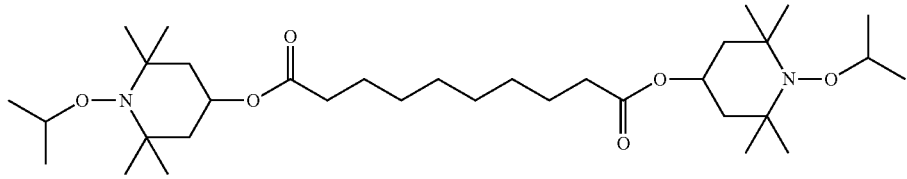

I-1b-2

In an alternative, preferred embodiment of the present invention, the media according to the invention in each case comprise one or more compounds of the formula I selected from the group of the following compounds, of the formulae I-1c-1 and I-1c-2,

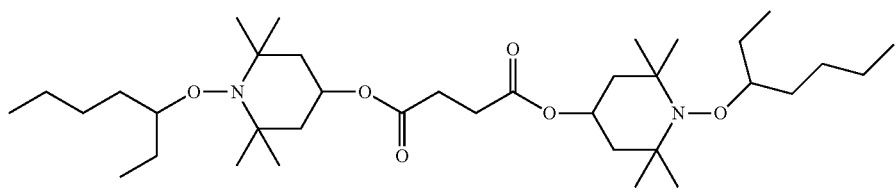

I-1c-1

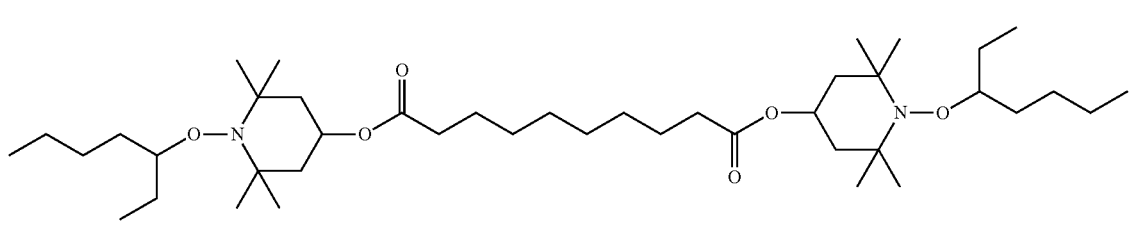

I-1c-2

In a further alternative, preferred embodiment of the present invention, the media according to the invention in each case comprise one or more compounds of the formula I selected from the group of the following compounds, of the formulae I-1d-1 to I-1d-4:

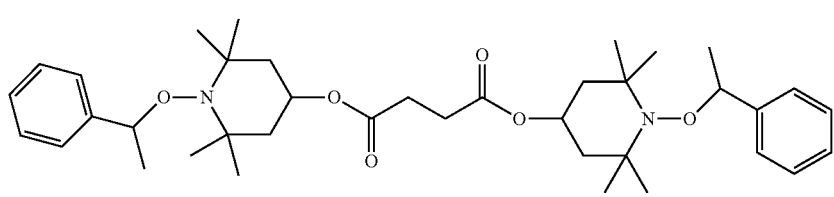

I-1d-1

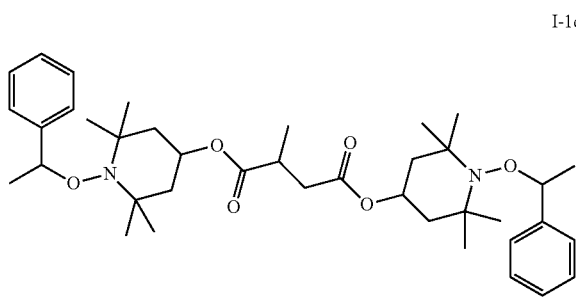

I-1d-2

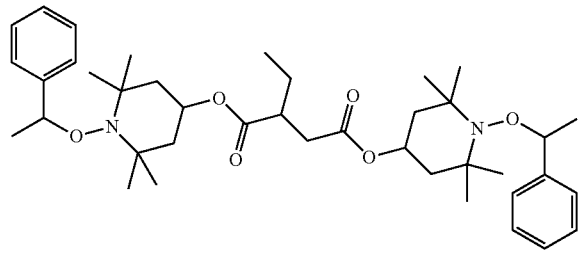

I-1d-3

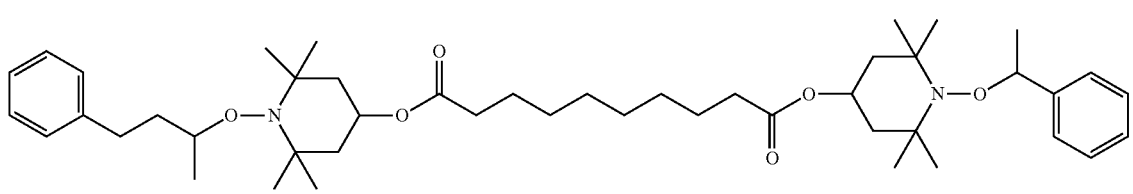

I-1d-4

In a further alternative, preferred embodiment of the present invention, the media according to the invention in each case comprise one or more compounds of the formula I selected from the group of the following compounds, of the formulae I-3d-1 to I-3d-8,

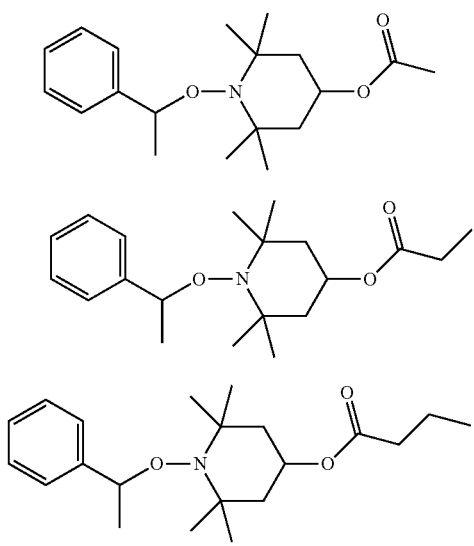

I-3d-1
I-3d-2
I-3d-3

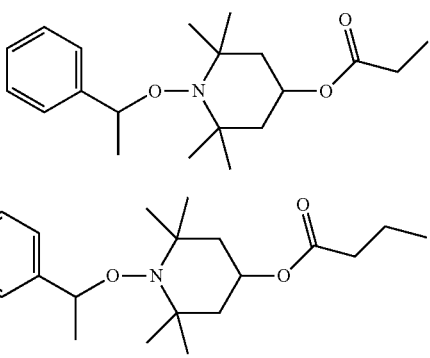

I-3d-4
I-3d-5

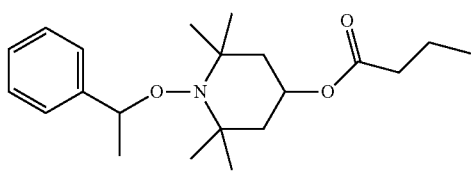

I-3d-6

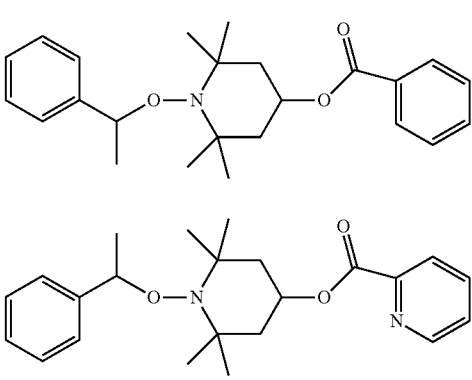

I-3d-7
I-3d-8

In a further alternative, preferred embodiment of the present invention, the media according to the invention in each case comprise one or more compounds of the formula I selected from the group of the following compounds, of the formulae I-4d-1 and I-4d-2,

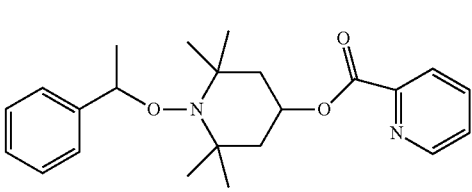

I-4d-1
I-4d-2

In a further alternative, preferred embodiment of the present invention, the media according to the invention in each case comprise one or more compounds of the formula I selected from the group of the following compounds, of the formulae I-1e-1 and I-1e-2,

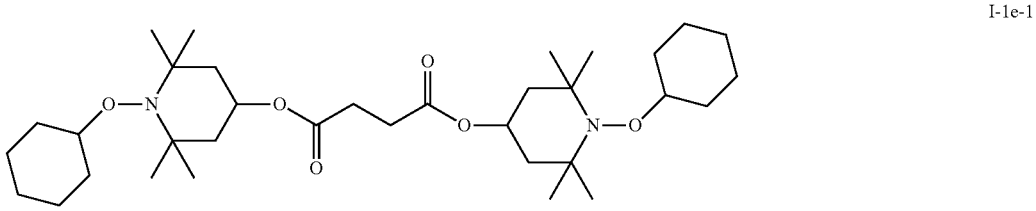

I-1e-1

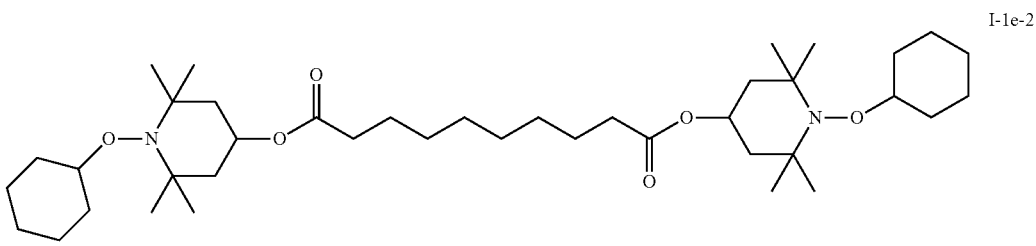

I-1e-2

In a further alternative, preferred embodiment of the present invention, the media according to the invention in each case comprise one or more compounds of the formula I selected from the group of the following compounds, of the formulae I-5e-1 to I-8e-1,

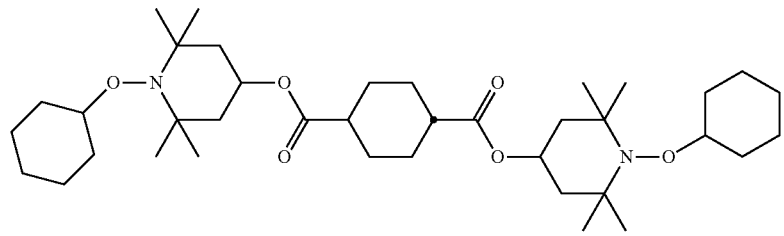

I-5e-1

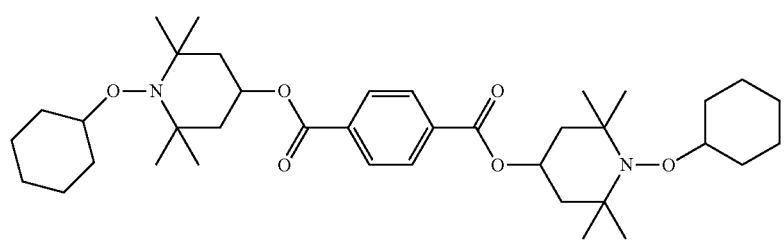

I-6e-1

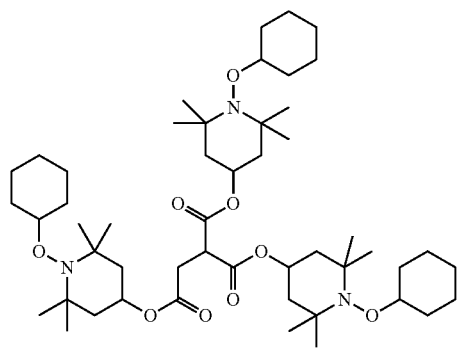

I-7e-1

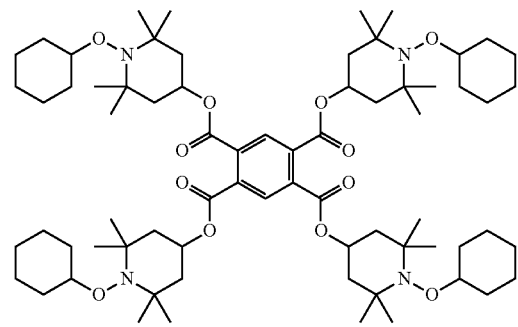

I-8e-1

In a preferred embodiment of the present invention, the media according to the invention comprise the compound TINUVIN 770®
and
one or more compounds of the formula I, preferably selected from the preferred sub-formulae thereof,
and/or
one or more compounds which contain a structural element of the formula

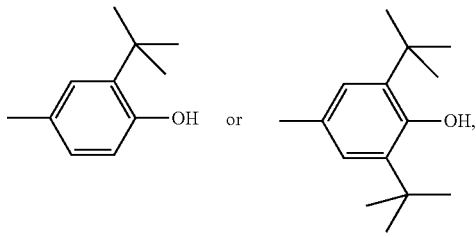 [SMILES: Cc1ccc(O)c(C(C)(C)C)c1 ; Cc1cc(C(C)(C)C)c(O)c(C(C)(C)C)c1]

where these structural elements may optionally carry further substituents, preferably alkyl or halogen,
and/or one or more compounds which contain a structural element of the formula where this structural element may optionally carry further substituents, preferably alkyl or halogen,
and/or
one or more compounds of the formula II, preferably selected from the preferred sub-formulae thereof,
and/or
one or more compounds of the formula III, preferably selected from the preferred sub-formulae thereof,
and/or
one or more compounds of the formula IV, preferably selected from the preferred sub-formulae thereof.

In addition to the compounds of the formula I and/or TINUVIN 770® or preferred sub-formulae thereof, the media in accordance with the present invention preferably comprise one or more dielectrically neutral compounds of the formula Iv in a total concentration in the range from 5% or more to 90% or less, preferably from 10% or more to 80% or less, particularly preferably from 20% or more to 70% or less.

The compounds of the formulae II and III are preferably dielectrically positive compounds, preferably having a dielectric anisotropy of greater than 3.

The compounds of the formula IV are preferably dielectrically neutral compounds, preferably having a dielectric anisotropy in the range from −1.5 to 3.

The liquid-crystalline media in accordance with the present application preferably comprise in total 1 ppm to 2000 ppm, preferably 1 ppm to 1000 ppm and very particularly preferably 1 ppm to 300 ppm, of one or more compounds of the formula I and/or TINUVIN 770®.

These compounds are eminently suitable as stabilisers in liquid-crystal mixtures. In particular, they stabilise the "voltage holding ratio" (VHR or just HR for short) of the mixtures after exposure to UV radiation and/or LCD backlighting and/or elevated temperature.

The individual compounds of the formulae II and/or III are employed in a concentration of 1 to 20%, preferably 1 to 15%. These limits apply, in particular, if in each case two or more homologous compounds, i.e. compounds of the same formula, are employed. If only a single substance, i.e. only one homologue, of the compounds of a formula is employed, its concentration can thus be in the range from 2 to 20%, preferably from 3 to 14%.

In addition to the compounds of the formula I and/or TINUVIN 770® or preferred sub-formulae thereof, the media according to the present invention preferably comprise one or more dielectrically positive compounds having a dielectric anisotropy of greater than 3, selected from the group of the formulae II and III.

In a preferred embodiment of the present invention, the media according to the invention comprise one or more compounds selected from the group of the compounds of the formulae II-1 to II-4, preferably of the formulae II-1 and/or II-2 in which the parameters have the respective meanings indicated above under formula II, and $L^{23}$ and $L^{24}$, independently of one another, denote H or F, preferably $L^{23}$ denotes F, and

has one of the meanings given for

and, in the case of the formulae II-1 and II-4, $X^2$ preferably denotes F or $OCF_3$, particularly preferably F, and, in the case of the formula II-3,

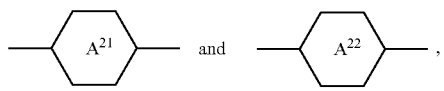

II-1

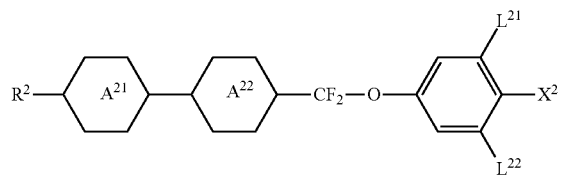

II-2

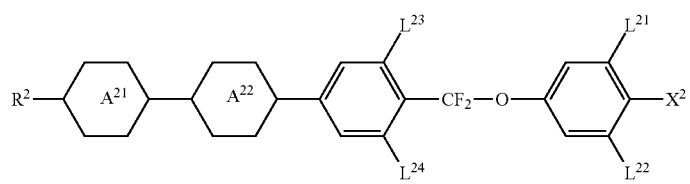

II-3

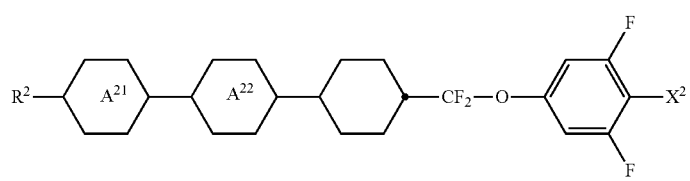

II-4

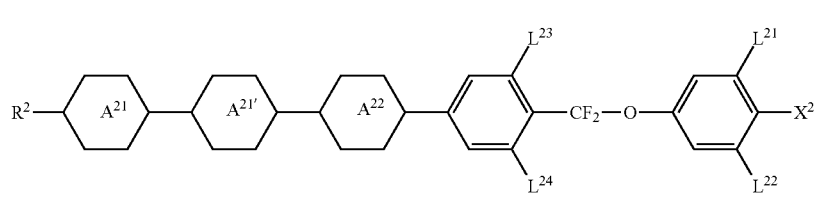

independently of one another, preferably denote

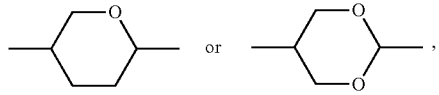

and/or are selected from the group of the compounds of the formulae III-1 and III-2:

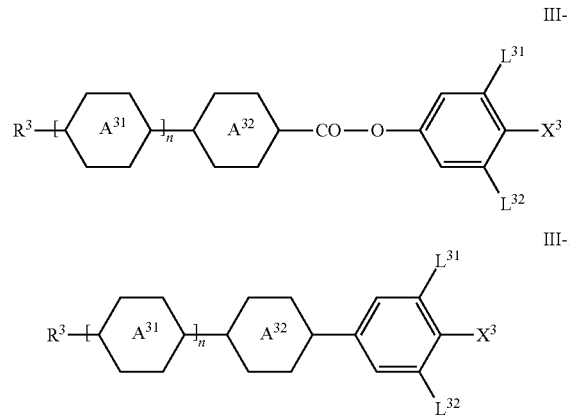

in which the parameters have the meaning given under formula III.

In a preferred embodiment, the media according to the present invention alternatively or in addition to the compounds of the formulae III-1 and/or III-2 comprise one or more compounds of the formula III-3

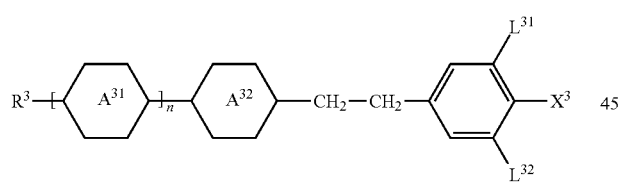

in which the parameters have the respective meanings indicated above, and the parameters $L^{31}$ and $L^{32}$, independently of one another and of the other parameters, denote H or F.

The media according to the invention preferably comprise one or more compounds selected from the group of the compounds of the formulae II-1 to II-4 in which $L^{21}$ and $L^{22}$ and/or $L^{23}$ and $L^{24}$ both denote F.

In a preferred embodiment, the media comprise one or more compounds which are selected from the group of the compounds of the formulae II-2 and II-4 in which $L^{21}$, $L^{22}$, $L^{23}$ and $L^{24}$ all denote F.

The media preferably comprise one or more compounds of the formula II-1. The compounds of the formula II-1 are preferably selected from the group of the compounds of the formulae II-1a to II-1f

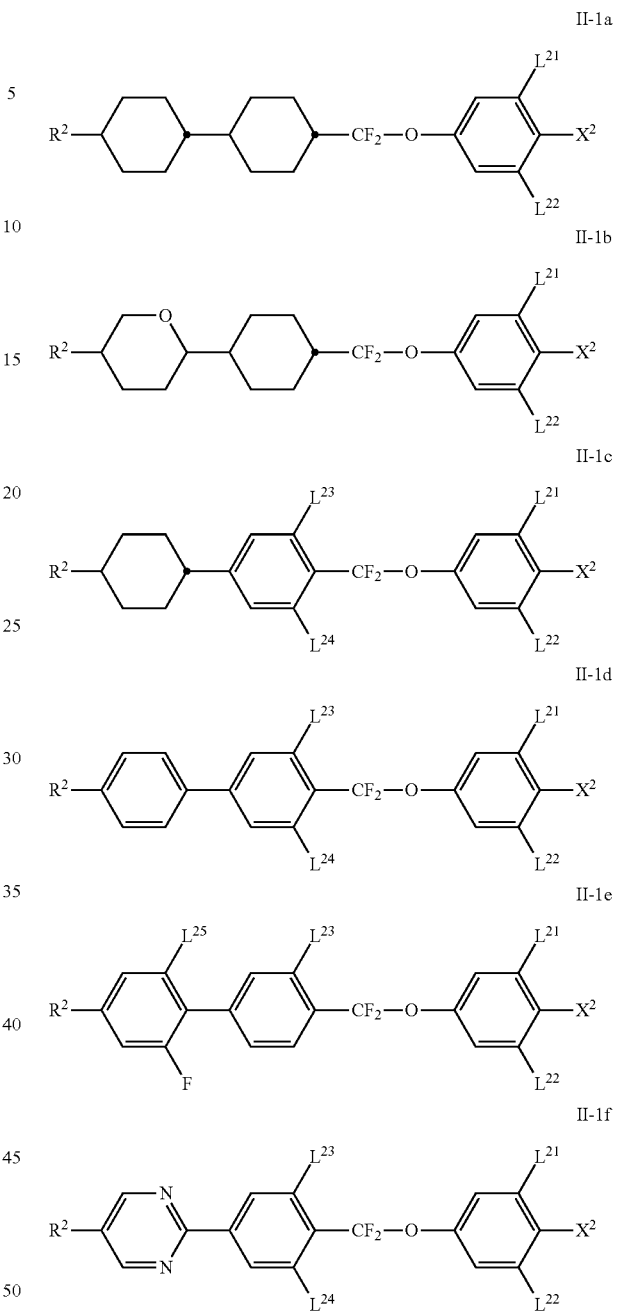

in which the parameters have the respective meanings indicated above, and $L^{23}$ to $L^{25}$, independently of one another and of the other parameters, denote H or F, and preferably in the formulae II-1a and II-1b
$L^{21}$ and $L^{22}$ both denote F,
in the formulae II-1c and II-1d
$L^{21}$ and $L^{22}$ both denote F and/or $L^{23}$ and $L^{24}$ both denote F, and
in formula II-1e
$L^{21}$, $L^{22}$ and $L^{25}$ denote F, and in each case the other parameters have the respective meanings given above.

Especially preferred compounds of the formula II-1 are
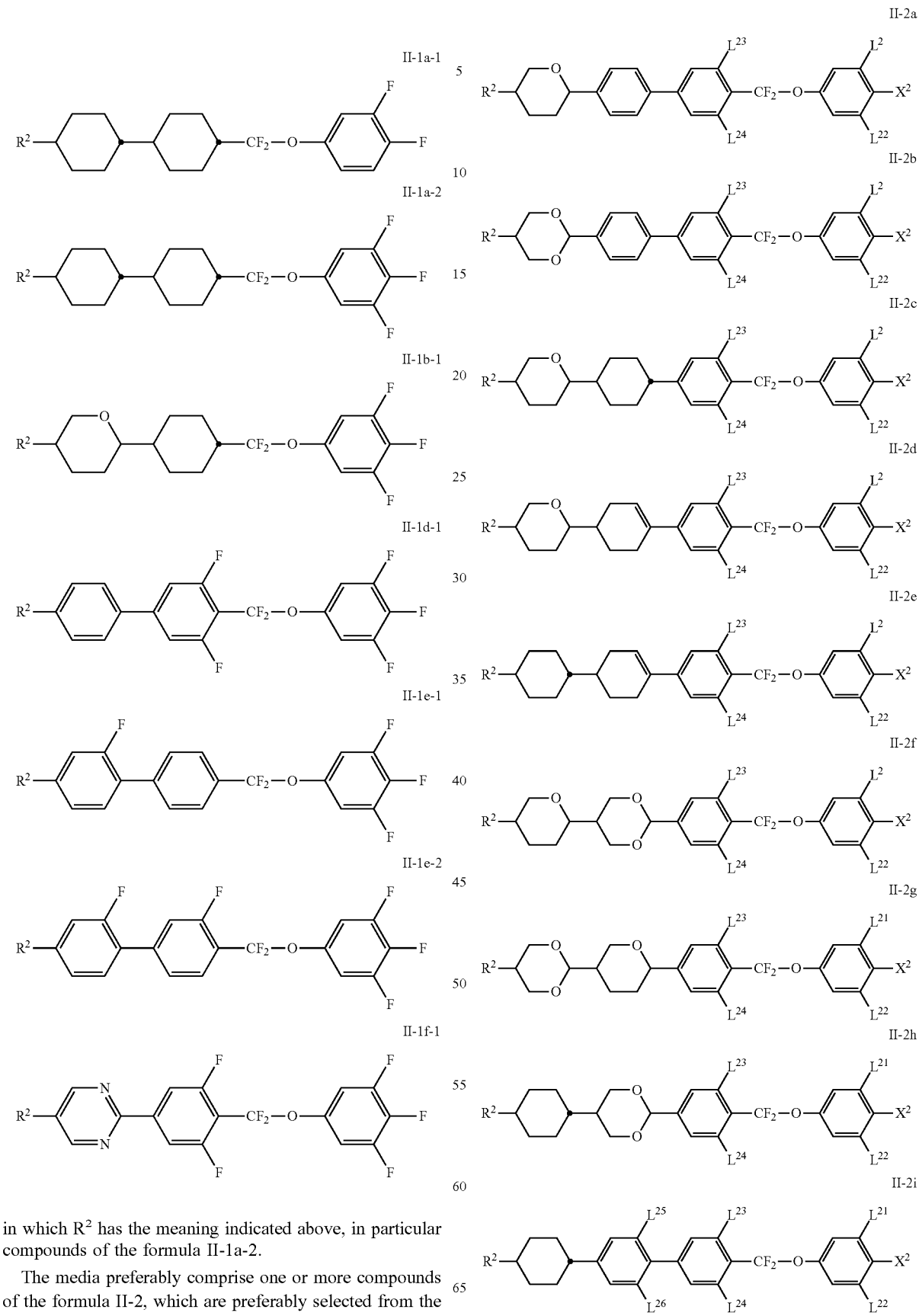
in which $R^2$ has the meaning indicated above, in particular compounds of the formula II-1a-2.
The media preferably comprise one or more compounds of the formula II-2, which are preferably selected from the group of the compounds of the formulae II-2a to II-2k

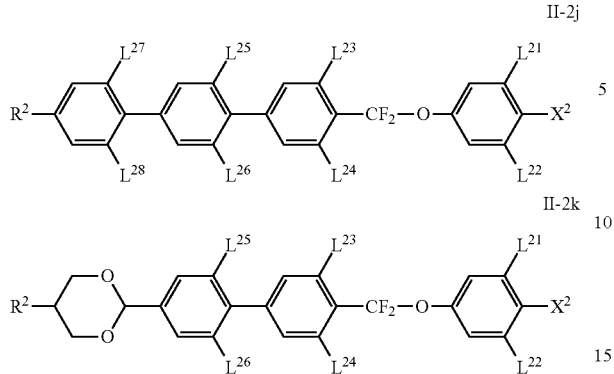

in which the parameters have the respective meanings indicated above, and $L^{25}$ to $L^{28}$, independently of one another, denote H or F, preferably $L^{27}$ and $L^{28}$ both denote H, particularly preferably $L^{26}$ denotes H, and the other parameters have the respective meanings given above.

The media according to the invention preferably comprise one or more compounds selected from the group of the compounds of the formulae II-2a to II-2k in which $L^{21}$ and $L^{22}$ both denote F and/or $L^{23}$ and $L^{24}$ both denote F, and the other parameters have the respective meanings given above.

In a preferred embodiment, the media according to the invention comprise one or more compounds selected from the group of the compounds of the formulae II-2a to II-2k in which $L^{21}$, $L^{22}$, $L^{23}$ and $L^{24}$ all denote F, and the other parameters have the respective meanings given above.

Especially preferred compounds of the formula II-2 are the compounds of the following formulae:

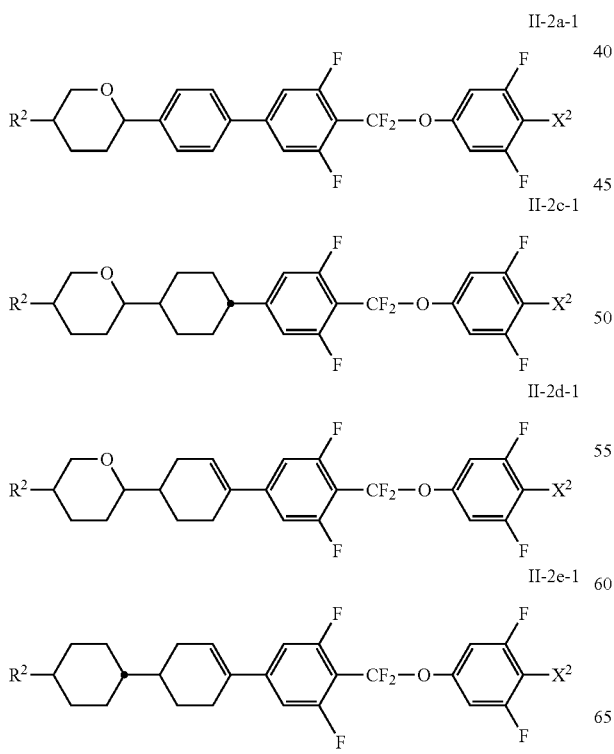

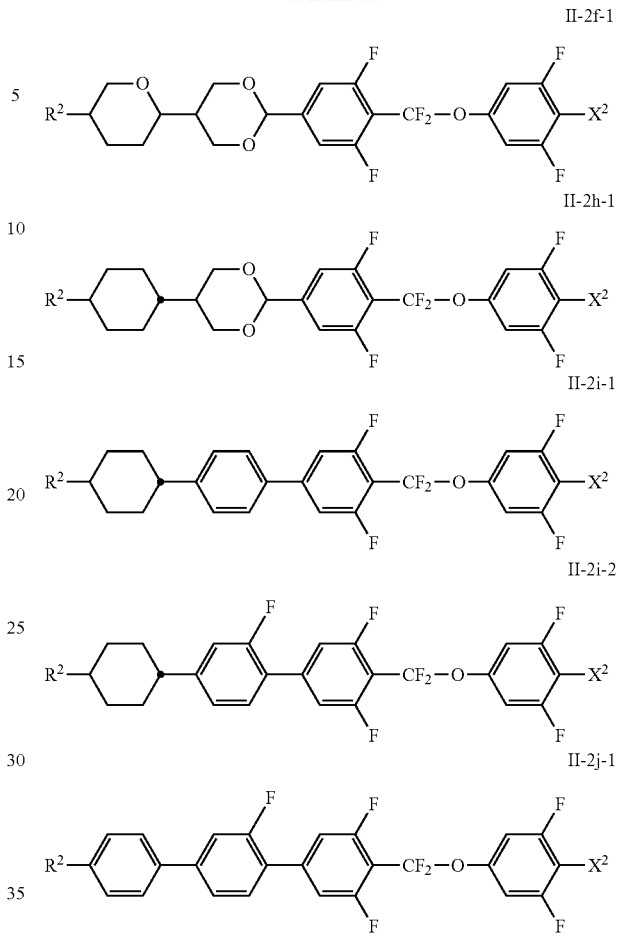

in which $R^2$ and $X^2$ have the meanings indicated above, and $X^2$ preferably denotes F, particularly preferably compounds of the formula II-2a-1 and/or II-2h-1 and/or II-2j-1 and/or II-2k-1.

The media according to the invention preferably comprise one or more compounds of the formula II-3, preferably selected from the group of the compounds of the formulae II-3a to II-3c

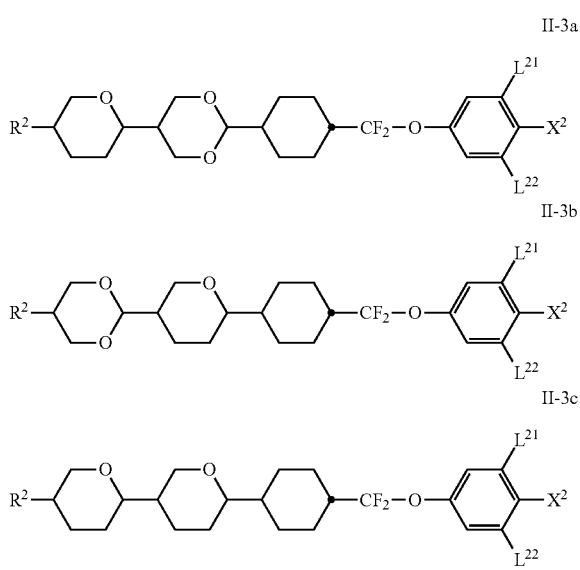

in which the parameters have the respective meanings indicated above, and $L^{21}$ and $L^{22}$ preferably both denote F.

In a preferred embodiment, the media according to the invention comprise one or more compounds of the formula II-4, preferably of the formula II-4a

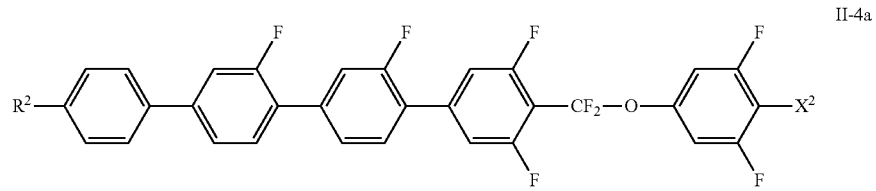

in which the parameters have the meaning given above, and $X^2$ preferably denotes F or $OCF_3$, particularly preferably F.

The media according to the invention preferably comprise one or more compounds of the formula III-1, preferably selected from the group of the compounds of the formulae III-1a and III-1b

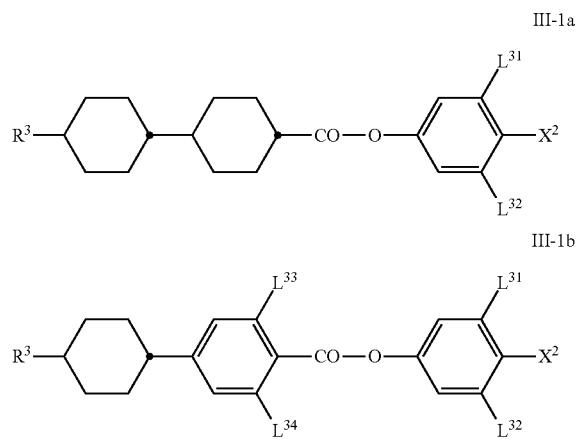

in which the parameters have the respective meanings indicated above, and the parameters $L^{33}$ and $L^{34}$, independently of one another and of the other parameters, denote H or F.

The media according to the invention preferably comprise one or more compounds of the formula III-1a, preferably selected from the group of the compounds of the formulae III-1a-1 to III-1a-6

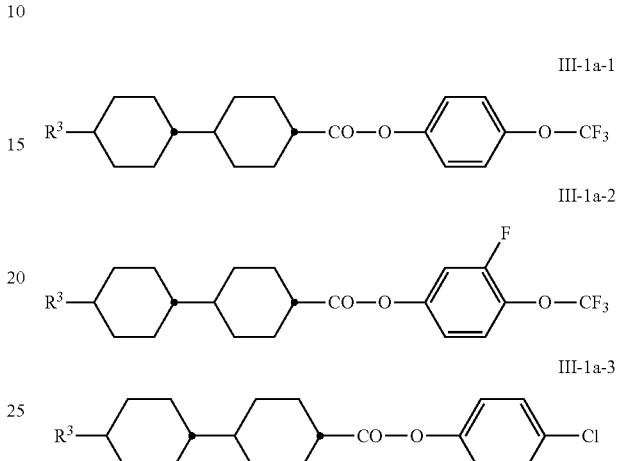

-continued

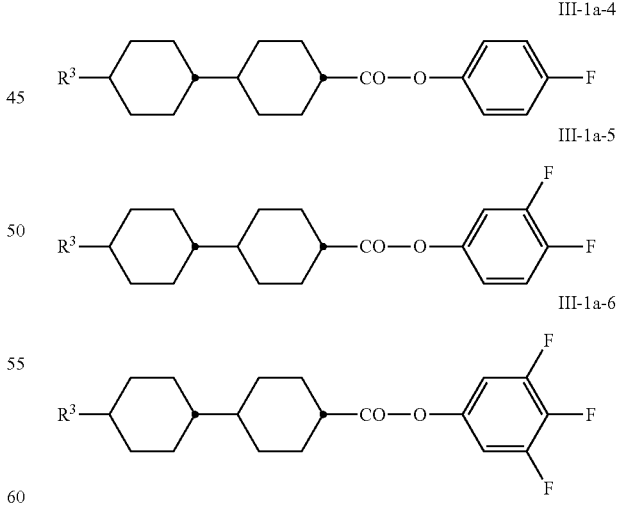

in which $R^3$ has the meaning indicated above.

The media according to the invention preferably comprise one or more compounds of the formula III-1 b, preferably selected from the group of the compounds of the formulae III-1 b-1 to III-1 b-4, preferably of the formula III-1 b-4,

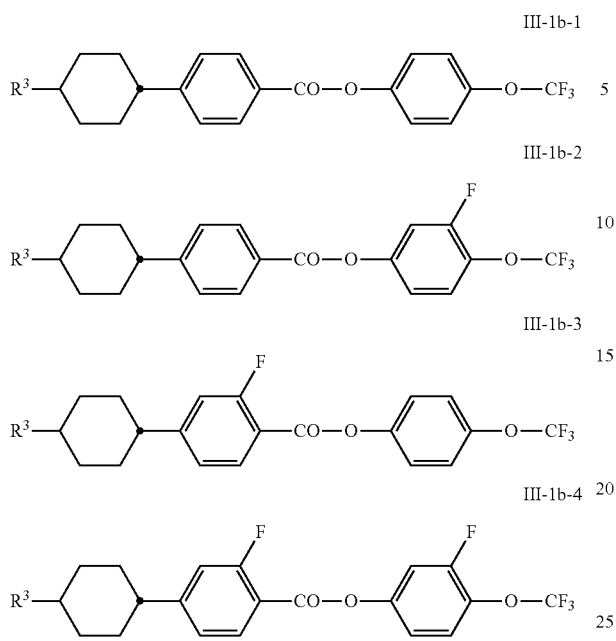

in which R³ has the meaning indicated above.

The media according to the invention preferably comprise one or more compounds of the formula III-2, preferably selected from the group of the compounds of the formulae III-2a to III-2k

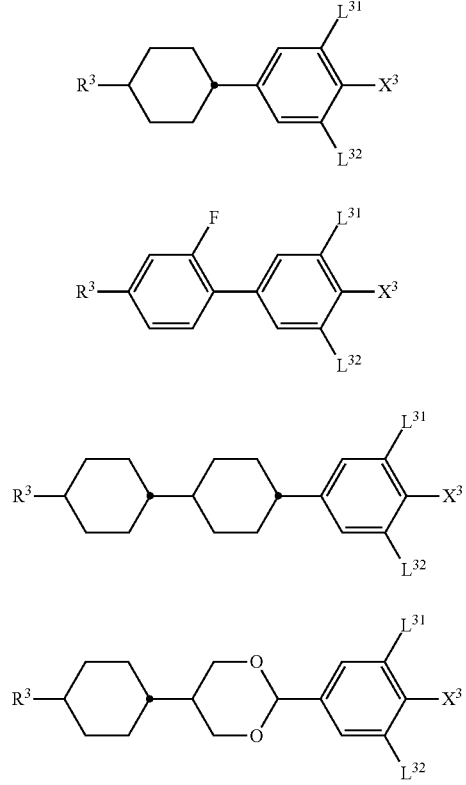

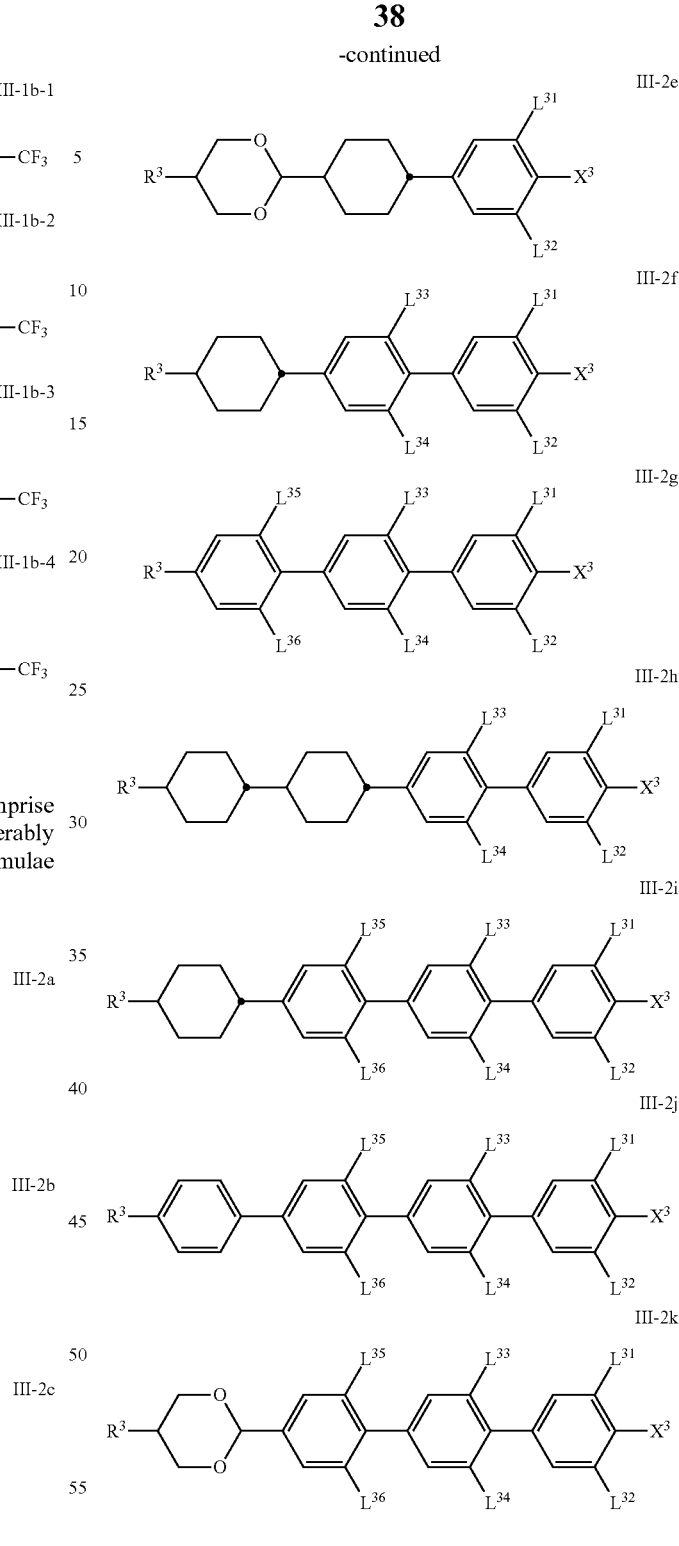

in which the parameters have the meaning given above and preferably in which the parameters have the respective meanings indicated above, and the parameters $L^{33}$, $L^{34}$, $L^{35}$ and $L^{36}$, independently of one another and of the other parameters, denote H or F.

The media according to the invention preferably comprise one or more compounds of the formula III-2a, preferably selected from the group of the compounds of the formulae III-2a-1 to III-2a-5

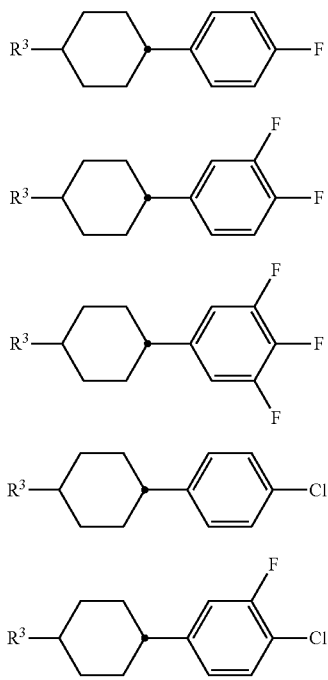

in which R³ has the meaning indicated above.

The media according to the invention preferably comprise one or more compounds of the formula III-2b, preferably selected from the group of the compounds of the formulae III-2b-1 and III-2b-2, preferably of the formula III-2b-2

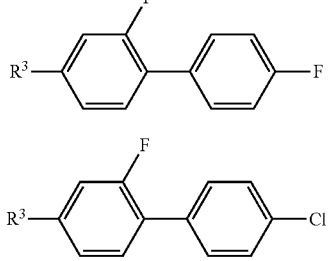

in which R³ has the meaning indicated above.

The media according to the invention preferably comprise one or more compounds of the formula III-2c, preferably selected from the group of the compounds of the formulae III-2c-1 to III-2c-6

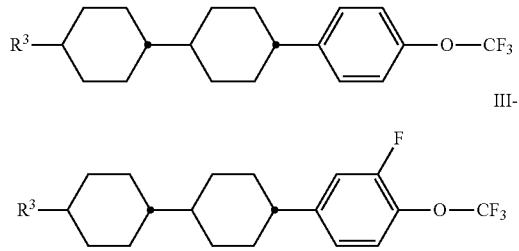

in which R³ has the meaning indicated above, particularly preferably compounds of the formula III-2c-1 and/or III-2c-2 and/or III-2c-4.

The media according to the invention preferably comprise one or more compounds selected from the group of the compounds of the formulae III-2d and III-2e, preferably selected from the group of the compounds of the formulae III-2d-1 and III-2e-1

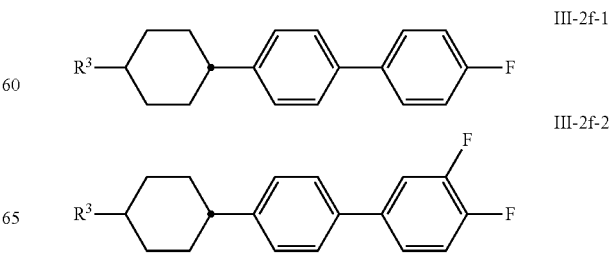

in which R³ has the meaning indicated above.

The media according to the invention preferably comprise one or more compounds of the formula III-2f, preferably selected from the group of the compounds of the formulae III-2f-1 to III-2f-5

-continued

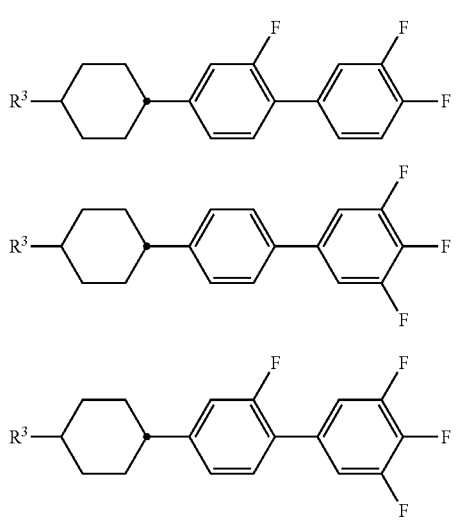

in which R³ has the meaning indicated above.

The media according to the invention preferably comprise one or more compounds of the formula III-2g, preferably selected from the group of the compounds of the formulae III-2g-1 to III-2g-5

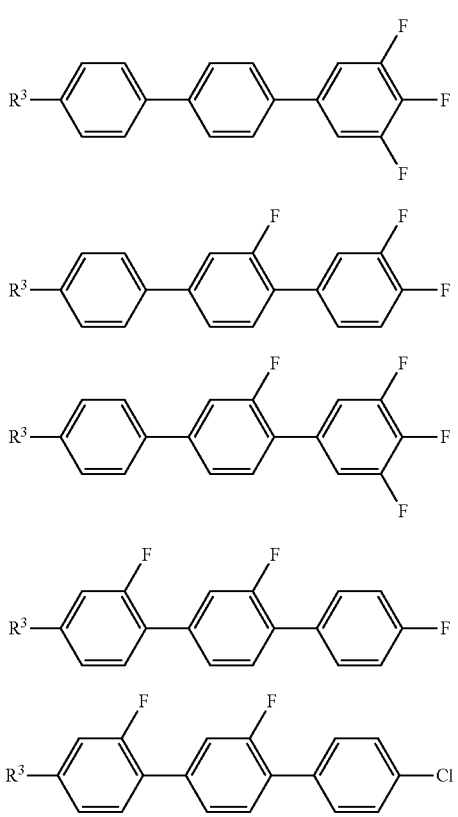

in which R³ has the meaning indicated above.

The media according to the invention preferably comprise one or more compounds of the formula III-2h, preferably selected from the group of the compounds of the formulae III-2h-1 to III-2h-3, preferably of the formula III-2h-3

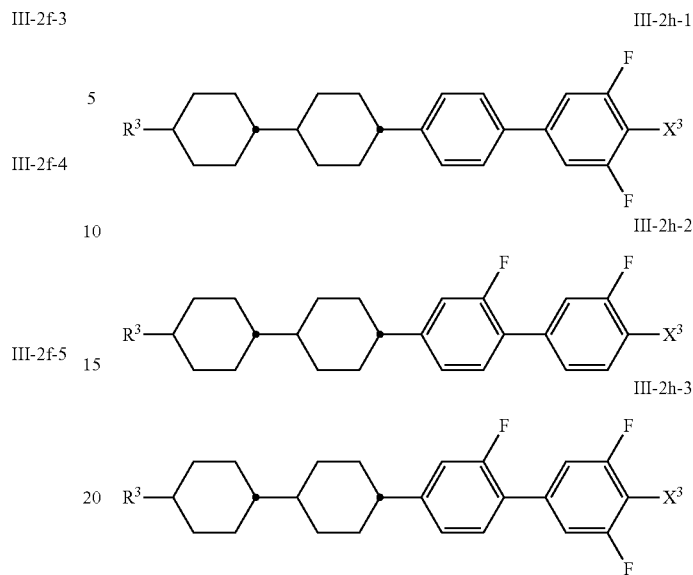

in which the parameters have the meaning given above, and X³ preferably denotes F.

The media according to the invention preferably comprise one or more compounds of the formula III-2i, preferably selected from the group of the compounds of the formulae III-2i-1 and III-2i-2, particularly preferably of the formula III-2i-2

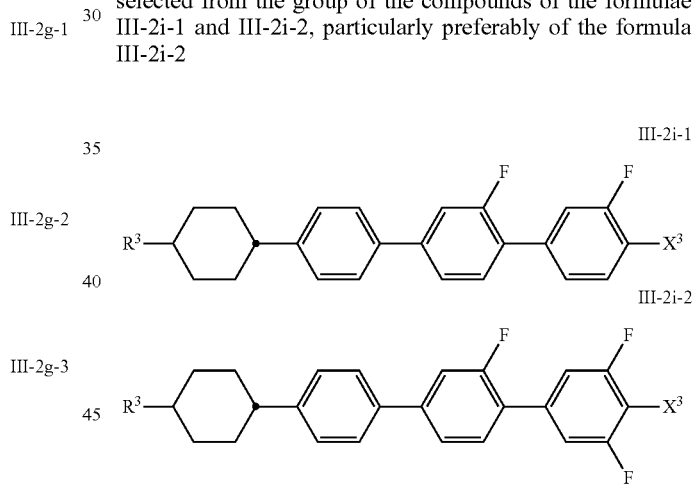

in which the parameters have the meaning given above, and X³ preferably denotes F.

The media according to the invention preferably comprise one or more compounds of the formula III-2j, preferably selected from the group of the compounds of the formulae III-2j-1 and III-2j-2, particularly preferably of the formula III-2j-1

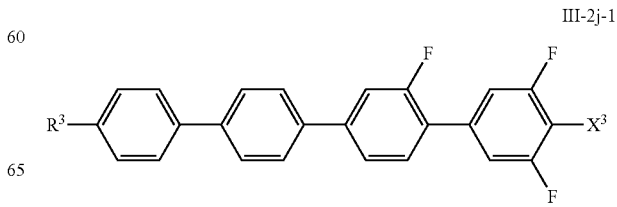

-continued

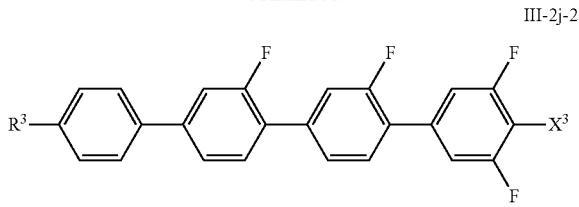

III-2j-2 in which the parameters have the meaning given above.

The media according to the invention preferably comprise one or more compounds of the formula III-2k, preferably of the formula III-2k-1

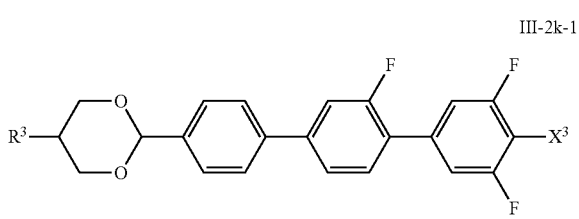

III-2k-1 in which the parameters have the meaning given above and $X^3$ preferably denotes F.

Alternatively or in addition to the compounds of the formulae III-1 and/or III-2, the media according to the present invention may comprise one or more compounds of the formula III-3

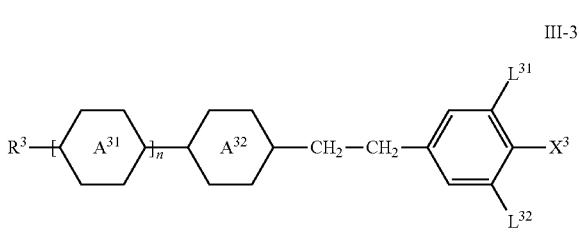

III-3 in which the parameters have the respective meanings indicated above under formula III.

These compounds are preferably selected from the group of the formulae III-3a and III-3b

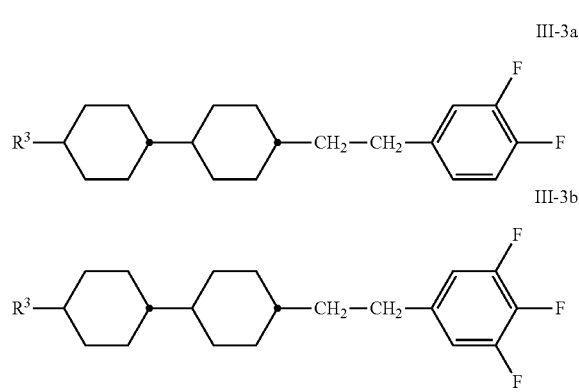

III-3a

III-3b in which $R^3$ has the meaning indicated above.

The liquid-crystalline media according to the present invention preferably comprise a dielectrically neutral component, component C. This component has a dielectric anisotropy in the range from −1.5 to 3. It preferably comprises, more preferably predominantly consists of, even more preferably essentially consists of and especially preferably entirely consists of dielectrically neutral compounds having a dielectric anisotropy in the range from −1.5 to 3. This component preferably comprises one or more dielectrically neutral compounds, more preferably predominantly consists of, even more preferably essentially consists of and very preferably entirely consists of dielectrically neutral compounds of the formula IV having a dielectric anisotropy in the range from −1.5 to 3.

The dielectrically neutral component, component C, preferably comprises one or more compounds selected from the group of the compounds of the formulae IV-1 to IV-8

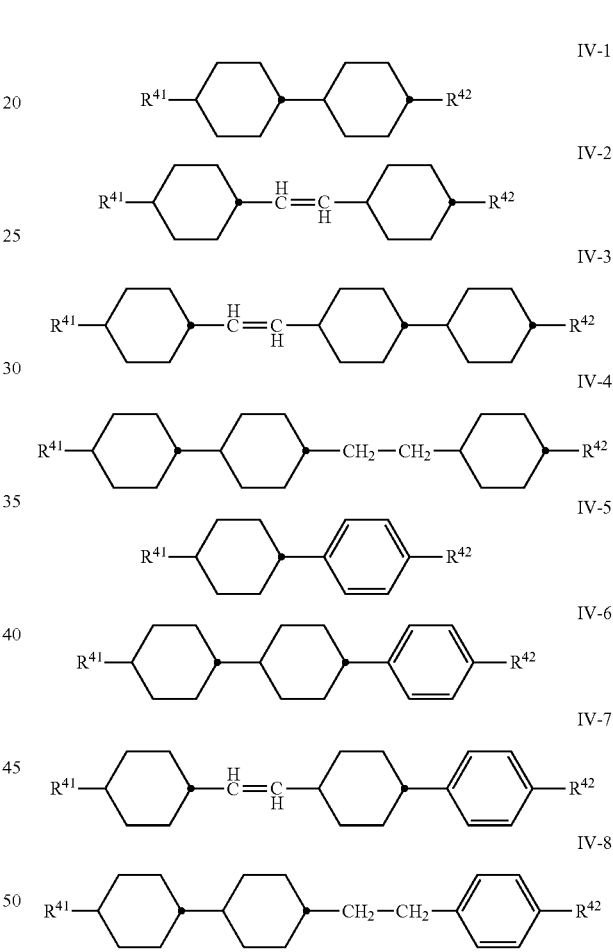

in which $R^{41}$ and $R^{42}$ have the respective meanings indicated above under formula IV, and in formulae IV-1, IV-6 and IV-7 $R^{41}$ preferably denotes alkyl or alkenyl, preferably alkenyl, and $R^{42}$ preferably denotes alkyl or alkenyl, preferably alkyl. In formula IV-2 $R^{41}$ and $R^{42}$ preferably denote alkyl. In formula IV-5 $R^{41}$ preferably denotes alkyl or alkenyl, more preferably alkyl, and $R^{42}$ preferably denotes alkyl, alkenyl or alkoxy, more preferably alkenyl or alkoxy, and in formulae IV-4 and IV-8 $R^{41}$ preferably denotes alkyl and $R^{42}$ preferably denotes alkyl or alkoxy, more preferably alkoxy.

The dielectrically neutral component, component C, preferably comprises one or more compounds selected from the group of the compounds of the formulae IV-1, IV-5, IV-6 and IV-7, preferably one or more compounds of the formula IV-1 and one or more compounds selected from the group of the formulae IV-5 and IV-6, more preferably one or more compounds of each of the formulae IV-1, IV-5 and IV-6 and very preferably one or more compounds of each of the formulae IV-1, IV-5, IV-6 and IV-7.

In a preferred embodiment, the media according to the invention comprise one or more compounds of the formula IV-4, more preferably selected from the respective sub-formulae thereof of the formulae CP-V-n and/or CP-nV-m and/or CP-Vn-m, more preferably of the formulae CP-V-n and/or CP-V2-n and very preferably selected from the group of the formulae CP-V-1 and CP-V2-1. The definitions of these abbreviations (acronyms) are indicated below in Table D or are evident from Tables A to C.

In a preferred embodiment, the media according to the invention comprise one or more compounds of the formula IV-5, more preferably selected from the respective sub-formulae thereof of the formulae CCP-V-n and/or CCP-nV-m and/or CCP-Vn-m, more preferably of the formulae CCP-V-n and/or CCP-V2-n and very preferably selected from the group of the formulae CCP-V-1 and CCP-V2-1. The definitions of these abbreviations (acronyms) are indicated below in Table D or are evident from Tables A to C.

In a likewise preferred embodiment, the media according to the invention comprise one or more compounds of the formula IV-1, more preferably selected from the respective sub-formulae thereof of the formulae CC-n-m, CC-n-V, CC-n-Vm, CC-V-V, CC-V-Vn and/or CC-nV-Vm, more preferably of the formulae CC-n-V and/or CC-n-Vm and very preferably selected from the group of the formulae CC-3-V, CC-4-V, CC-5-V, CC-3-V1, CC-4-V1, CC-5-V1, CC-3-V2 and CC-V-V1. The definitions of these abbreviations (acronyms) are likewise indicated below in Table D or are evident from Tables A to C.

In a further preferred embodiment of the present invention, which may be the same as the previous one or a different one, the liquid-crystal mixtures according to the present invention comprise component C which comprises, preferably predominantly consists of and very preferably entirely consists of compounds of the formula IV selected from the group of the compounds of the formulae IV-1 to IV-8 as shown above and optionally of the formulae IV-9 to IV-15

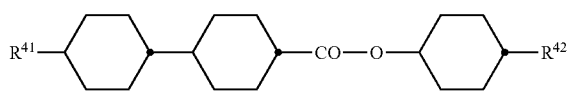
IV-9

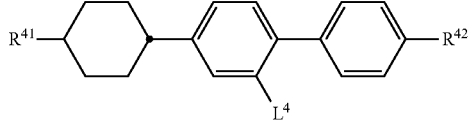
IV-10

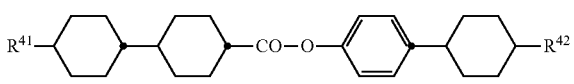
IV-11

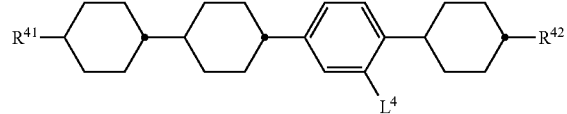
IV-12

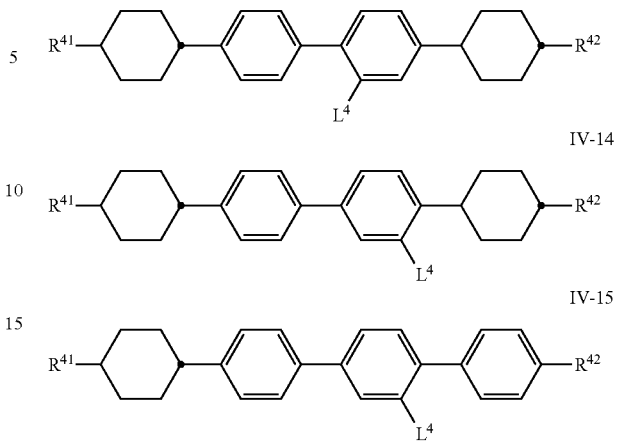
IV-13

IV-14

IV-15 in which $R^{41}$ and $R^{42}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and $L^4$ denotes H or F.

In a preferred embodiment, the media according to the invention comprise one or more compounds of the formula IV-10, more preferably selected from the respective sub-formulae thereof of the formulae CPP-3-2, CPP-5-2 and CGP-3-2, more preferably of the formulae CPP-3-2 and/or CGP-3-2 and very particularly preferably of the formula CPP-3-2. The definitions of these abbreviations (acronyms) are indicated below in Table D or are evident from Tables A to C.

The liquid-crystalline media according to the present invention preferably comprise one or more compounds of the formula V

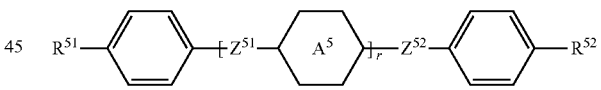
V in which $R^{51}$ and $R^{52}$, independently of one another, have the meaning indicated for $R^2$ under formula II above, preferably $R^{51}$ denotes alkyl and $R^{52}$ denotes alkyl or alkenyl,

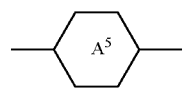

if it occurs twice in each case independently of one another on each occurrence, denotes

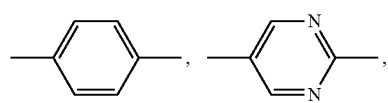

-continued

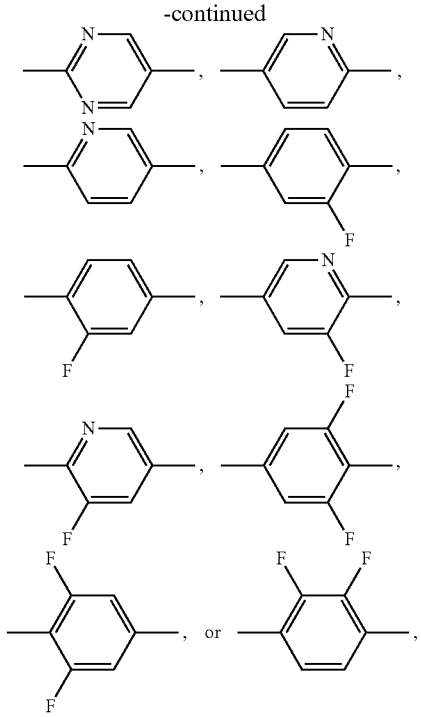

preferably one or more of

denote

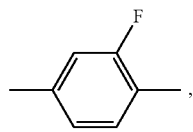

$Z^{51}$ and $Z^{52}$, independently of one another and, if $Z^{51}$ occurs twice, also these independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond, and r denotes 0, 1 or 2, preferably 0 or 1, particularly preferably 1.

The compounds of the formula V are preferably dielectrically neutral compounds having a dielectric anisotropy in the range from −1.5 to 3.

The media according to the invention preferably comprise one or more compounds selected from the group of the compounds of the formulae V-1 and V-2

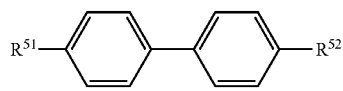

-continued

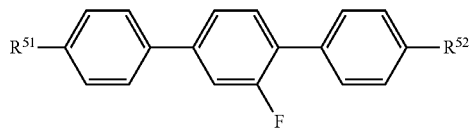

in which $R^{51}$ and $R^{52}$ have the respective meanings indicated above under formula V, and $R^{51}$ preferably denotes alkyl, and in formula V-1 $R^{52}$ preferably denotes alkenyl, preferably —(CH$_2$)$_2$—CH=CH—CH$_3$, and in formula V-2 $R^{52}$ preferably denotes alkyl or alkenyl, preferably —CH=CH$_2$, —(CH$_2$)$_2$—CH=CH$_2$ or —(CH$_2$)$_2$—CH=CH—CH$_3$.

The media according to the invention preferably comprise one or more compounds selected from the group of the compounds of the formulae V-1 and V-2 in which $R^{51}$ preferably denotes n-alkyl, and in formula V-1 $R^{52}$ preferably denotes alkenyl, and in formula V-2 $R^{52}$ preferably denotes n-alkyl.

In a preferred embodiment, the media according to the invention comprise one or more compounds of the formula V-1, more preferably of the sub-formula PP-n-2Vm thereof, even more preferably of the formula PP-1-2V1. The definitions of these abbreviations (acronyms) are indicated below in Table D or are evident from Tables A to C.

In a preferred embodiment, the media according to the invention comprise one or more compounds of the formula V-2, more preferably of the sub-formulae PGP-n-m, PGP-n-V, PGP-n-2Vm, PGP-n-2V and PGP-n-2Vm thereof, even more preferably of the sub-formulae PGP-3-m, PGP-n-2V and PGP-n-V1 thereof, very preferably selected from the formulae PGP-3-2, PGP-3-3, PGP-3-4, PGP-3-5, PGP-1-2V, PGP-2-2V and PGP-3-2V. The definitions of these abbreviations (acronyms) are likewise indicated below in Table D or are evident from Tables A to C.

Alternatively or in addition to the compounds of the formulae II and/or III, the media according to the present invention may comprise one or more dielectrically positive compounds of the formula VI

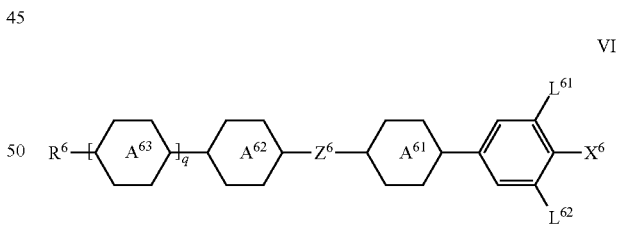

in which $R^6$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

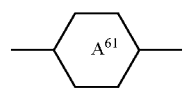

to

independently of one another, denote

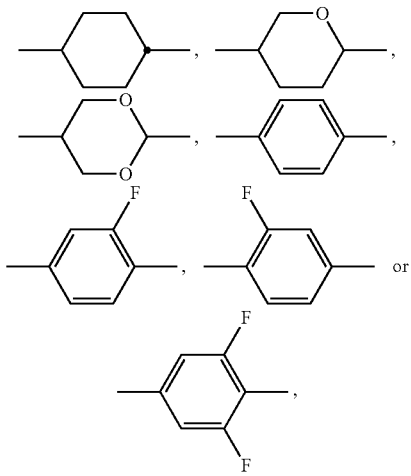

$L^{61}$ and $L^{62}$, independently of one another, denote H or F, preferably $L^{61}$ denotes F, $X^6$ denotes halogen, halogenated alkyl or alkoxy having 1 to 3 C atoms or halogenated alkenyl or alkenyloxy having 2 or 3 C atoms, preferably F, Cl, —OCF$_3$ or —CF$_3$, very preferably F, Cl or —OCF$_3$, $Z^6$ denotes —CH$_2$CH$_2$—, —CF$_2$CF$_2$—, —COO—, trans-CH=CH—, trans-CF=CF—, —CH$_2$O— or —CF$_2$O—, preferably —CH$_2$CH$_2$—, —COO— or trans-CH=CH— and very preferably —COO— or trans-CH=CH—, and q denotes 0 or 1.

The media according to the present invention preferably comprise one or more compounds of the formula VI, preferably selected from the group of the compounds of the formulae VI-1 and VI-2

VI-1

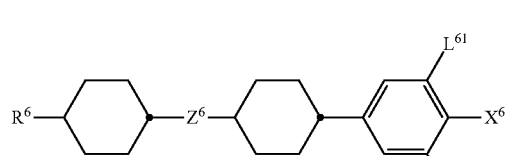

VI-2

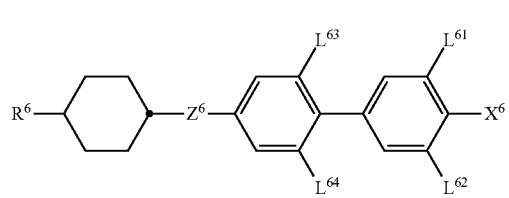

in which the parameters have the respective meanings indicated above, and the parameters $L^{63}$ and $L^{64}$, independently of one another and of the other parameters, denote H or F, and $Z^6$ preferably denotes —CH$_2$—CH$_2$—.

The compounds of the formula VI-1 are preferably selected from the group of the compounds of the formulae VI-1a and VI-1b VI-1a

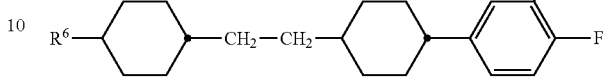

VI-1b

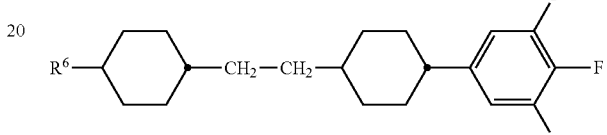

in which $R^6$ has the meaning indicated above.

The compounds of the formula VI-2 are preferably selected from the group of the compounds of the formulae VI-2a to VI-2d VI-2a

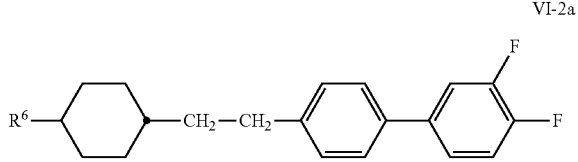

VI-2b

VI-2c

VI-2d

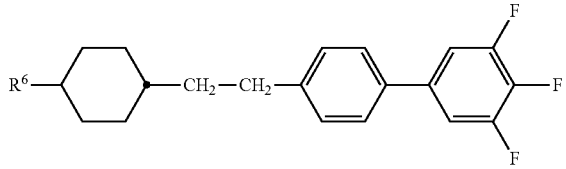

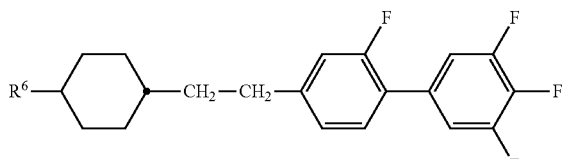

in which $R^6$ has the meaning indicated above.

In addition, the liquid-crystal media according to the present invention may comprise one or more compounds of the formula VII

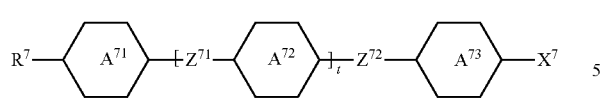 VII in which
R⁷ has the meaning indicated for R² above under formula one of the rings

to

that is present denotes

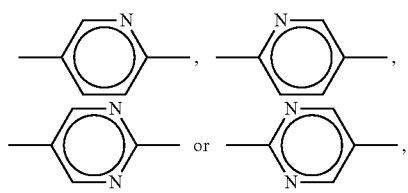

preferably

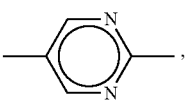

preferably

denotes

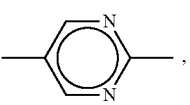

and the others have the same meaning or, independently of one another, denote

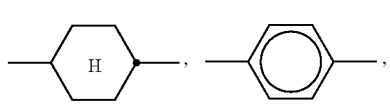

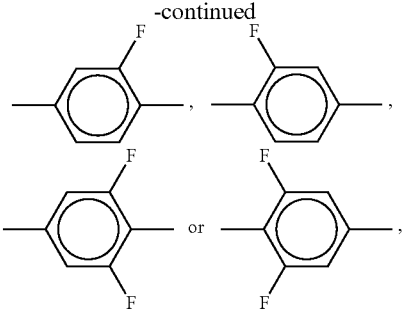

preferably

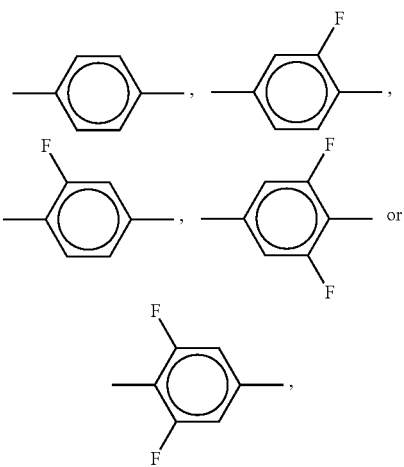

$Z^{71}$ and $Z^{72}$, independently of one another, denote —CH₂CH₂—, —COO—, trans-CH=CH—, trans-CF=CF—, —CH₂O—, —CF₂O— or a single bond, preferably one or more of them denote(s) a single bond and very preferably both denote a single bond,
t denotes 0, 1 or 2, preferably 0 or 1, more preferably 1, and
$X^7$ has the meaning indicated for $X^2$ above under formula II or alternatively, independently of $R^7$, may have one of the meanings indicated for $R^7$.

The compounds of the formula VII are preferably dielectrically positive compounds.

In addition, the liquid-crystal media according to the present invention may comprise one or more compounds of the formula VIII

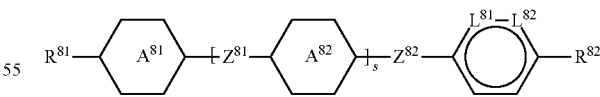 VIII in which
$R^{81}$ and $R^{82}$, independently of one another, have the meaning indicated for $R^2$ above under formula II, and

denotes

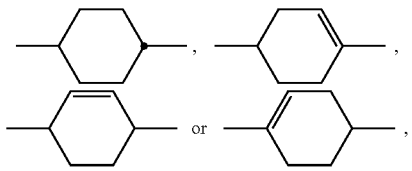

preferably

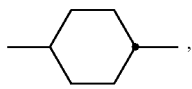

denotes

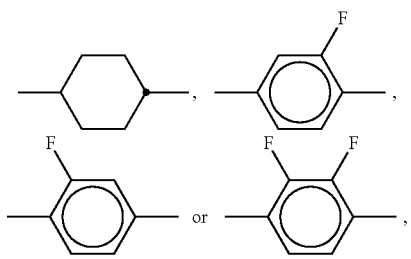

$Z^{81}$ and $Z^{82}$, independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond and very preferably both denote a single bond, $L^{81}$ and $L^{82}$, independently of one another, denote C—F or N, preferably one of $L^{81}$ and $L^{82}$ or both denote(s) C—F and very preferably both denote C—F, and s denotes 0 or 1.

The compounds of the formula VIII are preferably dielectrically negative compounds.

The media according to the invention preferably comprise one or more compounds of the formula VIII, preferably selected from the group of the compounds of the formulae VIII-1 to VIII-3

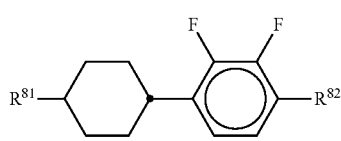 VIII-1

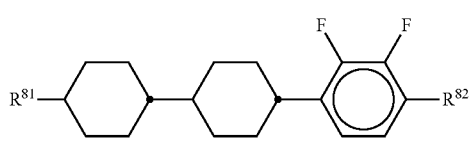 VIII-2

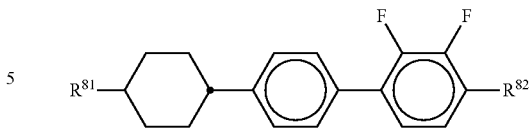 VIII-3 in which $R^{81}$ and $R^{82}$ have the respective meanings indicated above under formula VIII.

In formulae VIII-1 to VIII-3, $R^{81}$ preferably denotes n-alkyl or 1-E-alkenyl and $R^{82}$ preferably denotes n-alkyl or alkoxy.

The liquid-crystalline media according to the present invention preferably comprise one or more compounds selected from the group of the compounds of the formulae I to VIII, preferably of the formulae I to VII and more preferably of the formulae I and II and/or III and/or IV and/or VI. They particularly preferably predominantly consist of, even more preferably essentially consist of and very preferably entirely consist of these compounds.

In this application, "comprise" in connection with compositions means that the entity in question, i.e. the medium or the component, comprises the component or components or compound or compounds indicated, preferably in a total concentration of 10% or more and very preferably 20% or more.

In this connection, "predominantly consist of" means that the entity in question comprises 55% or more, preferably 60% or more and very preferably 70% or more of the component or components or compound or compounds indicated.

In this connection, "essentially consist of" means that the entity in question comprises 80% or more, preferably 90% or more and very preferably 95% or more of the component or components or compound or compounds indicated.

In this connection, "virtually completely consist of" or "entirely consist of" means that the entity in question comprises 98% or more, preferably 99% or more and very preferably 100% of the component or components or compound or compounds indicated.

Other mesogenic compounds which are not explicitly mentioned above can optionally and advantageously also be used in the media according to the present invention. Such compounds are known to the person skilled in the art.

The liquid-crystal media according to the present invention preferably have a clearing point of 70° C. or more, more preferably 75° C. or more, particularly preferably 80° C. or more and very particularly preferably 85° C. or more.

The nematic phase of the media according to the invention preferably extends at least from 0° C. or less to 70° C. or more, more preferably at least from −20° C. or less to 75° C. or more, very preferably at least from −30° C. or less to 75° C. or more and in particular at least from −40° C. or less to 80° C. or more.

The Δε of the liquid-crystal medium according to the invention, at 1 kHz and 20° C., is preferably 2 or more, more preferably 3 or more, even more preferably 4 or more and very preferably 6 or more. Δε is preferably 30 or less, Δε is particularly preferably 20 or less.

The Δn of the liquid-crystal media according to the present invention, at 589 nm (Na$^D$) and 20° C., is preferably in the range from 0.070 or more to 0.150 or less, more preferably in the range from 0.080 or more to 0.140 or less, even more preferably in the range from 0.090 or more to 0.135 or less and very particularly preferably in the range from 0.100 or more to 0.130 or less.

In a first preferred embodiment of the present application, the Δn of the liquid-crystal media according to the present invention is preferably 0.080 or more to 0.120 or less, more preferably in the range from 0.090 or more to 0.110 or less and very particularly preferably in the range from 0.095 or more to 0.105 or less, while Δε is preferably in the range from 6 or more to 11 or less, preferably in the range from 7 or more to 10 or less and particularly preferably in the range from 8 or more to 9 or less.

In this embodiment, the nematic phase of the media according to the invention preferably extends at least from −20° C. or less to 70° C. or more, more preferably at least from −20° C. or less to 70° C. or more, very preferably at least from −30° C. or less to 70° C. or more and in particular at least from −40° C. or less to 70° C. or more.

In a second preferred embodiment of the present application, the Δn of the liquid-crystal media according to the present invention is preferably in the range from 0.100 or more to 0.140 or less, more preferably in the range from 0.110 or more to 0.130 or less and very particularly preferably in the range from 0.115 or more to 0.125 or less, while Δε is preferably in the range from 7 or more to 13 or less, preferably in the range from 9 or more to 20 or less and particularly preferably in the range from 10 or more to 17 or less.

In this embodiment, the nematic phase of the media according to the invention preferably extends at least from −20° C. or less to 80° C. or more, more preferably at least from −20° C. or less to 85° C. or more, very preferably at least from −30° C. or less to 80° C. or more and in particular at least from −40° C. or less to 85° C. or more.

In accordance with the present invention, the compounds of the formula I and/or TINUVIN 770® together are preferably used in the media in a total concentration of 1% to 50%, more preferably 1% to 30%, more preferably 2% to 30%, more preferably 3% to 30% and very preferably 5% to 25% of the mixture as a whole.

The compounds selected from the group of the formulae II and III are preferably used in a total concentration of 2% to 60%, more preferably 3% to 35%, even more preferably 4% to 20% and very preferably 5% to 15% of the mixture as a whole.

The compounds of the formula IV are preferably used in a total concentration of 5% to 70%, more preferably 20% to 65%, even more preferably 30% to 60% and very preferably 40% to 55% of the mixture as a whole.

The compounds of the formula V are preferably used in a total concentration of 0% to 30%, more preferably 0% to 15% and very preferably 1% to 10% of the mixture as a whole.

The compounds of the formula VI are preferably used in a total concentration of 0% to 50%, more preferably 1% to 40%, even more preferably 5% to 30% and very preferably 10% to 20% of the mixture as a whole.

The media according to the invention may optionally comprise further liquid-crystal compounds in order to adjust the physical properties. Such compounds are known to the person skilled in the art. Their concentration in the media according to the present invention is preferably 0% to 30%, more preferably 0.1% to 20% and very preferably 1% to 15%.

In a preferred embodiment, the concentration of the compound of the formula CC-3-V in the media according to the invention can be 50% to 65%, particularly preferably 55% to 60%.

The liquid-crystal media preferably comprise in total 50% to 100%, more preferably 70% to 100% and very preferably 80% to 100% and in particular 90% to 100% of the compounds of the formulae I to VII, preferably selected from the group of the compounds of the formulae IA, IB and II to VI, particularly preferably of the formulae I to V, in particular of the formulae IA, IB, II, III, IV, V and VII and very particularly preferably of the formulae IA, IB, II, III, IV and V. They preferably predominantly consist of and very preferably virtually completely consist of these compounds. In a preferred embodiment, the liquid-crystal media in each case comprise one or more compounds of each of these formulae.

In the present application, the expression dielectrically positive describes compounds or components where Δε>3.0, dielectrically neutral describes those where −1.5≤Δε≤3.0 and dielectrically negative describes those where Δε<−1.5. Δε is determined at a frequency of 1 kHz and at 20° C.

The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

Δε is defined as $(\varepsilon_\| - \varepsilon_\perp)$, while $\varepsilon_{av}$, is $(\varepsilon_\| + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The ranges of the parameters indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are indicated in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy (Δn) is determined at a wavelength of 589.3 nm. The dielectric anisotropy (Δε) is determined at a frequency of 1 kHz. The threshold voltages, as well as all other electro-optical properties, are determined using test cells produced at Merck KGaA, Germany. The test cells for the determination of Δε have a cell thickness of approximately 20 μm. The electrode is a circular ITO electrode having an area of 1.13 cm² and a guard ring. The orientation layers are SE-1211 from Nissan Chemicals, Japan, for homeotropic orientation ($\varepsilon_\parallel$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystal media according to the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures.

By addition of suitable additives, the liquid-crystal media according to the present invention can be modified in such a way that they can be used in all known types of liquid-crystal displays, either using the liquid-crystal media as such, such as TN, TN-AMD, ECB-AMD, VAN-AMD, IPS-AMD, FFS-AMD LCDs, or in composite systems, such as PDLC, NCAP, PN LCDs and especially in ASM-PA LCDs.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

| Code | Structure |
|---|---|
| C | cyclohexane ring |
| P | 1,4-phenylene ring |
| D | 1,3-dioxane ring |
| DI | 1,3-dioxane ring (isomer) |
| A | tetrahydropyran ring |
| AI | tetrahydropyran ring (isomer) |
| G | 2-fluoro-1,4-phenylene ring |
| GI | 3-fluoro-1,4-phenylene ring |
| U | 2,3-difluoro-1,4-phenylene ring |
| UI | 2,5-difluoro-1,4-phenylene ring |

TABLE A-continued
Ring elements
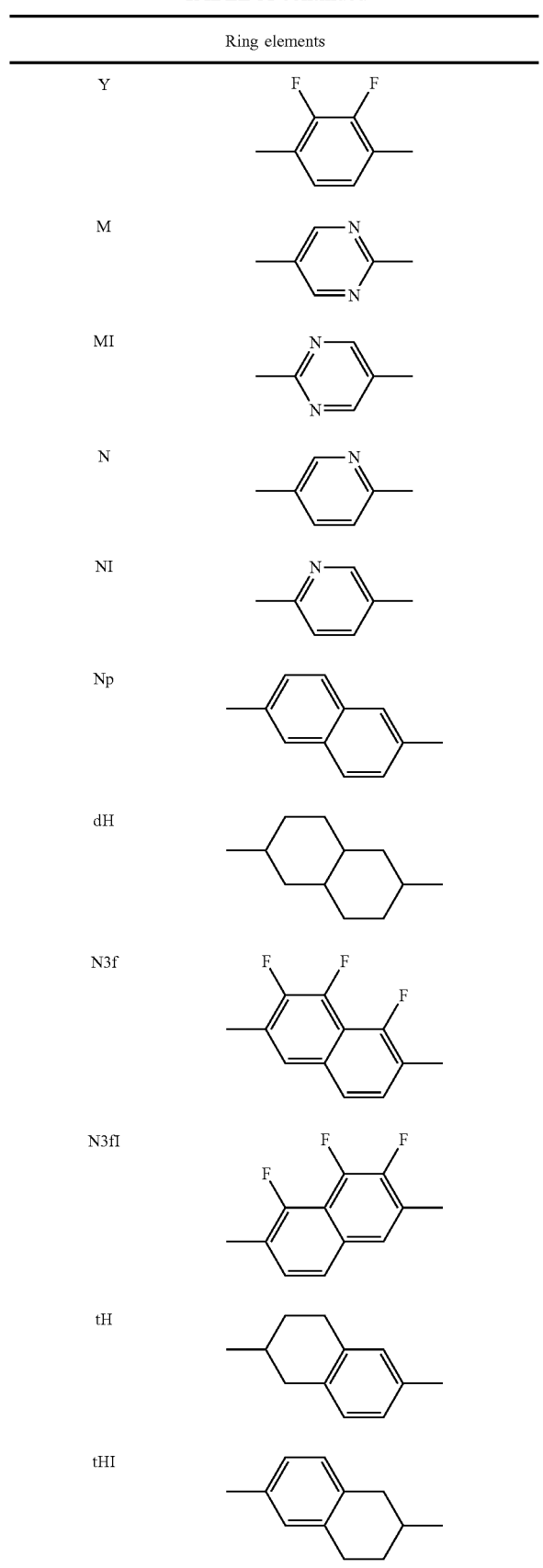
TABLE A-continued
Ring elements
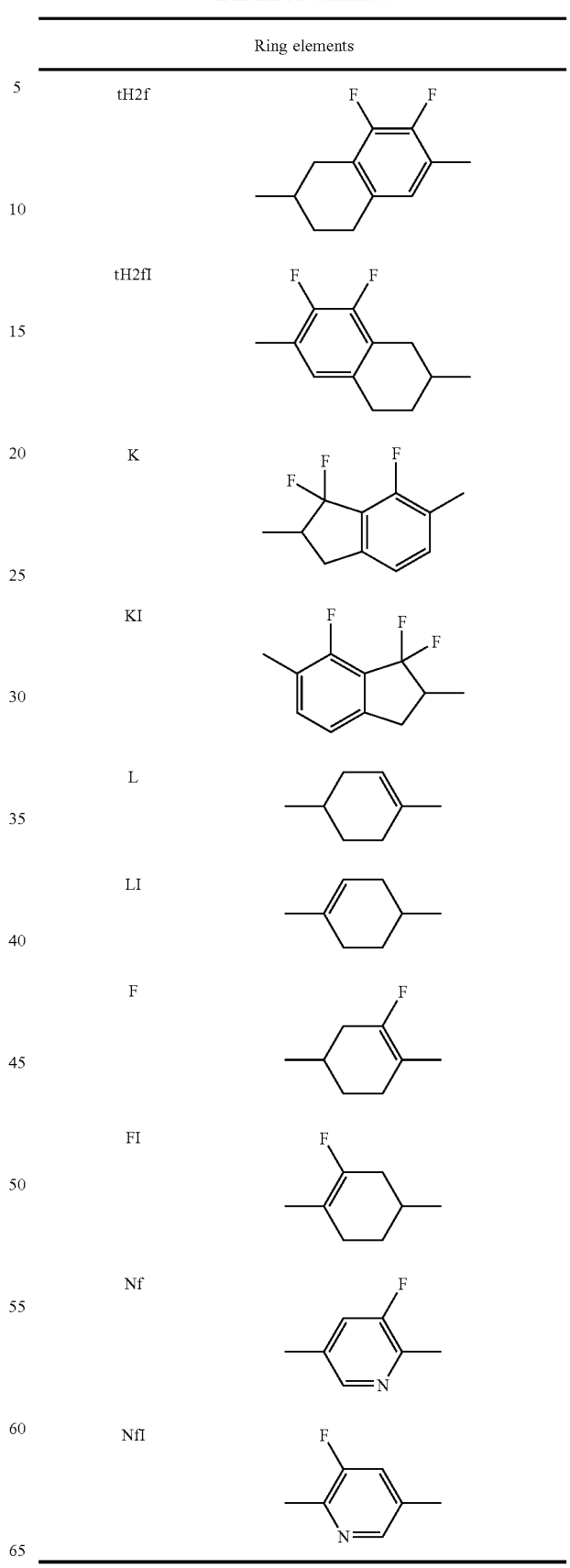

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |

TABLE B-continued

Linking groups

| | | | |
|---|---|---|---|
| B | —CF=CF— | Q | —CF$_2$—O— |
| T | —C≡C— | QI | —O—CF$_2$— |
| W | —CF$_2$CF$_2$— | T | —C≡C— |

TABLE C

End groups

| Left-hand side | | Right-hand side | |
|---|---|---|---|
| Use alone | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Use together with one another and with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

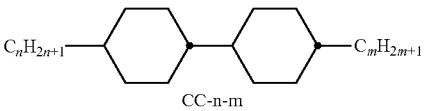

CC-n-m

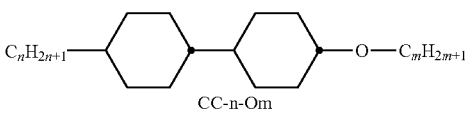

CC-n-Om

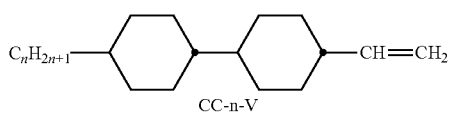

CC-n-V

TABLE D-continued

| Illustrative structures |
|---|

$C_nH_{2n+1}$—⬡—⬡—CH=CH—$C_mH_{2m+1}$
CC-n-Vm $C_nH_{2n+1}$—⬡—⬡—$(CH_2)_m$—CH=$CH_2$
CC-n-mV $C_nH_{2n+1}$—⬡—⬡—$(CH_2)_m$—CH=CH—$C_lH_{2l+1}$
CC-n-mVl $H_2C$=CH—⬡—⬡—CH=$CH_2$
CC-V-V $CH_2$=CH—⬡—⬡—$(CH_2)_m$—CH=$CH_2$
CC-V-mV $CH_2$=CH—⬡—⬡—CH=CH—$C_mH_{2m+1}$
CC-V-Vm $CH_2$=CH—$(CH_2)_n$—⬡—⬡—$(CH_2)_m$—CH=$CH_2$
CC-Vn-mV $C_nH_{2n+1}$—CH=CH—⬡—⬡—$(CH_2)_m$—CH=$CH_2$
CC-nV-mV $C_nH_{2n+1}$—CH=CH—⬡—⬡—CH=CH—$C_mH_{2m+1}$
CC-nV-Vm $C_nH_{2n+1}$—⬡—⌬—$C_mH_{2m+1}$
CP-n-m $C_nH_{2n+1}$O—⬡—⌬—$C_mH_{2m+1}$
CP-nO-m $C_nH_{2n+1}$—⬡—⌬—O$C_mH_{2m+1}$
CP-n-Om $CH_2$=CH—⬡—⌬—$C_mH_{2m+1}$
CP-V-m

TABLE D-continued
Illustrative structures
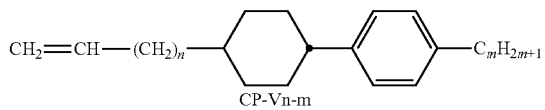
CP-Vn-m
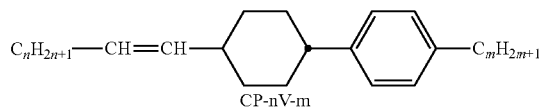
CP-nV-m
CP-V-V
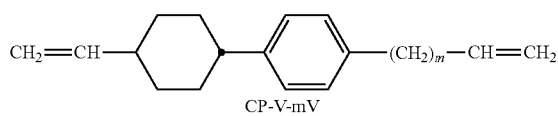
CP-V-mV
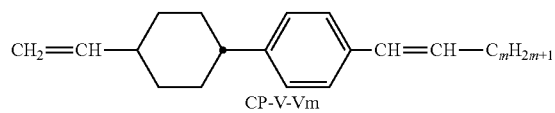
CP-V-Vm
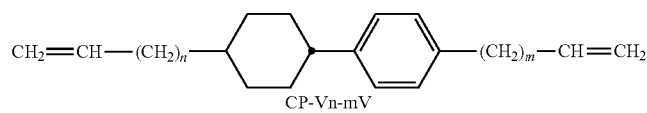
CP-Vn-mV
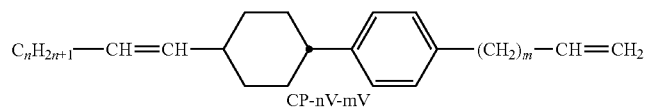
CP-nV-mV
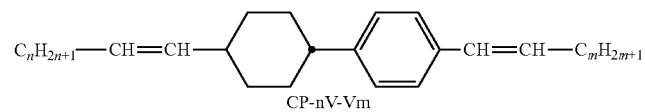
CP-nV-Vm
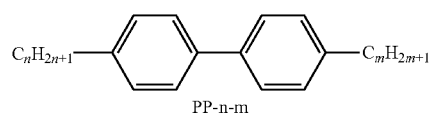
PP-n-m
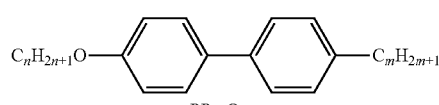
PP-nO-m
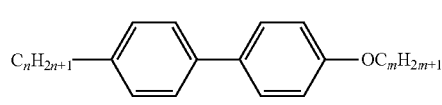
PP-n-Om
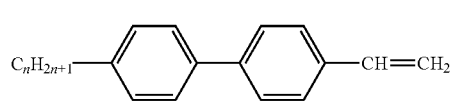
PP-n-V
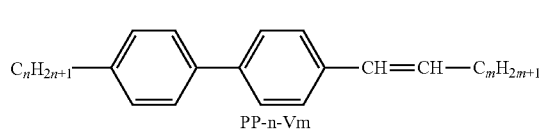
PP-n-Vm TABLE D-continued

| Illustrative structures |
| --- |
| $C_nH_{2n+1}$—[phenyl]—[phenyl]—$(C_mH_{2m})$—CH=CH$_2$<br>PP-n-mV |
| $C_nH_{2n+1}$—[phenyl]—[phenyl]—$(CH_2)_m$—CH=CH—$C_lH_{2l+1}$<br>PP-n-mVI |
| $C_nH_{2n+1}$—[cyclohexyl]—[cyclohexyl]—[phenyl]—$C_mH_{2m+1}$<br>CCP-n-m |
| $C_nH_{2n+1}$O—[cyclohexyl]—[cyclohexyl]—[phenyl]—$C_mH_{2m+1}$<br>CCP-nO-m |
| $C_nH_{2n+1}$—[cyclohexyl]—[cyclohexyl]—[phenyl]—O$C_mH_{2m+1}$<br>CCP-n-Om |
| $C_nH_{2n+1}$—[cyclohexyl]—[cyclohexyl]—[phenyl]—CH=CH$_2$<br>CCP-n-V |
| $C_nH_{2n+1}$—[cyclohexyl]—[cyclohexyl]—[phenyl]—CH=CH—$C_mH_{2m+1}$<br>CCP-n-Vm |
| $C_nH_{2n+1}$—[cyclohexyl]—[cyclohexyl]—[phenyl]—$(C_mH_{2m})$—CH=CH$_2$<br>CCP-n-mV |
| $C_nH_{2n+1}$—[cyclohexyl]—[cyclohexyl]—[phenyl]—$(C_mH_{2m})$—CH=CH—$C_lH_{2l+1}$<br>CCP-n-mVI |
| H$_2$C=CH—[cyclohexyl]—[cyclohexyl]—[phenyl]—$C_mH_{2m+1}$<br>CCP-V-m |
| $C_nH_{2n+1}$—CH=CH—[cyclohexyl]—[cyclohexyl]—[phenyl]—$C_mH_{2m+1}$<br>CCP-nV-m |
| CH$_2$=CH—$(CH_2)_n$—[cyclohexyl]—[cyclohexyl]—[phenyl]—$C_mH_{2m+1}$<br>CCP-Vn-m |
| $C_nH_{2n+1}$—CH=CH—$(CH_2)_m$—[cyclohexyl]—[cyclohexyl]—[phenyl]—$C_lH_{2l+1}$<br>CCP-nVm-I |

TABLE D-continued

Illustrative structures $C_nH_{2n+1}$—[Cy]—[Ph]—[Ph]—$C_mH_{2m+1}$
CPP-n-m $C_nH_{2n+1}$—[Cy]—[Ph]—[Ph(F)]—$C_mH_{2m+1}$
CPG-n-m $C_nH_{2n+1}$—[Cy]—[Ph(F)]—[Ph]—$C_mH_{2m+1}$
CGP-n-m $C_nH_{2n+1}O$—[Cy]—[Ph]—[Ph]—$C_mH_{2m+1}$
CPP-nO-m $C_nH_{2n+1}$—[Cy]—[Ph]—[Ph]—$OC_mH_{2m+1}$
CPP-n-Om $H_2C=CH$—[Cy]—[Ph]—[Ph]—$C_mH_{2m+1}$
CPP-V-m $C_nH_{2n+1}$—CH=CH—[Cy]—[Ph]—[Ph]—$C_mH_{2m+1}$
CPP-nV-m $CH_2=CH$—$(C_nH_{2n})$—[Cy]—[Ph]—[Ph]—$C_mH_{2m+1}$
CPP-Vn-m $C_nH_{2n+1}$—CH=CH—$(C_mH_{2m})$—[Cy]—[Ph]—[Ph]—$C_lH_{2l+1}$
CPP-nVm-l $C_nH_{2n+1}$—[Ph]—[Ph(F)]—[Ph]—$C_mH_{2m+1}$
PGP-n-m $C_nH_{2n+1}$—[Ph]—[Ph(F)]—[Ph]—$CH=CH_2$
PGP-n-V TABLE D-continued

| Illustrative structures |
|---|

$C_nH_{2n+1}$—[phenyl]—[phenyl-F]—[phenyl]—CH=CH—$C_mH_{2m+1}$
PGP-n-Vm $C_nH_{2n+1}$—[phenyl]—[phenyl-F]—[phenyl]—$(CH_2)_m$—CH=$CH_2$
PGP-n-mV $C_nH_{2n+1}$—[phenyl]—[phenyl-F]—[phenyl]—$(CH_2)_m$—CH=CH—$C_lH_{2l+1}$
PGP-n-mVI $C_nH_{2n+1}$—[cyclohexyl]—[cyclohexyl]—$CH_2$—$CH_2$—[cyclohexyl]—$C_mH_{2m+1}$
CCEC-n-m $C_nH_{2n+1}$—[cyclohexyl]—[cyclohexyl]—$CH_2$—$CH_2$—[cyclohexyl]—O—$C_mH_{2m+1}$
CCEC-n-Om $C_nH_{2n+1}$—[cyclohexyl]—[cyclohexyl]—$CH_2$—$CH_2$—[phenyl]—$C_mH_{2m+1}$
CCEP-n-m $C_nH_{2n+1}$—[cyclohexyl]—[cyclohexyl]—$CH_2$—$CH_2$—[phenyl]—O—$C_mH_{2m+1}$
CCEP-n-Om $C_nH_{2n+1}$—[cyclohexyl]—[phenyl]—[phenyl]—[cyclohexyl]—$C_mH_{2m+1}$
CPPC-n-m $C_nH_{2n+1}$—[cyclohexyl]—[phenyl-F]—[phenyl]—[cyclohexyl]—$C_mH_{2m+1}$
CGPC-n-m $C_nH_{2n+1}$—[cyclohexyl]—[cyclohexyl]—[phenyl]—[cyclohexyl]—$C_mH_{2m+1}$
CCPC-n-m $C_nH_{2n+1}$—[cyclohexyl]—[cyclohexyl]—CO—O—[phenyl]—[cyclohexyl]—$C_mH_{2m+1}$
CCZPC-n-m TABLE D-continued
Illustrative structures
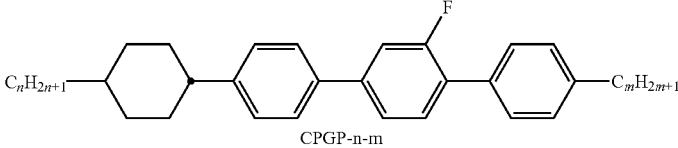
CPGP-n-m
CPGP-n-mV
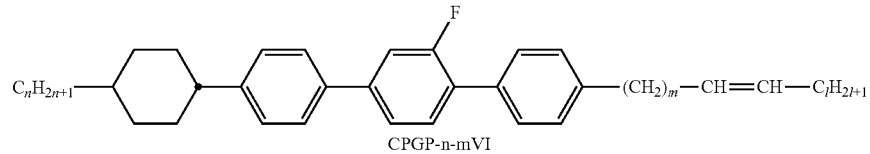
CPGP-n-mVI
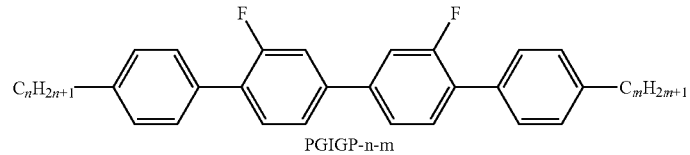
PGIGP-n-m
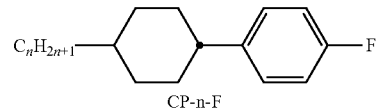
CP-n-F
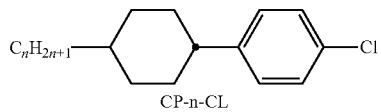
CP-n-CL
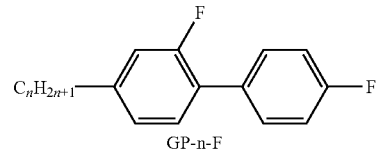
GP-n-F
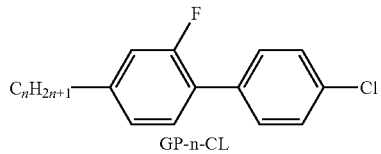
GP-n-CL
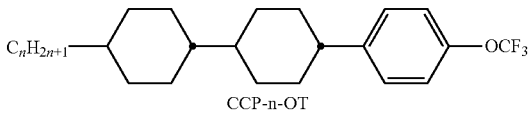
CCP-n-OT
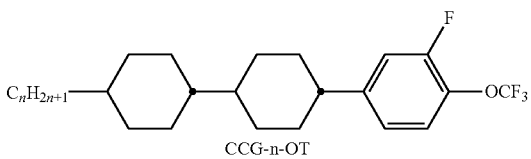
CCG-n-OT TABLE D-continued
Illustrative structures
CCP-n-T
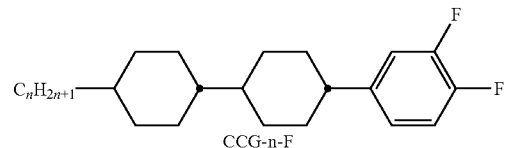
CCG-n-F
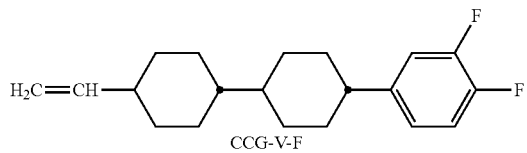
CCG-V-F
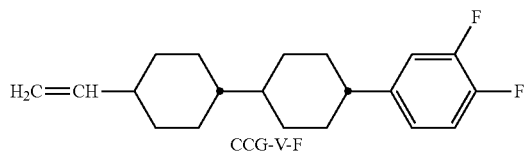
CCG-V-F
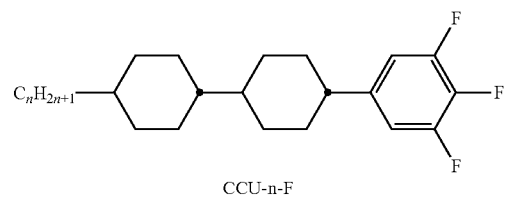
CCU-n-F
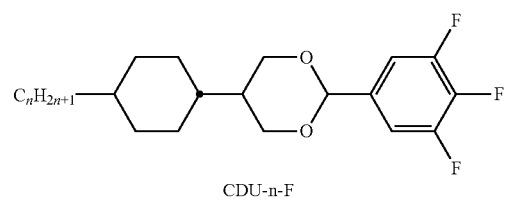
CDU-n-F
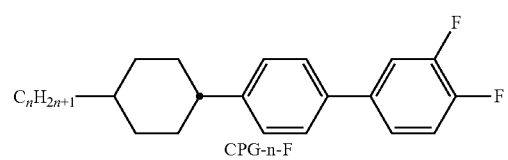
CPG-n-F
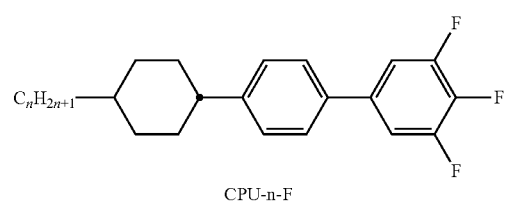
CPU-n-F
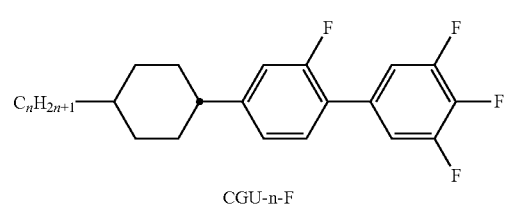
CGU-n-F TABLE D-continued
Illustrative structures
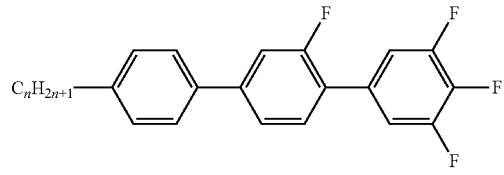
PGU-n-F
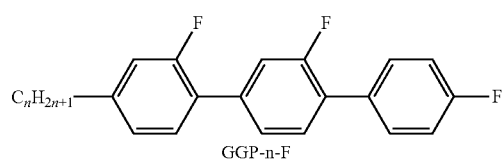
GGP-n-F
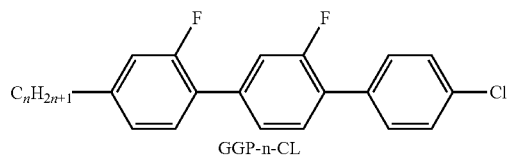
GGP-n-CL
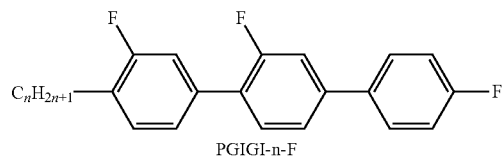
PGIGI-n-F
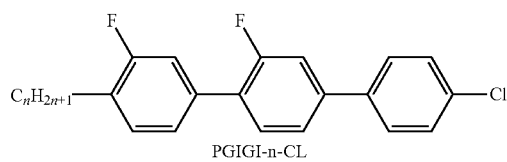
PGIGI-n-CL
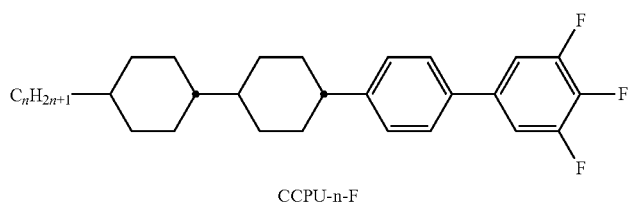
CCPU-n-F
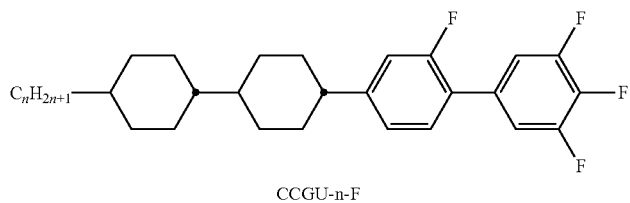
CCGU-n-F
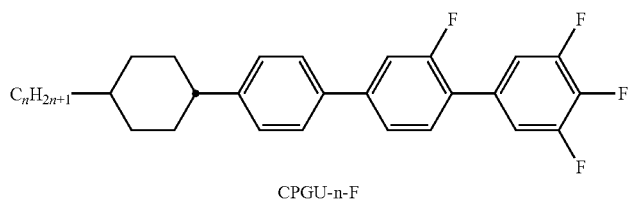
CPGU-n-F TABLE D-continued
Illustrative structures
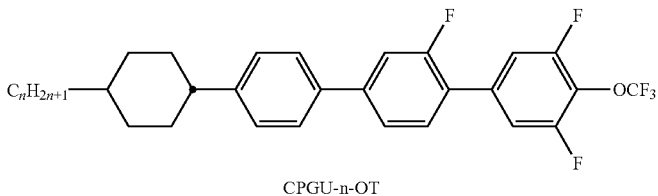
CPGU-n-OT
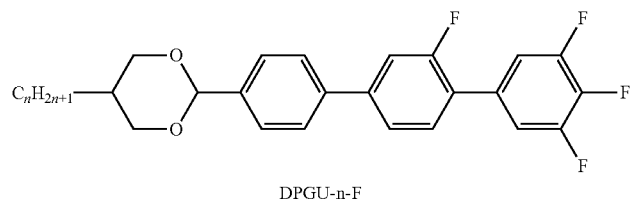
DPGU-n-F
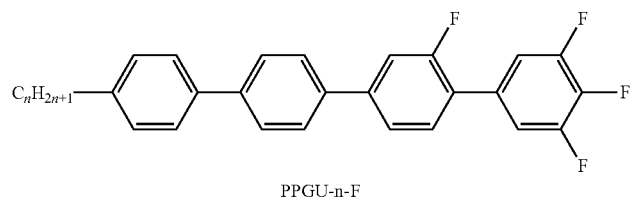
PPGU-n-F
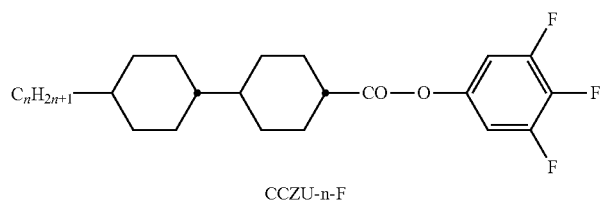
CCZU-n-F
CCQP-n-F
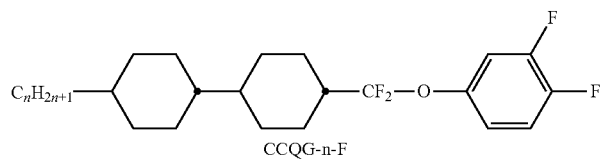
CCQG-n-F
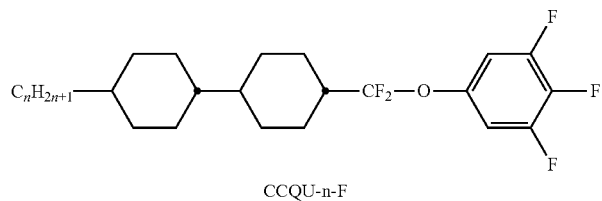
CCQU-n-F
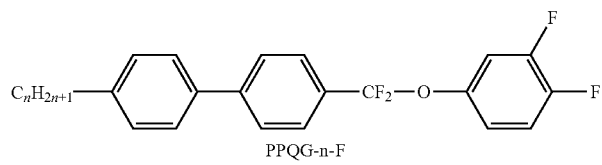
PPQG-n-F TABLE D-continued Illustrative structures PPQU-n-F PGQU-n-F GGQU-n-F PUQU-n-F MUQU-n-F NUQU-n-F CDUQU-n-F CPUQU-n-F TABLE D-continued
Illustrative structures
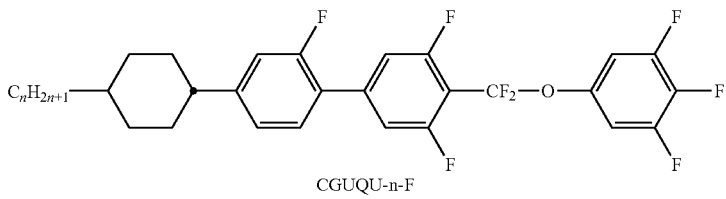
CGUQU-n-F
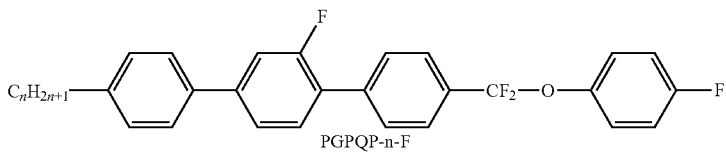
PGPQP-n-F
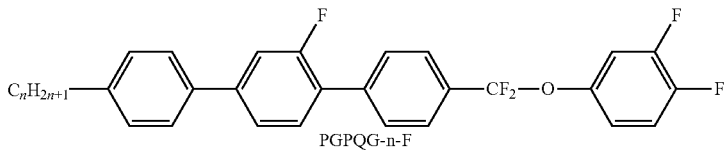
PGPQG-n-F
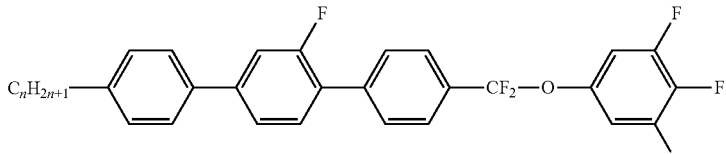
PGPQU-n-F
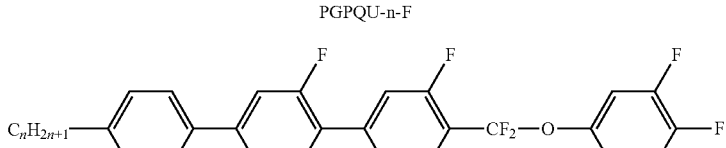
PGUQU-n-F
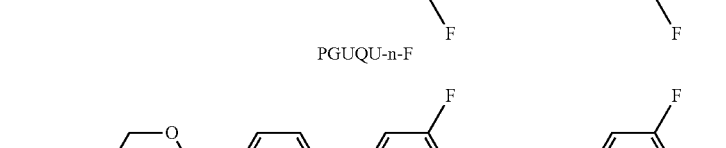
APUQU-n-F
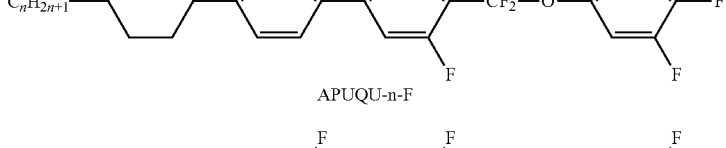
DGUQU-n-F
in which n, m and l preferably, independently of one another, denote 1 to 7.

The following table, Table E, shows illustrative compounds which can be used as additional stabilisers in the mesogenic media according to the present invention.
TABLE E
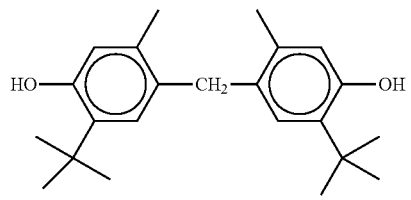
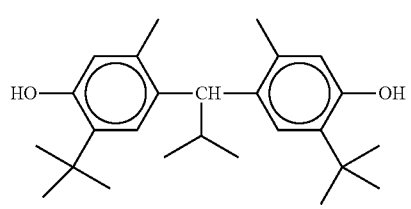
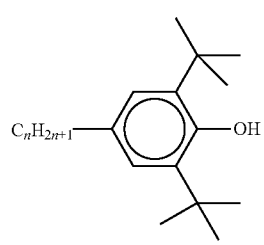
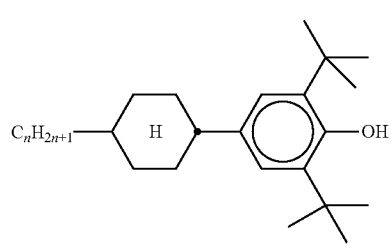
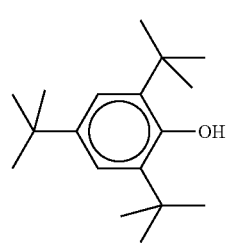
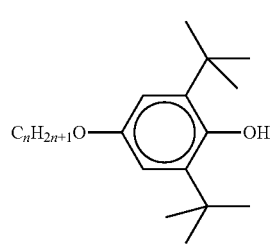
TABLE E-continued
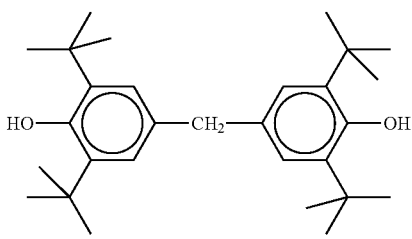
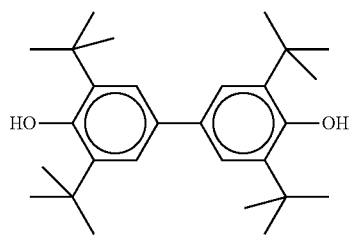
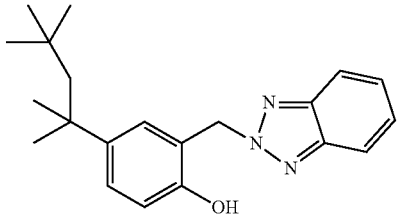 [SMILES: CC(C)(C)CC(C)(C)c1ccc(O)c(Cn2nc3ccccc3n2)c1]
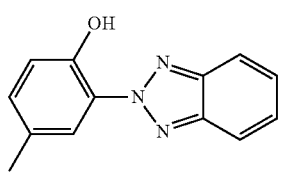 [SMILES: Cc1ccc(O)c(-n2nc3ccccc3n2)c1]
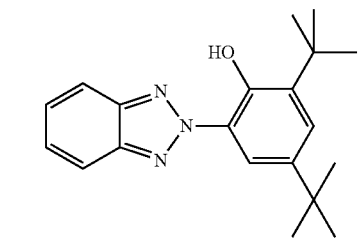 [SMILES: CC(C)(C)c1cc(-n2nc3ccccc3n2)c(O)c(C(C)(C)C)c1]
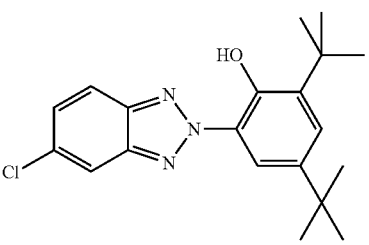 [SMILES: CC(C)(C)c1cc(-n2nc3ccc(Cl)cc3n2)c(O)c(C(C)(C)C)c1]

TABLE E-continued
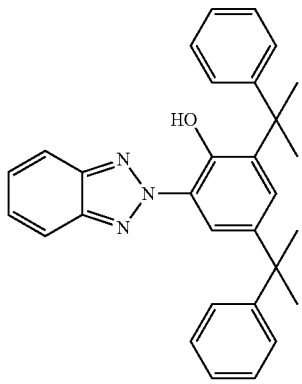 [SMILES: CC(C)(c1ccccc1)c1cc(-n2nc3ccccc3n2)c(O)c(C(C)(C)c2ccccc2)c1]
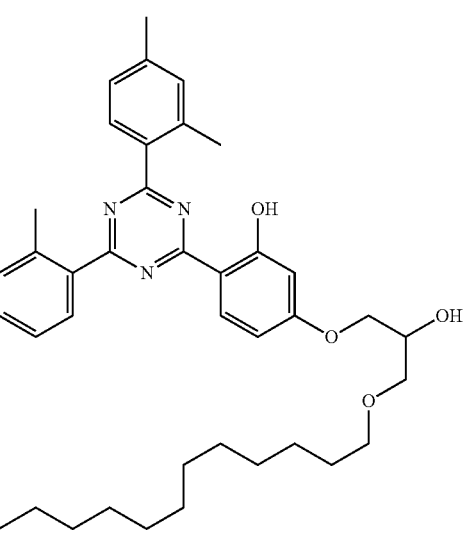

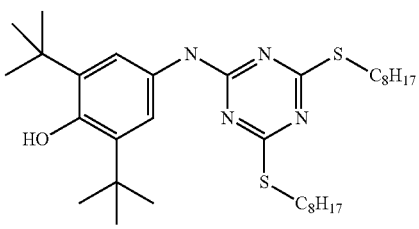
In a preferred embodiment of the present invention, the mesogenic media comprise one or more compounds selected from the group of the compounds from Table E.
Table F below shows illustrative compounds which can preferably be used as chiral dopants in the mesogenic media according to the present invention.
TABLE F
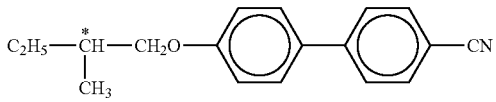
C15
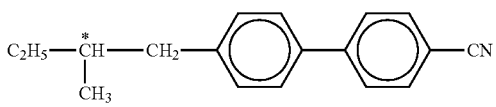
CB 15
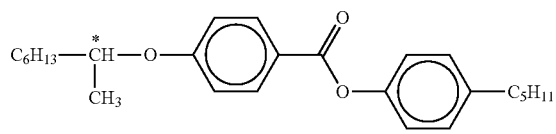
CM 21
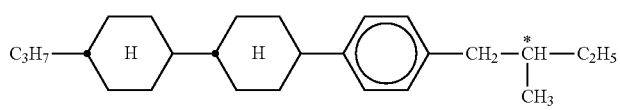
CM 44
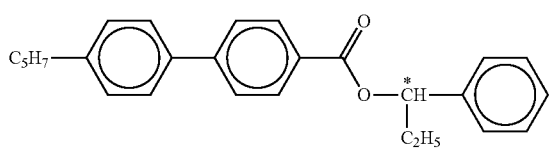
CM 45
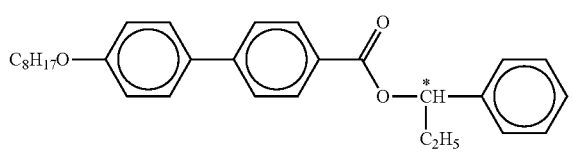
CM 47
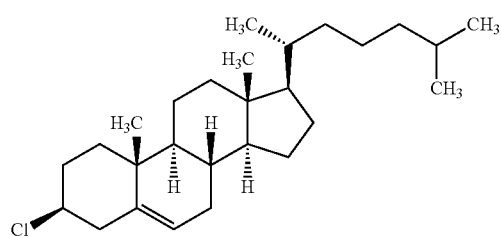
CC TABLE F-continued
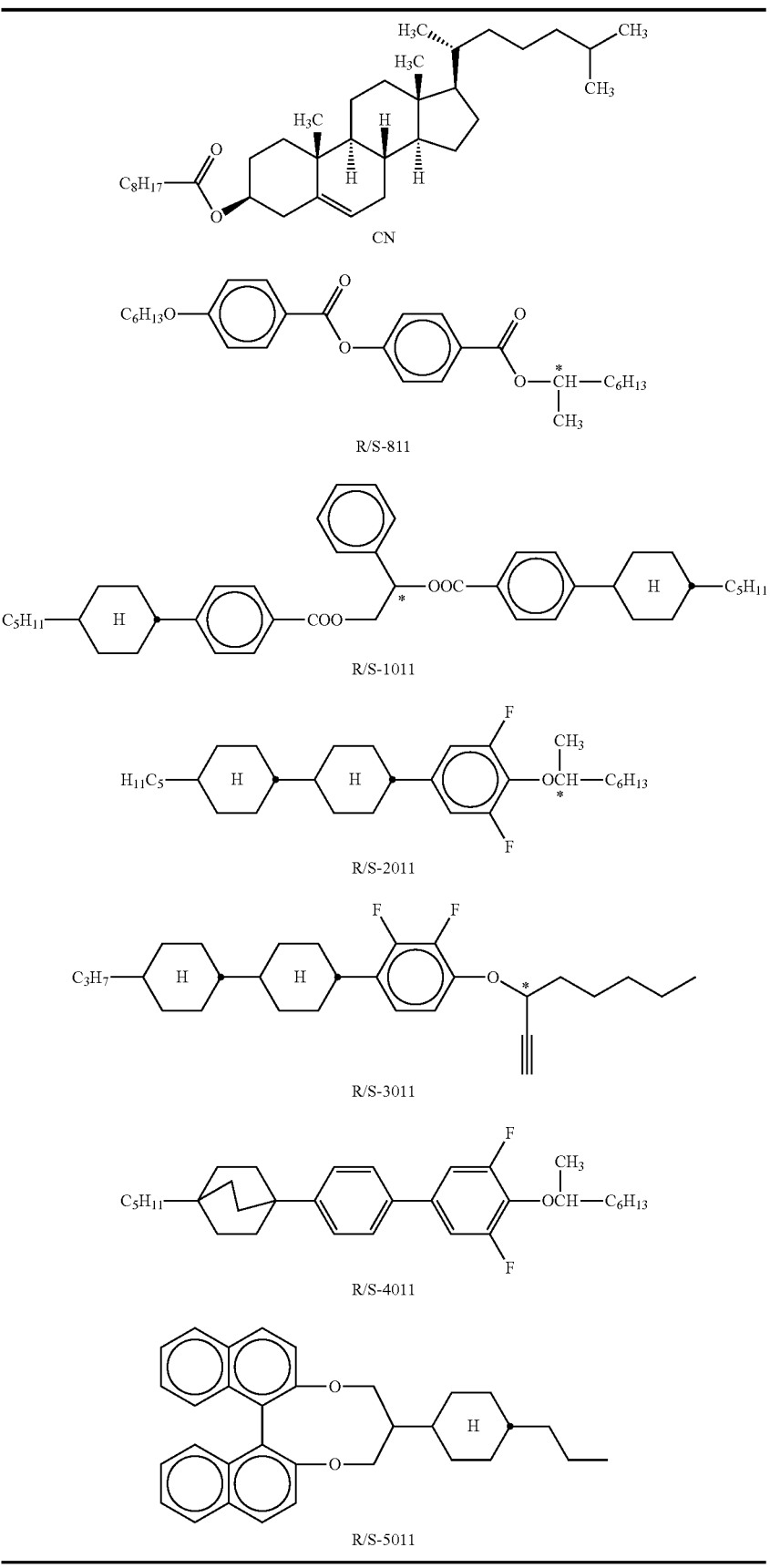

In a preferred embodiment of the present invention, the mesogenic media comprise one or more compounds selected from the group of the compounds from Table F.

The mesogenic media according to the present application preferably comprise two or more, preferably four or more, compounds selected from the group consisting of the compounds from the above tables.

The liquid-crystal media according to the present invention preferably comprise
seven or more, preferably eight or more, individual compounds, preferably of three or more, particularly preferably of four or more, different formulae, selected from the group of the compounds from Table D.

EXAMPLES

The examples below illustrate the present invention without limiting it in any way.

However, the physical properties show the person skilled in the art what properties can be achieved and in what ranges they can be modified. In particular, the combination of the various properties which can preferably be achieved is thus well defined for the person skilled in the art.

Liquid-crystal mixtures having the composition and properties as indicated in the following tables are prepared.

SUBSTANCE EXAMPLES

The following substances are substances of the formula I preferably to be employed in accordance with the present application.

1

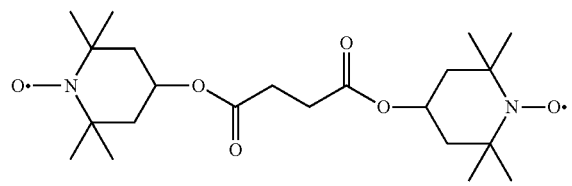

2

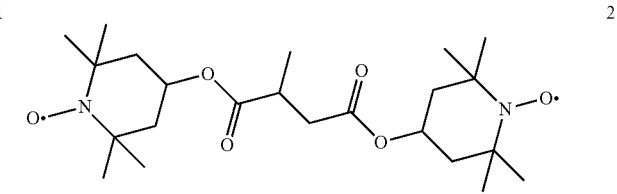

3

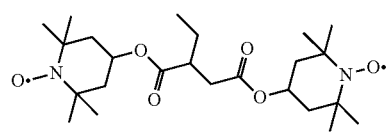

4

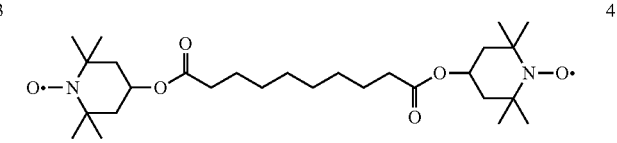

5

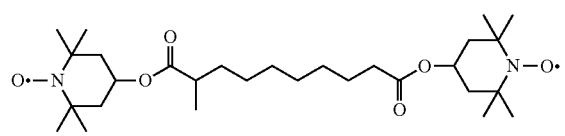

6

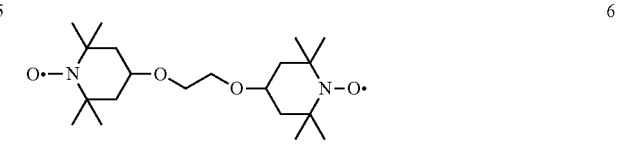

7

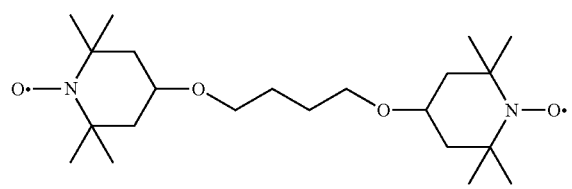

8

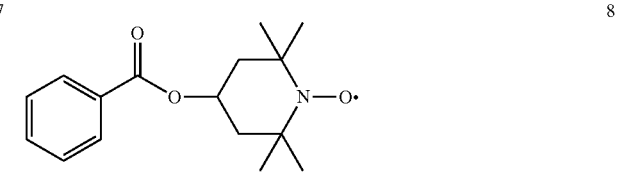

9

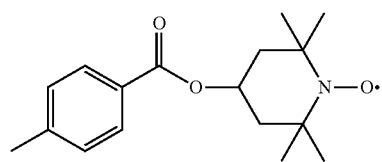

10

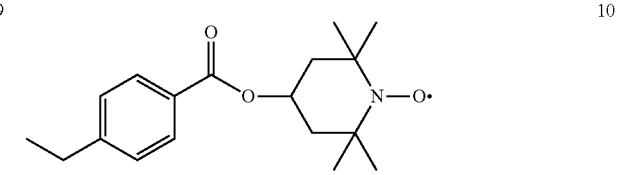

11

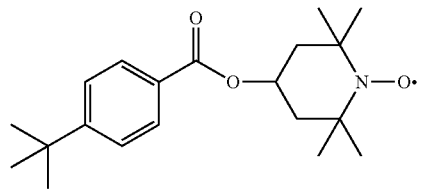

12

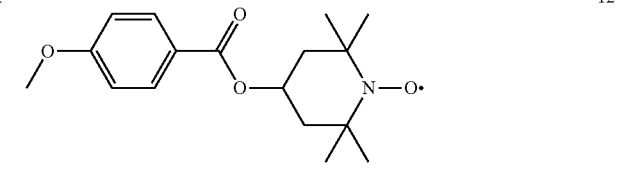

13

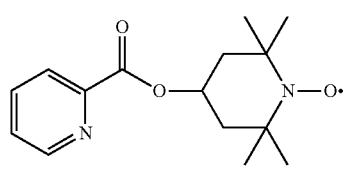

14

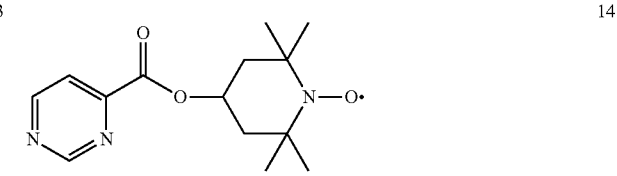

-continued
15
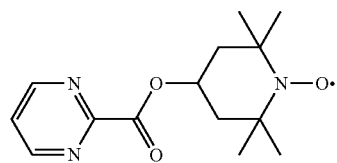
16
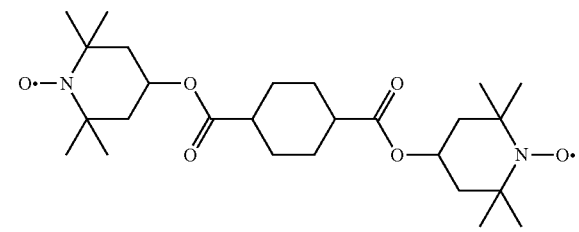
17
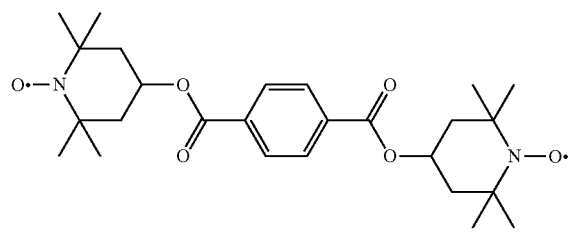
18
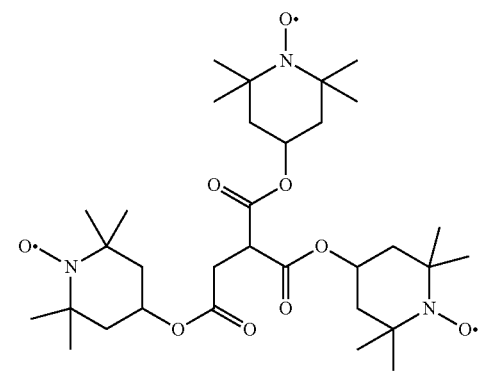
19
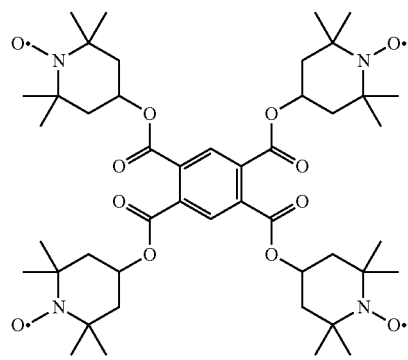
20
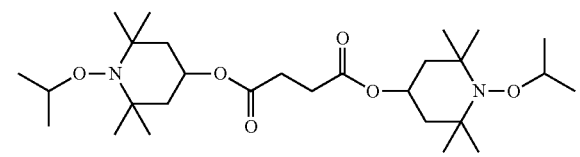
21
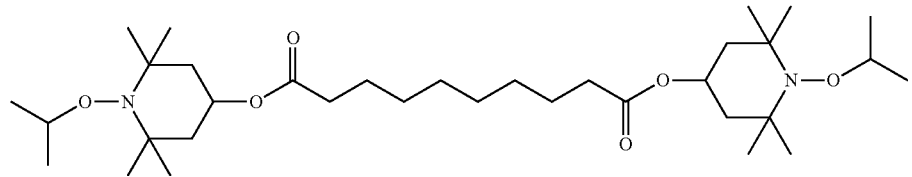
22
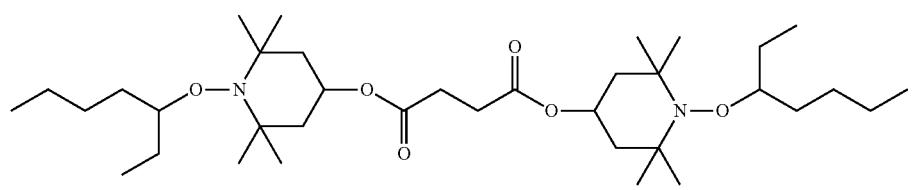
23
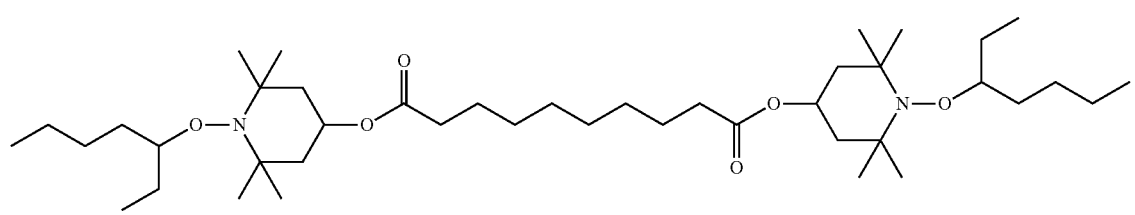

24
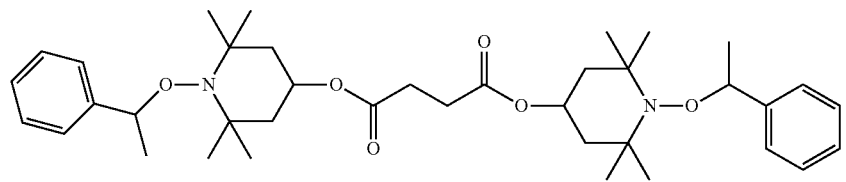
25
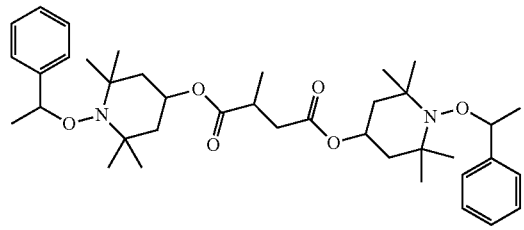
26
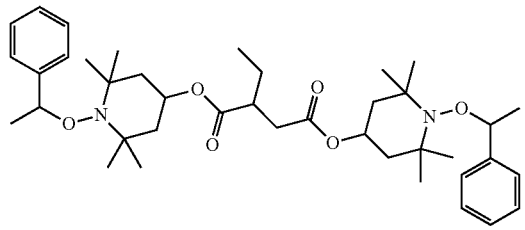
27
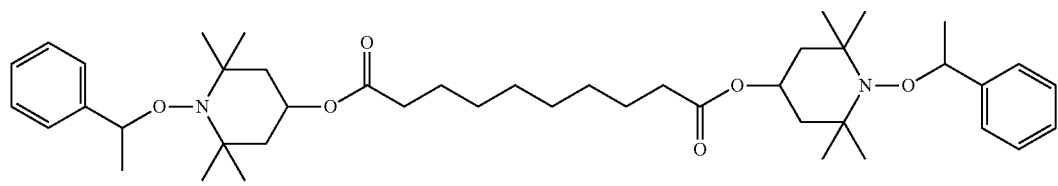
28
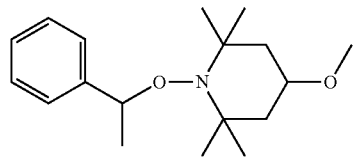
29
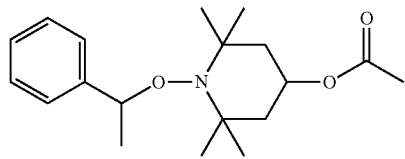
30
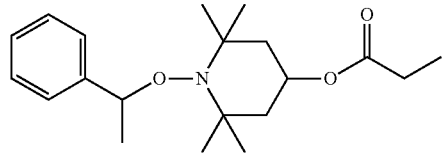
31
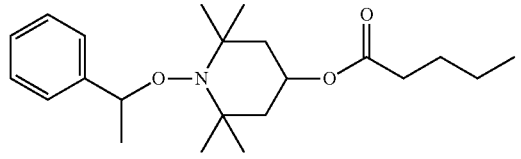
32
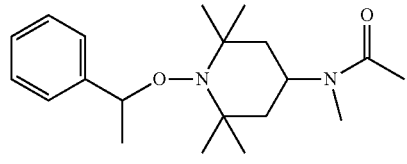
33
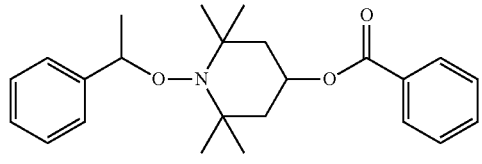
34
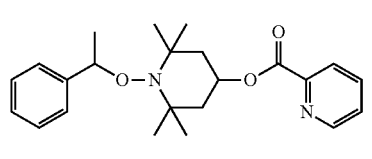
35
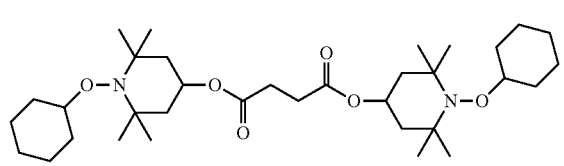
36
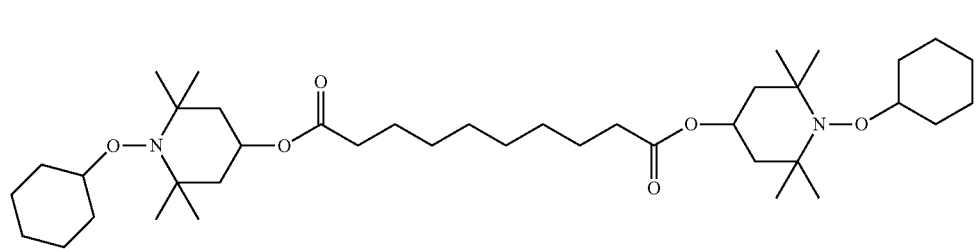

-continued
37
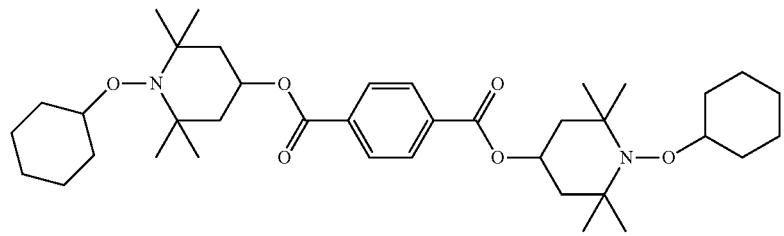
38
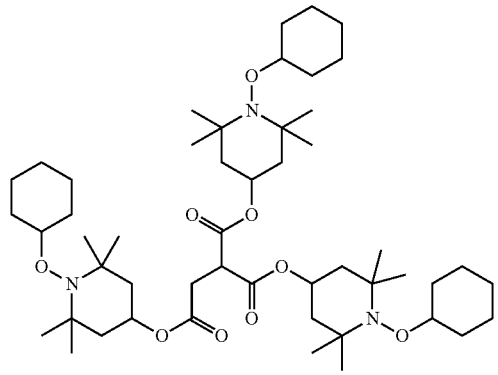
39
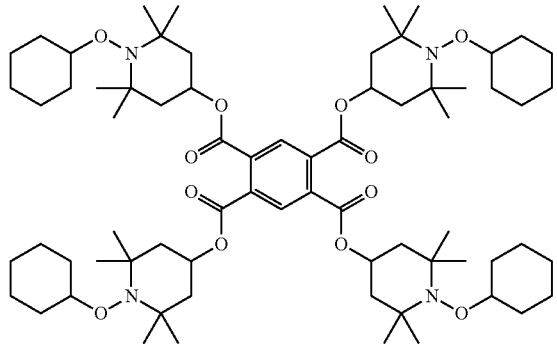
40
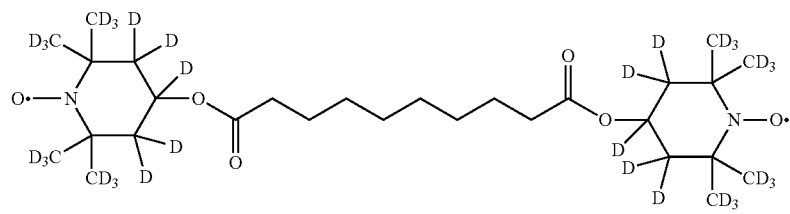
42
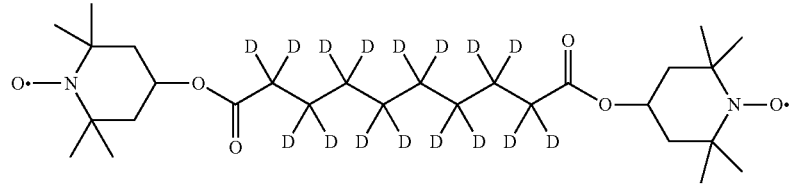
43
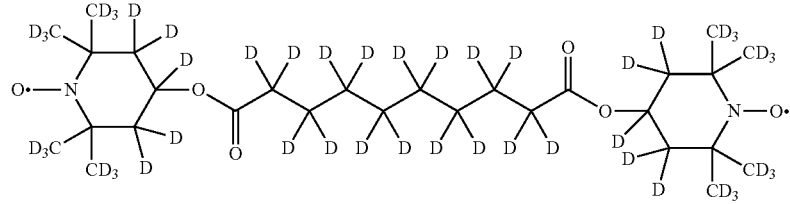
44
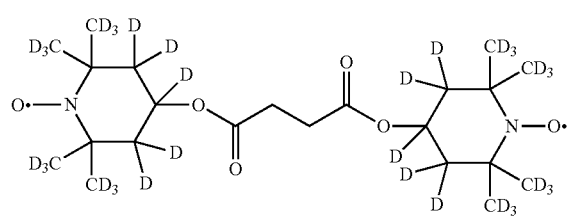
45
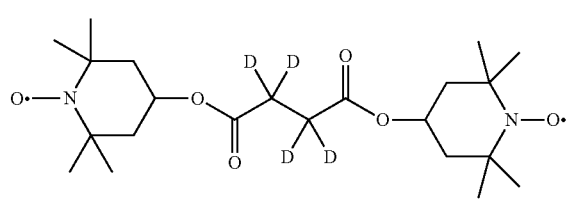

-continued

46
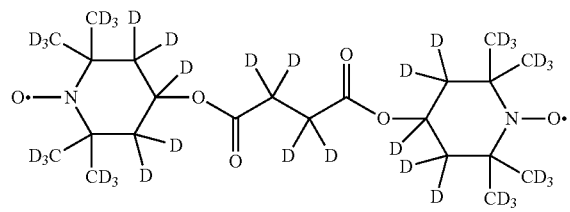

47
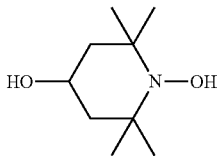

48
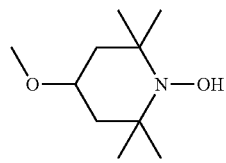

49
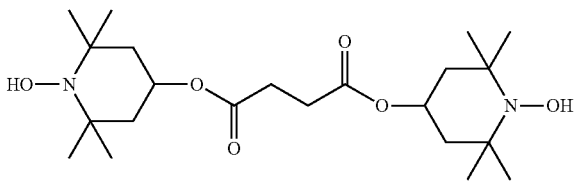

50
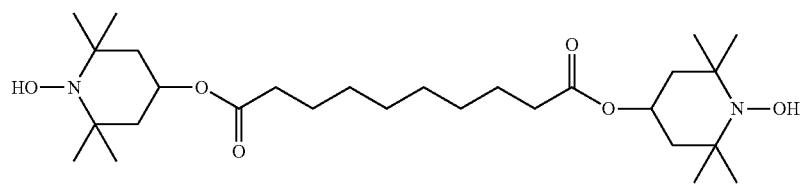

51
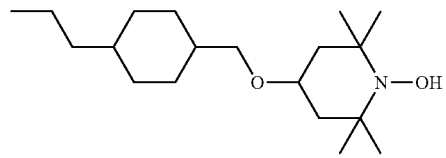

52
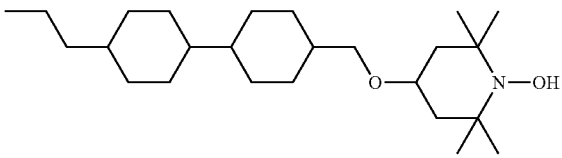

53
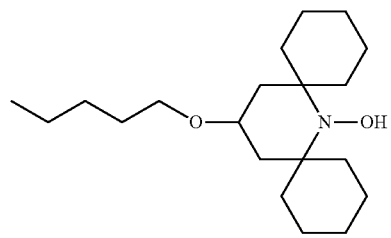

Synthesis Example 1

Synthesis of bis(2,2,6,6-tetramethyl-4-piperidyl)-N,N¹-dioxyl succinate (Substance Example 1

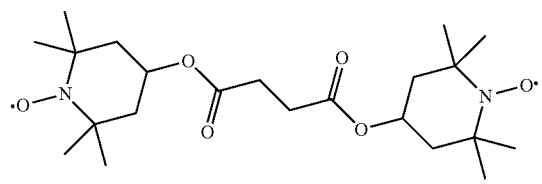

2.15 g (12.26 mmol) of 4-hydroxy-2,2,6,6-tetramethylpiperidin-1-oxyl, 40 mg (0.33 mmol) of 4-(dimethylamino) pyridine and 1 ml (12.4 mmol) of dried pyridine are initially introduced in 20 ml of dry dichloromethane. 4 Ångström activated molecular sieve is subsequently added, and the mixture is stirred at room temperature (RT for short; about 22° C.) for 90 min. The reaction solution is cooled to a temperature in the range from 7 to 10° C., and 0.71 ml (6.13 mmol) of succinyl dichloride is slowly added, and the mixture is stirred at RT for 18 h. Sufficient sat. NaHCO₃ solution and dichloromethane are added to the reaction solution, and the organic phase is separated off, washed with water and sat. NaCl solution, dried over Na₂SO₄, filtered and evaporated. The crude product is purified over silica gel with dichloromethane/methyl tert-butyl ether (95:5), giving the product as a white solid having a purity of >99.5%.

Synthesis Example 2

Synthesis of bis(2,2,6,6-tetramethylpiperidin-1-oxyl-4-yl) decanedioate (Substance Example 4

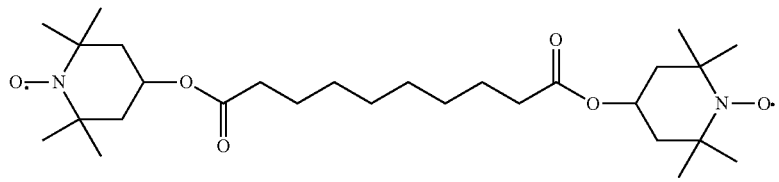

28.5 g (166 mmol) of 4-hydroxy-2,2,6,6-tetramethylpiperidin-1-oxyl (free radical) and 250 mg (2.05 mmol) of 4-(dimethylamino)pyridine are dissolved in 300 ml of degassed dichloromethane, and 50.0 ml (361 mmol) of triethylamine are added. The mixture is subsequently degassed and cooled to 0° C., and 10 g (41.4 mmol) of sebacoyl chloride dissolved in 100 ml of degassed dichloromethane are added dropwise at 0-5° C., and the mixture is stirred at room temperature for 18 h. When the reaction is complete, water and HCl (pH=4-5) are added with ice-cooling, and the mixture is stirred for a further 30 min. The organic phase is separated off, and the water phase is subsequently extracted with dichloromethane, and the combined phases are washed with saturated NaCl solution and dried over $Na_2SO_4$, filtered and evaporated, giving 24.4 g of a red liquid, which together are passed through 100 g of basic $Al_2O_3$ and 500 g of silica gel on a frit with dichloromethane/methyl tert-butyl ether (95/5), giving orange crystals, which are dissolved in degassed acetonitrile at 50° C. and crystallised at −25° C., giving the product as orange crystals having an HPLC purity of 99.9%.

Synthesis Example 3

Synthesis of bis(2,2,6,6-tetramethyl-4-piperidyl)-N, N'-dioxylbutanediol (Substance Example 7

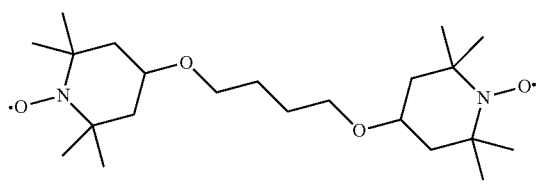

Sufficient pentane is added to 15.0 g (60% in mineral oil, 375 mmol) of NaH under a protective gas, and the mixture is allowed to settle. The pentane supernatant is pipetted off and carefully quenched with isopropanol with cooling. 100 ml of THF are then carefully added to the washed NaH. The reaction mixture is heated to 55° C., and a solution of 50.0 g (284 mmol) of 4-hydroxy-2,2,6,6-tetramethylpiperidin-1-oxyl in 400 ml of THF is carefully added dropwise. The hydrogen formed is discharged directly. When the addition of the solution is complete, stirring is continued at 60° C. overnight (16 h). The reaction mixture is subsequently cooled to 5° C., and 1,4-butanediol dimethylsulfonate is added in portions. The mixture is subsequently slowly heated to 60° C. and stirred at this temperature for 16 h. When the reaction is complete, the mixture is cooled to RT, and 200 ml of 6% ammonia solution in water are added with cooling, and the mixture is stirred for 1 h. The organic phase is subsequently separated off, the aqueous phase is rinsed with methyl tert-butyl ether, the combined organic phases are washed with sat. NaCl solution, dried and evaporated. The crude product is purified over silica gel with dichloromethane/methyl tert-butyl ether (8:2) and crystallised from acetonitrile at −20° C., giving the product as a pink crystalline solid having a purity of >99.5%.

Synthesis Example 4

Synthesis of bis[2,2,6,6-tetramethyl-1-(1-phenylethoxy)piperidin-4-yl] succinate (Substance Example 24

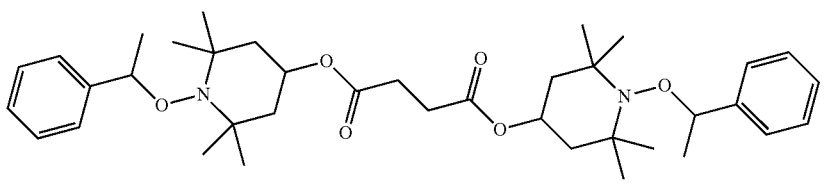 [SMILES: CC(ON1C(C)(C)CC(OC(=O)CCC(=O)OC2CC(C)(C)N(OC(C)c3ccccc3)C(C)(C)C2)CC1(C)C)c1ccccc1]

Step 4.1: Synthesis of 2,2,6,6-tetramethyl-1-(1-phenylethoxy)piperidin-4-ol

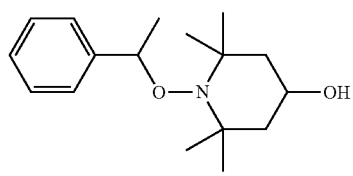 [SMILES: CC(ON1C(C)(C)CC(O)CC1(C)C)c1ccccc1]

5.0 g (29.03 mmol) of 4-hydroxy-2,2,6,6-tetramethylpiperidin-1-oxyl, 7.80 g (58.1 mmol) of 2-phenylpropionaldehyde and 100.6 mg (1.02 mmol) of copper(I) chloride are initially introduced in 20 ml of tert-butanol. 6.45 ml (58.06 mmol) of 35% hydrogen peroxide solution are then carefully and slowly added dropwise at such a rate that the internal temperature does not exceed 30° C. The mixture is therefore cooled by means of ice-cooling during the dropwise addition. Oxygen is formed in the reaction and would spontaneously be released in large quantities if the addition were too fast and the temperature too high. When the addition is complete, the reaction solution is stirred at RT for a further 16 h, and sufficient water/methyl tert-butyl ether is subsequently added, and the organic phase is separated off. The organic phase is washed with 10% ascorbic acid until peroxide-free, and the peroxide content is checked. The mixture is subsequently washed with 10% NaOH solution, water and sat. NaCl solution, dried over $Na_2SO_4$, filtered and evaporated. The crude product obtained is purified over silica gel with heptane/methyl tert-butyl ether (1:1), giving the product as colourless crystals.

Step 4.2: Synthesis of bis[2,2,6,6-tetramethyl-1-(1-phenylethoxyl)piperidin-4-yl] succinate 1.52 g (5.5 mmol) of the product from the preceding step, the compound 2,2,6,6-tetramethyl-1-(1-phenylethoxyl)piperidin-4-ol, 15.3 mg (0.125 mmol) of dimethylaminopyridine and 1.02 ml (12.6 mmol) of dried pyridine are initially introduced in 10 ml of dichloromethane and cooled to a temperature in the range from 7 to 10° C. 0.255 ml (2.199 mmol) of succinoyl dichloride is then added dropwise as such and if necessary topped up if hydroxyl compound is still present. When the reaction is complete, the reaction mixture is filtered directly through silica gel with dichloromethane and subsequently eluted with heptane/methyl tert-butyl ether (1:1) and pure methyl tert-butyl ether. The product obtained is dissolved in acetonitrile and purified by means of preparative HPLC (2 Chromolith columns with 50 ml/min of acetonitrile), giving the product as a yellow oil having a purity of >99.9%.

Synthesis Example 5

Synthesis of 2,2,6,6-tetramethyl-1-(1-phenyl-ethoxy)piperidin-4-yl pentanoate (Substance Example 31

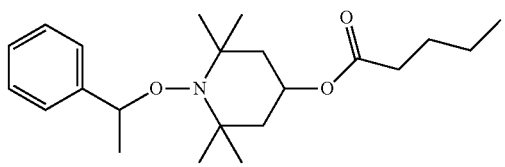 [SMILES: CCCCC(=O)OC1CC(C)(C)N(OC(C)c2ccccc2)C(C)(C)C1]

2.5 g (9.01 mmol) of the compound 2,2,6,6-tetramethyl-1-(1-phenyl-ethoxy)piperidin-4-ol from step 3.1 and 55.1 mg (0.45 mmol) of (4-dimethylaminopyridine) are dissolved in 50.0 ml of dry dichloromethane and cooled to 3° C. 5.47 ml (27.03 mmol) of valeric anhydride are added at this temperature, and the mixture is stirred at room temperature for 14 h. When the reaction is complete, the mixture is carefully poured into ice-water, adjusted to pH 6 using 2N HCl, and the organic phase is separated off. The aqueous phase is extracted with dichloromethane, and the combined organic phases are washed with saturated NaCl solution, a mixture of water and triethylamine (300:50 ml) and dried over $MgSO_4$, filtered and evaporated. Purification on silica gel with heptane/methyl tert-butyl ether (9:1) gives the product as a colourless oil.

Synthesis Example 6

Synthesis of 1,4-bis(1-hydroxy-2,2,6,6-tetramethyl-4-piperidinyl) butanedioate (Substance Example 49

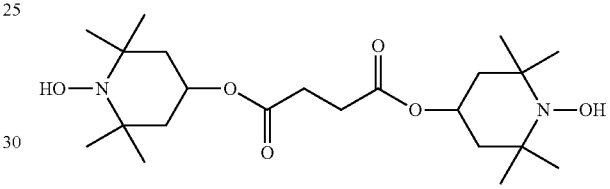

40 ml of water and 80 ml of dioxane are mixed and carefully degassed by means of a stream of argon. 2.0 g (4.7 mmol) of the free radical from Substance Example 1 (Synthesis Example 1) are dissolved in the solvent mixture, and 4.95 g (28.1 mmol) of ascorbic acid are added in portions. The reaction mixture becomes colourless during this addition and is stirred at 40° C. for 18 h under a protective-gas atmosphere. The mixture is cooled to room temperature, and 100 ml of water are added, the mixture is stirred briefly, and the crystals formed are filtered off with suction. The crystals are dissolved in 50 ml of hot degassed THF, and the insoluble constituents are filtered off, and the filtrate is crystallised at –25° C. The pale-pink crystals are then washed by stirring in acetonitrile at room temperature for 18 h, giving the product as pale-pink crystals having an HPLC purity of 100%.

Synthesis Example 8

Synthesis of 1,10-bis(1-hydroxy-2,2,6,6-tetramethyl-4-piperidinyl) decanedioate (Substance Example 50

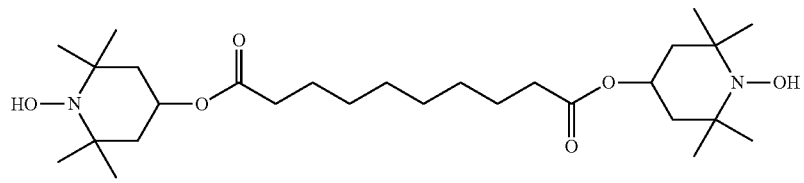 [SMILES: CC1(C)CC(OC(=O)CCCCCCCCC(=O)OC2CC(C)(C)N(O)C(C)(C)C2)CC(C)(C)N1O]

All solvents used are thoroughly degassed in advance by means of a stream of argon. During work-up, brown glass equipment must be used. 1.70 g (3.32 mmol) of the free radical from Substance Example 4 (Synthesis Example 2) are dissolved in 60 ml of dioxane. 3.6 g (20 mmol) of ascorbic acid dissolved in 30 ml of water are subsequently added dropwise to the solution at room temperature. The reaction solution starts to become colourless during this dropwise addition, and the reaction is complete after stirring at room temperature for 1 h. The mixture is extracted with 100 ml of dichloromethane, and the organic phase is washed with water, dried over $Na_2SO_4$, filtered and evaporated. The yellow crystals formed are dried at 160° C. and $10^{-2}$ mbar for 5 min, giving a viscous, slowly crystallising oil.

Liquid-crystal mixtures having the compositions and properties as indicated in the following tables are prepared and investigated.

USE EXAMPLES

Use Example 1

Comparative Example 1 and Use Example 1.1

| Mixture M-1: | | |
|---|---|---|
| Composition Compound | | |
| No. | Abbreviation | c/% |
| 1 | APUQU-3-F | 4.5 |
| 2 | PGUQU-3-F | 5.0 |
| 3 | PGUQU-4-F | 9.0 |
| 4 | PGUQU-5-F | 1.5 |
| 5 | CCQU-3-F | 4.0 |
| 6 | CCQU-5-F | 9.0 |
| 7 | CCU-3-F | 9.0 |
| 8 | CCU-5-F | 9.0 |
| 9 | CC-3-V | 38.5 |
| 10 | CC-3-V1 | 4.0 |
| 11 | PGP-2-3 | 6.5 |
| Σ | | 100.0 |

| Physical properties |
|---|
| T(N, I) = 80.5° C. |
| $n_e$ (20° C., 589.3 nm) = 1.5780 |
| Δn (20° C., 589.3 nm) = 0.0990 |
| ε∥ (20° C., 1 kHz) = 12.3 |
| Δε (20° C., 1 kHz) = 9.1 |
| $k_1$(20° C.) = 12.6 pN |
| $k_3$(20° C.) = 14.0 pN |
| $γ_1$ (20° C.) = 76 mPa · s |
| $V_0$ (20° C.) = 1.24 V |

This mixture (mixture M-1) is prepared and divided into two parts. The first part is investigated without addition of a further compound. 100 ppm of the compound to be investigated, here the compound of the formula I-1a-1, are added to the second part of the mixture. The two parts of the mixture are investigated as follows.

In each case, six test cells having the alignment layer AL-16301 (Japan Synthetic Rubber (JSR), Japan) and a layer thickness of 3.2 μm and transversal electrodes as for TN cells are filled and investigated with respect to their voltage holding ratio. The initial value and the value after UV exposure with an Execure 3000 high-pressure mercury vapour lamp from Hoya with an edge filter (T=50% at 340 nm), at a certain exposure intensity in J/cm², are determined at a temperature of 25° C. The respective exposure intensity is measured at a wavelength of 365 nm using an Ushio UIT-101+UVD-365PD sensor. In each case, the HR is measured at a temperature of 100° C. after 5 minutes in the oven. The voltage is 1 V at 60 Hz. The results are summarised in the following table.

| Example | X: formula | $I_{UV}$/J/cm² c(X)/ppm | 0 $HR_0$/% | 3 $HR_{UV}$/% | 6 | 12 |
|---|---|---|---|---|---|---|
| V1.0 | None | 0 | 98.6 | 94.2 | 90.8 | 85.2 |
| 1.1 | I-1a-1 | 100 | 98.0 | 95.7 | 94.8 | 93.9 |

Notes:
X: compound of the formula I-1a-1
$I_{UV}$ at 365 nm.

The mixtures of Use Example 1.1, which comprise a compound of the formula I (I-1a-2), are distinguished, in particular, by excellent stability to UV irradiation.

Corresponding investigations of the two different mixtures were then carried out in sealed test cells with exposure to commercial LCD TV backlighting (CCFL). The temperature of the test cells here was about 40° C. due to the heat evolution by the backlighting. The results are summarised in the following table.

| Example | X: formula | t/h c(X)/ppm | 0 $HR_0$/% | 24 $HR_{BL}$/% | 168 | 1000 |
|---|---|---|---|---|---|---|
| V1.0 | None | 0 | 98.1 | 89.8 | 69.3 | 36 |
| 1.1 | I-1a-1 | 100 | 97.9 | 98.3 | 95.8 | 68.5 |

Note:
X: compound of the formula I-1a-1.

Corresponding investigations were subsequently carried out on the two different mixtures in sealed test cells with heating. The temperature stability is checked by a heat test. To this end, the HR is determined before and after heating. To this end, the cells are stored in an oven at a temperature of 100° C. for certain times. The HR is then determined as described above. The results are summarised in the following table.

| Example | X: formula | t/h c(X)/ppm | 0 $HR_0$/% | 24 $HR_T$(t)/% | 72 | 336 |
|---|---|---|---|---|---|---|
| V1.0 | None | 0 | 98.5 | 97.1 | 95.8 | 93.9 |
| 1.1 | I-1a-1 | 100 | 98.0 | 97.8 | 97.5 | 95.8 |

Notes:
X: compound of the formula I-1a-1
Temperature: 100° C.

Use Example 2

Comparative Example 2.0 and Use Examples 2.1 to 2.4

| Mixture M-2: | | |
|---|---|---|
| Composition Compound | | |
| No. | Abbreviation | c/% |
| 1 | DGUQU-4-F | 8.0 |
| 2 | APUQU-2-F | 8.0 |

-continued

| Mixture M-2: | | |
|---|---|---|
| 3 | APUQU-3-F | 6.5 |
| 4 | PGUQU-3-F | 3.5 |
| 5 | PGUQU-4-F | 9.0 |
| 6 | DPGU-4-F | 6.0 |
| 7 | CCP-3-OT | 8.0 |
| 8 | CC-3-V | 33.5 |
| 9 | CC-3-V1 | 11.5 |
| 10 | CCP-V2-1 | 6.0 |
| Σ | | 100.0 |

| Physical properties |
|---|
| T(N, I) = 93.0° C. |
| $n_e$ (20° C., 589.3 nm) = 1.5876 |
| Δn (20° C., 589.3 nm) = 0.1086 |
| ε∥ (20° C., 1 kHz) = 19.0 |
| Δε (20° C., 1 kHz) = 15.4 |
| $k_1$(20° C.) = 14.7 pN |
| $k_3$(20° C.) = 15.6 pN |
| $γ_1$ (20° C.) = 97 mPa · s |
| $V_0$ (20° C.) = 1.03 V |

Mixture M-2 is prepared here as in Use Example 1, but is divided into five parts here. The first part is investigated without addition of a further compound. 100 ppm or 200 ppm of the compound of the formula TINUVIN 770® or 100 ppm or 200 ppm of the compound of the formula I-1a-1 are added to the four further parts of the mixture.

In each case, six test cells having the alignment layer AL-16301 (Japan Synthetic Rubber (JSR), Japan) and a layer thickness of 3.2 μm are filled (electrodes: TN layout) and investigated with respect to their voltage holding ratio. The initial value and the value after UV exposure with a high-pressure mercury vapour lamp from Hoya (Execure 3000) with an edge filter (T=50% at 340 nm), at a certain exposure intensity in $J/cm^2$, are determined at a temperature of 25° C. The exposure intensity is measured using an Ushio UIT-101+UVD-365PD sensor at a wavelength of 365 nm. In each case, the HR is measured at a temperature of 100° C. after 5 minutes in the oven. The voltage is 1 V at 60 Hz. The results are summarised in the following table.

| Example | X: formula | $I_{UV}/J/cm^2$ c(X)/ppm | 0 $HR_0$/% | 3 $HR_{UV}$/% |
|---|---|---|---|---|
| V2.0 | None | 0 | 95.8 | 90.0 |
| 2.1 | TINUVIN 770 ® | 100 | 97.0 | 94.5 |
| 2.2 | TINUVIN 770 ® | 200 | 97.7 | 96.8 |
| 2.3 | I-1a-1 | 100 | 95.1 | 93.4 |
| 2.4 | I-1a-1 | 200 | 95.2 | 94.1 |

Notes:
X: TINUVIN 770 ® in the case of Examples 2.1 and 2.2 and the compound of the formula I-1a-1 in the case of Examples 2.3 and 2.4, $I_{UV}$ at 365 nm.

The mixtures of Use Examples 2.1 to 2.4, each of which comprise a compound of the formula TINUVIN 770® or a compound of the formula I (I-1a-2), are distinguished, in particular, by excellent stability to UV irradiation. In the case of the corresponding two mixture pairs, the stability here increases with increasing concentration of the compound of the formula TINUVIN 770® or of the formula I-1a-2.

Corresponding investigations of the five different mixtures were then carried out in test cells with exposure to LCD backlighting as described above. The results are summarised in the following table.

| Example | X: formula | t/h c(X)/ppm | 0 $HR_0$/% | 24 $HR_{BL}$(t)/% | 168 |
|---|---|---|---|---|---|
| V2.0 | None | 0 | 96.2 | 82.9 | 56.8 |
| 2.1 | TINUVIN 770 ® | 100 | 97.6 | 95.1 | 93.0 |
| 2.2 | TINUVIN 770 ® | 200 | 98.7 | 98.5 | 95.8 |
| 2.3 | I-1a-1 | 100 | 96.1 | 97.2 | 92.4 |
| 2.4 | I-1a-1 | 200 | 95.7 | 97.3 | 95.5 |

Note:
X: TINUVIN 770 ® in the case of Examples 2.1 and 2.2 and the compound of the formula I-1a-1 in the case of Examples 2.3 and 2.4.

The difference in the HR of the host in the case of Comparative Example 2.0 in this table from those in the preceding table of this comparative example is attributable to the reproducibility of the measurement values. Within a measurement series in an example and the associated comparative measurements, the reproducibility is significantly better (about ½ to ⅓ times as great) and the variation latitude is thus correspondingly significantly lower.

Corresponding investigations of the five different mixtures were subsequently carried out in test cells with heating, as described above. The results are summarised in the following table.

| Example | X: formula | t/h c(X)/ppm | 0 $HR_0$/% | 24 $HR_T$(t)/% | 48 | 96 |
|---|---|---|---|---|---|---|
| V2.0 | None | 0 | 95.8 | 95.0 | 93.7 | 92.8 |
| 2.1 | TINUVIN 770 ® | 100 | 97.0 | 98.3 | 98.8 | 98.8 |
| 2.2 | TINUVIN 770 ® | 200 | 97.7 | 98.8 | 98.9 | 98.9 |
| 2.3 | I-1a-1 | 100 | 95.1 | 96.1 | 96.8 | 96.6 |
| 2.4 | I-1a-1 | 200 | 95.2 | 96.6 | 96.8 | 96.7 |

Notes:
X: TINUVIN 770 ® in the case of Examples 2.1 and 2.2 and the compound of the formula I-1a-1 in the case of Examples 2.3 and 2.4
Temperature: 100° C.

Use Example 3

Comparative Example 3.0 and Use Example 3.1

| Mixture M-3: | | |
|---|---|---|
| Composition | | |
| Compound | | |
| No. | Abbreviation | c/% |
| 1 | CDUQU-3-F | 8.0 |
| 2 | APUQU-2-F | 8.0 |
| 3 | APUQU-3-F | 8.5 |
| 4 | PGUQU-3-F | 1.5 |
| 5 | PGUQU-4-F | 9.0 |
| 6 | PGUQU-5-F | 4.0 |
| 7 | DPGU-4-F | 6.0 |
| 8 | CCP-3-OT | 8.0 |
| 9 | CC-3-V | 32.5 |
| 10 | CC-3-V1 | 12.5 |
| 11 | CCP-V2-1 | 2.0 |
| Σ | | 100.0 |

| Physical properties |
|---|
| T(N, I) = 93.0° C. |
| $n_e$ (20° C., 589.3 nm) = 1.5870 |
| Δn (20° C., 589.3 nm) = 0.1089 |
| ε∥ (20° C., 1 kHz) = 19.2 |
| Δε (20° C., 1 kHz) = 15.4 |
| $k_1$(20° C.) = 14.9 pN |

-continued

| Mixture M-3: |
|---|
| $k_3(20° C.) = 15.2$ pN |
| $\gamma_1 (20° C.) = 99$ mPa · s |
| $V_0 (20° C.) = 1.03$ V |

Mixture M-3 is prepared here as in Use Example 1 and divided into two parts. The first part is investigated without addition of a further compound. 200 ppm of the compound to be investigated, here the compound of the formula I-1a-1, are added to the second part of the mixture. In each case, six test cells having the alignment layer AL-16301 (Japan Synthetic Rubber (JSR), Japan) and a layer thickness of 3.2 μm are filled (electrodes: TN layout) and investigated with respect to their voltage holding ratio. The initial value and the value after UV exposure to a high-pressure mercury vapour lamp from Hoya (Execure 3000) with an edge filter (T=50% at 340 nm), at a certain exposure intensity in J/cm², are determined at a temperature of 25° C. The exposure intensity is measured using an Ushio UIT-101+UVD-365PD sensor at a wavelength of 365 nm. In each case, the HR is measured at a temperature of 100° C. after 5 minutes in the oven. The voltage is 1 V at 60 Hz. The results are summarised in the following table.

| Example | $I_{UV}$/J/cm² c(X)/ppm | 0 HR$_0$/% | 3 | 6 HR$_{UV}$/% | 12 |
|---|---|---|---|---|---|
| V3.0 | 0 | 97.0 | 91.6 | t.b.d. | t.b.d. |
| 3.1 | 200 | 96.0 | 93.4 | t.b.d. | t.b.d. |

Notes:
X: compound of the formula I-1a-1,
t.b.d.: to be determined, $I_{UV}$ at 365 nm.

The mixtures of Use Example 3.1, which comprise a compound of the formula I (formula I-1a-1), are distinguished, in particular, by excellent stability to UV irradiation.

The invention claimed is:

1. A liquid-crystal medium having positive dielectric anisotropy (Δε) in the range from 12 to 17 at 20° C. and 1 kHz,
comprising
a) a compound of the formula below,

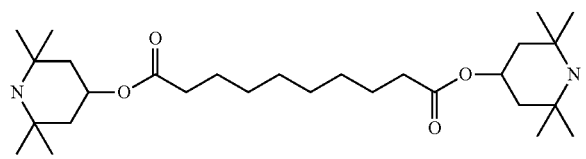 [SMILES: CC1(C)CC(OC(=O)CCCCCCCCC(=O)OC2CC(C)(C)NC(C)(C)C2)CC(C)(C)N1]

and
b) a liquid crystal mixture comprising one or more compounds of formula II in a concentration of 33% to 60% by weight based on the weight of the liquid crystal mixture as a whole and one or more compounds of formula II-2;

II
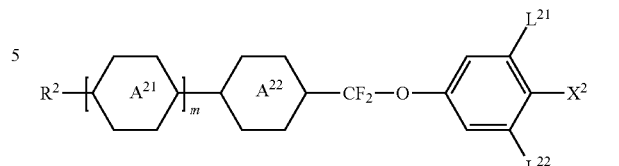

II-2
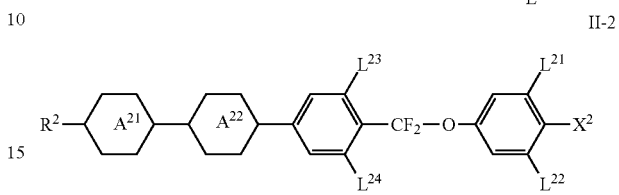

in which
R² denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,

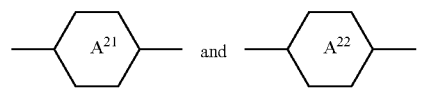

on each appearance, independently of one another, denote

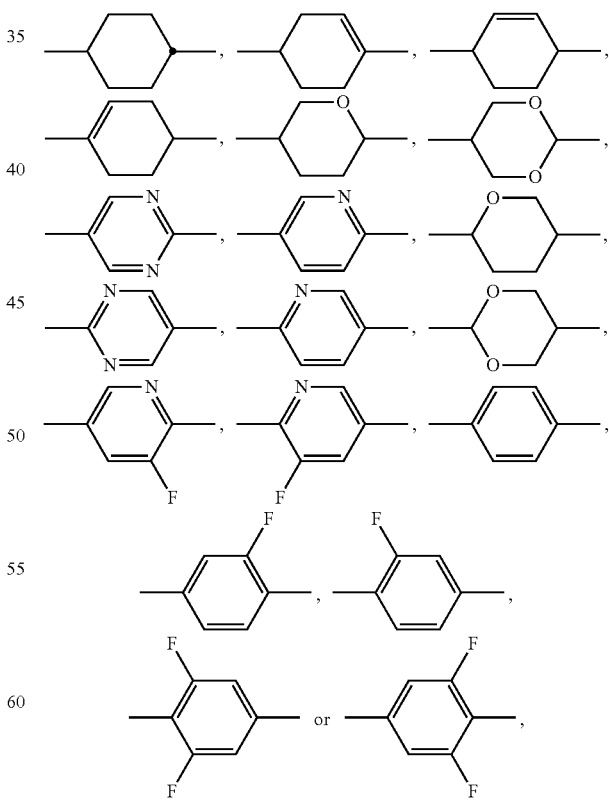

L²¹ L²², L²³ and L24 independently of one another, denote H or F, $X^2$ denotes halogen, halogenated alkyl or alkoxy having 1 to 3 C atoms or halogenated alkenyl or alkenyloxy having 2 or 3 C atoms,
and
m denotes 0, 1, 2 or 3
wherein the total concentration of the compound of the following formula

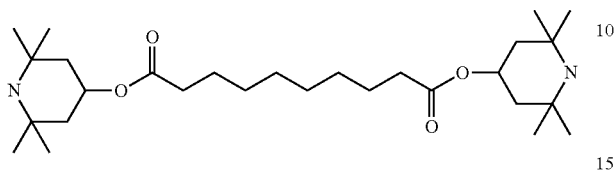

in the medium is in the range from 1 ppm to 2000 ppm.

2. The liquid-crystal medium according to claim 1, which additionally comprises one or more compounds of formula III

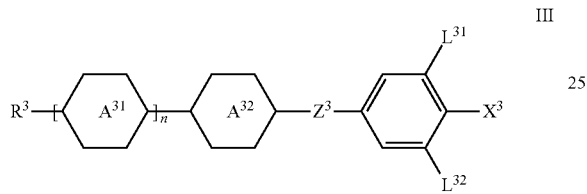

III in which
$R^3$ denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,

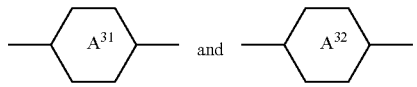

on each appearance, independently of one another, denote

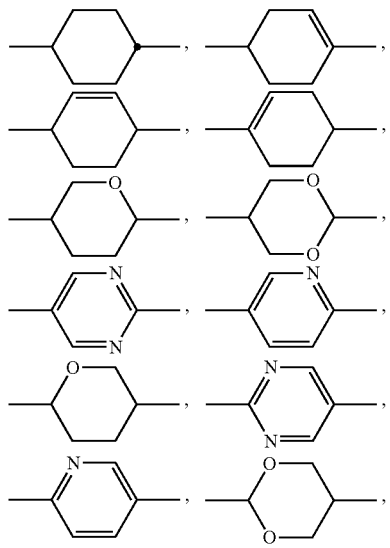

$L^{31}$ and $L^{32}$ independently of one another, denote H or F, $X^3$ denotes halogen, halogenated alkyl or alkoxy having 1 to 3 C atoms or halogenated alkenyl or alkenyloxy having 2 or 3 C atoms, $Z^3$ denotes —$CH_2CH_2$—, —$CF_2CF_2$—, —COO—, trans-CH=CH—, trans-CF=CF—, —$CH_2O$— or a single bond, and N denotes 0, 1, 2 or 3.

3. The liquid-crystal medium according to claim 1, which additionally comprises one or more compounds of formula IV

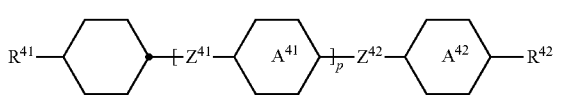

IV in which
$R^{41}$ and $R^{42}$ independently of one another, denote alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,

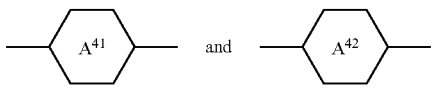

independently of one another and, if

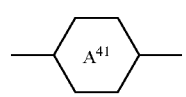

occurs twice, also these independently of one another, denote

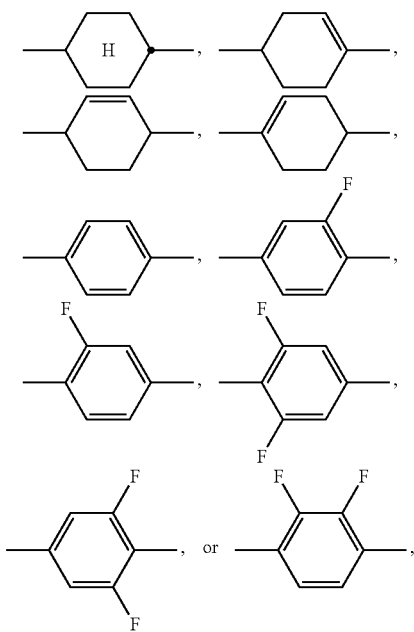

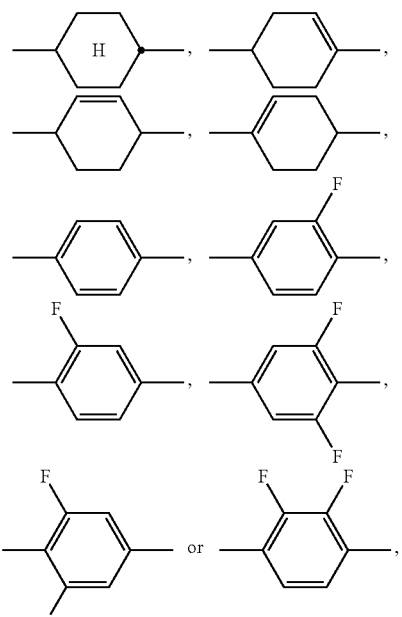

$Z^{41}$ and $Z^{42}$ independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

4. The liquid-crystal medium according to claim 2, which additionally comprises one or more compounds of formula IV

<div style="text-align:right">IV</div> in which $R^{41}$ and $R^{42}$ independently of one another, denote alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,

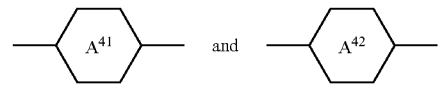

independently of one another and, if

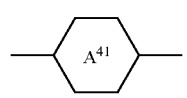

occurs twice, also these independently of one another, denote $Z^{41}$ and $Z^{42}$ independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

5. The liquid-crystal medium according to claim 1, further comprising a stabilizer compound that is a di-ortho-(tert-butyl)phenol compound, which contains a structural element of the following formula

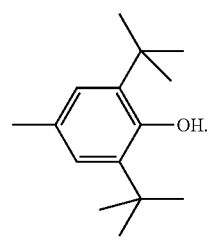 [SMILES: Cc1cc(C(C)(C)C)c(O)c(C(C)(C)C)c1]

6. The liquid-crystal medium according to claim 1, further comprising a stabilizer compound of the following formula

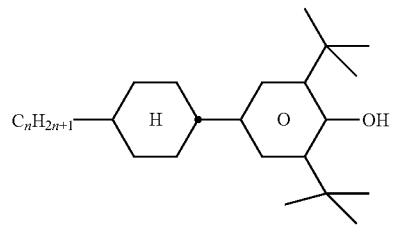

wherein n is 1-7.

7. The liquid-crystal medium according to claim 1, which additionally comprises one or more compounds of formula I,

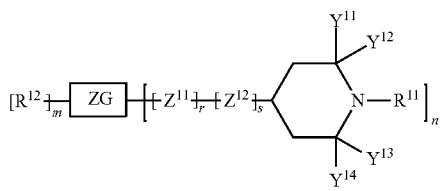

in which
n denotes an integer from 1 to 4,
m denotes (4−n),

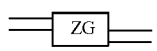

denotes an organic radical having 4 bonding sites, in which, in addition to the m groups $R^{12}$ present in the molecule, but independently thereof, a further H atom may be replaced by $R^{12}$ or a plurality of further H atoms may be replaced by $R^{12}$, in which one —$CH_2$— group or a plurality of —$CH_2$— groups may be replaced by —O— or —C(=O)— in such a way that two O atoms are not bonded directly to one another, or denotes a substituted or unsubstituted aromatic or heteroaromatic hydrocarbon radical having 1 to 4 valences, in which, in addition to the m groups $R^{12}$ present in the molecule, but independently thereof, a further H atom may be replaced by $R^{12}$ or a plurality of further H atoms may be replaced by $R^{12}$, $Z^{11}$ and $Z^{12}$ independently of one another, denote —O—, —(C=O)—, —(N—$R^{14}$)— or a single bond, but do not both simultaneously denote —O—, r and s independently of one another, denote 0 or 1, $Y^{11}$ to $Y^{14}$ each, independently of one another, denote alkyl having 1 to 4 C atoms and alternatively, independently of one another, one or both of the pairs $Y^{11}$ and $Y^{12}$ and/or $Y^{13}$ and $Y^{14}$ together also denote a divalent group having 3 to 6 C atoms, $R^{11}$ denotes O., $R^{12}$ on each occurrence, independently of one another, denotes H, F, $OR^{14}$, $NR^{14}R^{15}$, a straight-chain alkyl having 1-20 C atoms or branched alkyl chain having 3-20 C atoms, in which one —$CH_2$— group or a plurality of —$CH_2$— groups may be replaced by —O— or —C(=O)—, but two adjacent —$CH_2$— groups cannot be replaced by —O—, or denotes a hydrocarbon radical which contains a cycloalkyl having 3 to 10 C atoms or alkylcycloalkyl unit having 4 to 10 C atoms, and in which one —$CH_2$— group or a plurality of —$CH_2$— groups may be replaced by —O— or —C(=O)—, but two adjacent —$CH_2$— groups cannot be replaced by —O—, and in which one H atom or a plurality of H atoms may be replaced by $OR^{14}$, $N(R^{14})(R^{15})$ or $R^{16}$, or denotes an aromatic or heteroaromatic hydrocarbon radical, in which one H atom or a plurality of H atoms may be replaced by $OR^{14}$, $N(R^{14})(R^{15})$ or $R^{16}$, $R^{13}$ on each occurrence, independently of one another, denotes a straight-chain alkyl having 1-20 C atoms or branched alkyl chain having 3-20 C atoms, in which one —$CH_2$— group or a plurality of —$CH_2$— groups may be replaced by —O— or —C(=O)—, but two adjacent —$CH_2$— groups cannot be replaced by —O—, or denotes a hydrocarbon radical which contains a cycloalkyl having 3 to 10 C atoms or alkylcycloalkyl unit having 4 to 10 C atoms, and in which one —$CH_2$— group or a plurality of —$CH_2$— groups may be replaced by —O— or —C(=O)—, but two adjacent —$CH_2$— groups cannot be replaced by —O—, and in which one H atom or a plurality of H atoms may be replaced by $OR^{14}$, $N(R^{14})(R^{15})$ or $R^{16}$, or denotes an aromatic or heteroaromatic hydrocarbon radical, in which one H atom or a plurality of H atoms may be replaced by $OR^{14}$, $N(R^{14})(R^{15})$ or $R^{16}$, or can be 1,4-cyclohexylene of the following formula

in which one or more —$CH_2$— groups may be replaced by —O—, —CO— or —$NR^{14}$—, or an acetophenyl, isopropyl or 3-heptyl radical, $R^{14}$ on each occurrence, independently of one another, denotes a straight-chain alkyl having 1 to 10 C atoms or branched-chain alkyl having 3 to 10 C atoms or acyl group having 1 to 10 C atoms or an aromatic hydrocarbon or carboxyl radical having 6-12 C atoms, $R^{15}$ on each occurrence, independently of one another, denotes a straight-chain alkyl having 1 to 10 C atoms or branched-chain alkyl having 3 to 10 C atoms or acyl group having 1 to 10 C atoms or an aromatic hydrocarbon or carboxyl radical having 6-12 C atoms, $R^{16}$ on each occurrence, independently of one another, denotes a straight-chain alkyl having 1 to 10 C atoms or branched-chain alkyl group having 3 to 10 C atoms, in which one —$CH_2$— group or a plurality of —$CH_2$— groups may be replaced by —O— or —C(=O)—, but two adjacent —$CH_2$— groups cannot be replaced by —O—, with the provisos that, in the case where n=1, and —$[Z^{11}$—$]_r$—$[Z^{12}$—$]_s$=—O—, —(CO)—O—, —O—(CO)—, —O—(CO)—O—, —$NR^{14}$ or —$NR^{14}$—(CO)—,

does not denote straight-chain alkyl having 1 to 10 C atoms or branched-chain alkyl having 3 to 10 C atoms, also cycloalkyl having 3 to 10 C atoms, cycloalkylalkyl having 4 to 10 C atoms or alkylcycloalkyl having 1 to 10 C atoms, where in all these groups one or more —$CH_2$— groups may be replaced by —O— in such a way that no two O atoms in the molecule are bonded directly to one another, in the case where n=2,

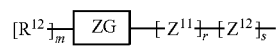

does not denote

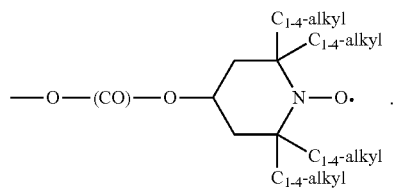

8. The medium according to claim 7, comprising one or more compounds of formula III

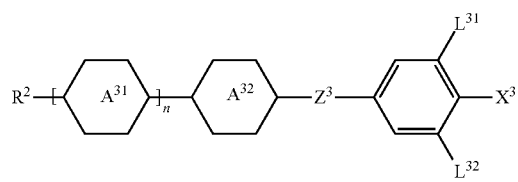

in which

R³ denotes alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,

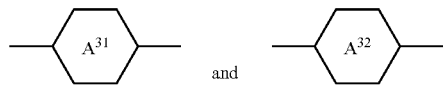

on each appearance, independently of one another, denote

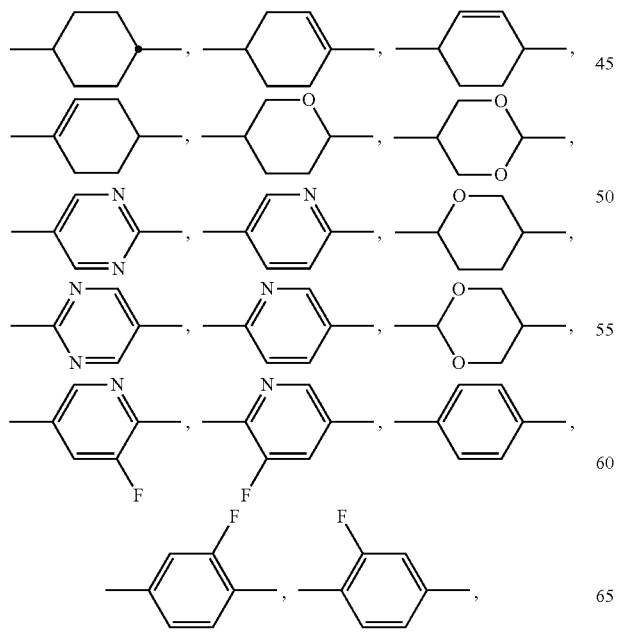

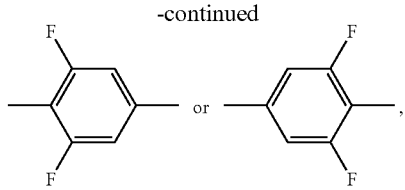

$L^{31}$ and $L^{32}$ independently of one another, denote H or F, $X^3$ denotes halogen, halogenated alkyl or alkoxy having 1 to 3 C atoms or halogenated alkenyl or alkenyloxy having 2 or 3 C atoms, $Z^3$ denotes —$CH_2CH_2$—, —$CF_2CF_2$—, —COO—, trans-CH=CH—, trans-CF=CF—, —$CH_2O$— or a single bond, and n denotes 0, 1, 2 or 3.

9. The medium according to claim 8, which comprises more than one compound of the formula II and one or more compounds of formula II-2.

10. The medium according to claim 8, which comprises more than one compound of the formula III.

11. The liquid-crystal medium according to claim 8, which additionally comprises one or more compounds of formula IV

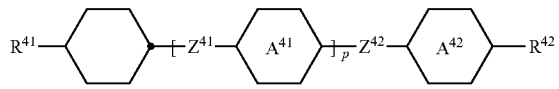

in which $R^{41}$ and $R^{42}$ independently of one another, denote alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms,

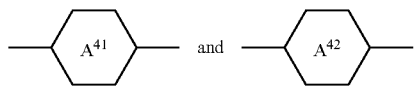

independently of one another and, if

occurs twice, also these independently of one another, denote

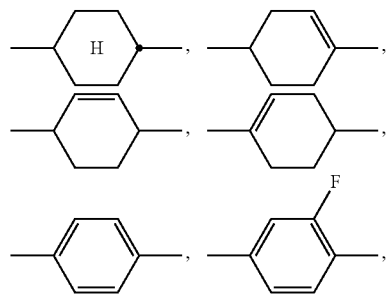

-continued

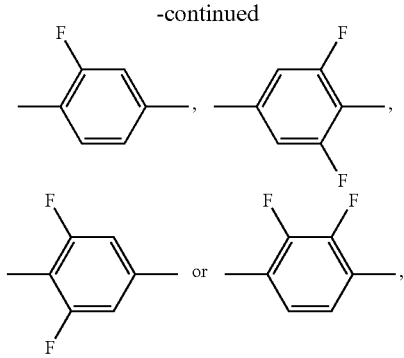

$Z^{41}$ and $Z^{42}$ independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

12. The liquid-crystal medium according to claim 8, wherein joint concentration of the compounds of formulae II and III within the liquid crystal medium ranges from 49% to 60% by weight based on the weight of the whole liquid crystal medium.

13. The medium according to claim 7, comprising one or more compounds of formula IV

IV

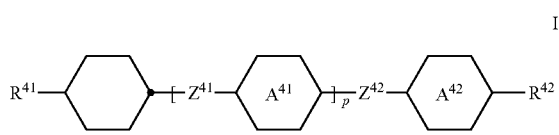

in which $R^{41}$ and $R^{42}$ independently of one another, denote alkyl, alkoxy, fluorinated alkyl or fluorinated alkoxy having 1 to 7 carbon atoms, or alkenyl, alkenyloxy, alkoxyalkyl or fluorinated alkenyl having 2 to 7 carbon atoms,

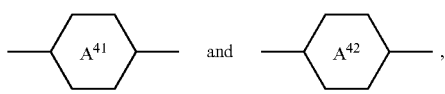

independently of one another and, if

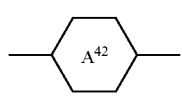

occurs twice, also these independently of one another, denote

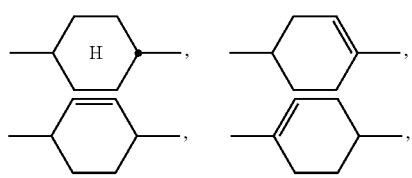

-continued

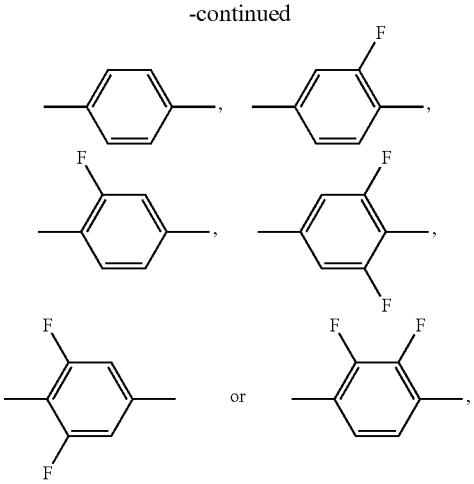

$Z^{41}$ and $Z^{42}$ independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

14. The medium according to claim 7, wherein the total concentration of the compounds of formula I and the compound of the following formula

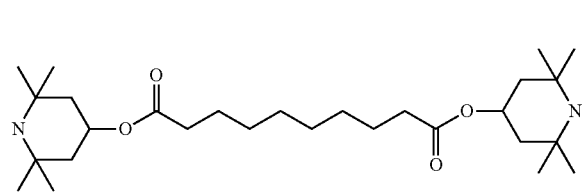 [SMILES: CC1(C)CC(OC(=O)CCCCCCCCC(=O)OC2CC(C)(C)NC(C)(C)C2)CC(C)(C)N1]

in the medium combined is in the range from 1 ppm to 2000 ppm.

15. The medium according to claim 7, wherein the compounds of the formula I are compounds selected from the group of the compounds of the formulae I-1 to I-9

I-1

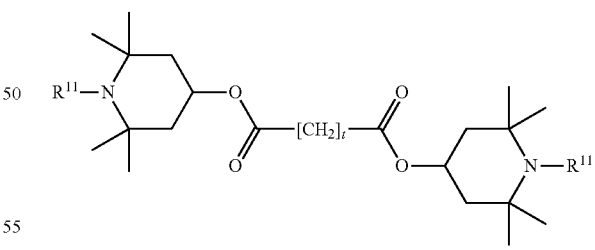

I-2

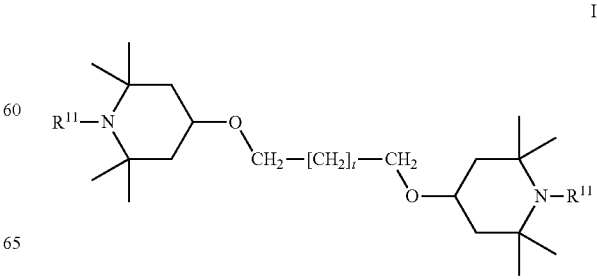

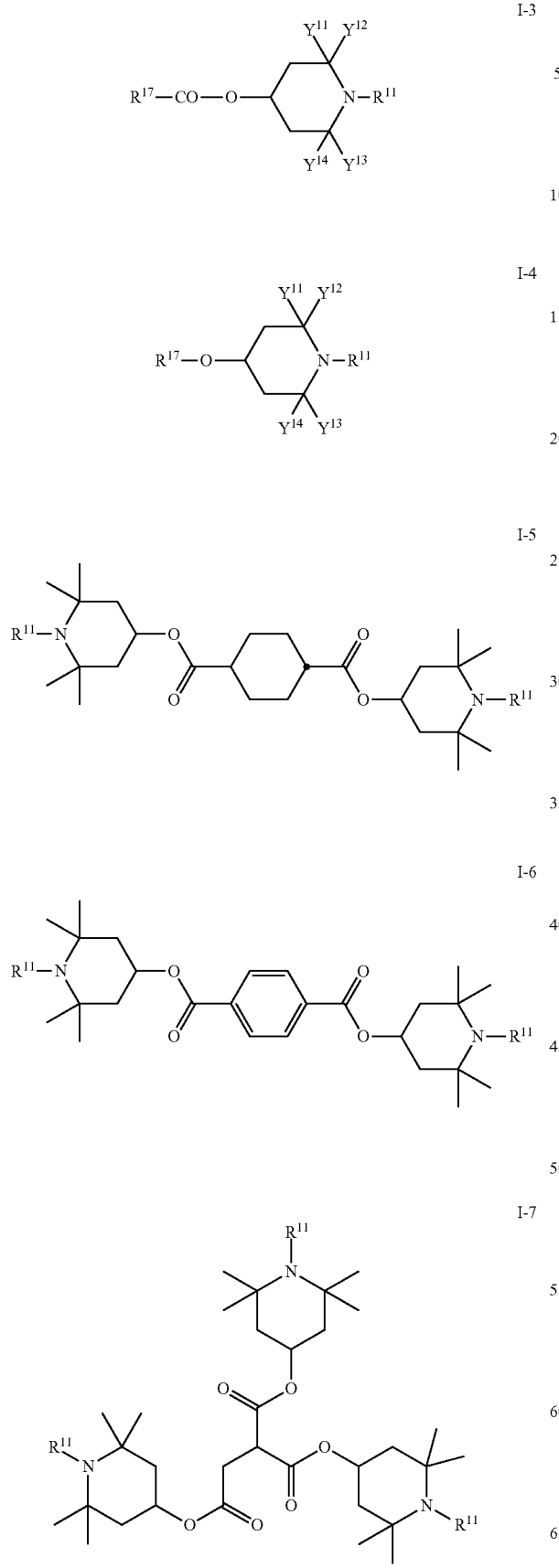

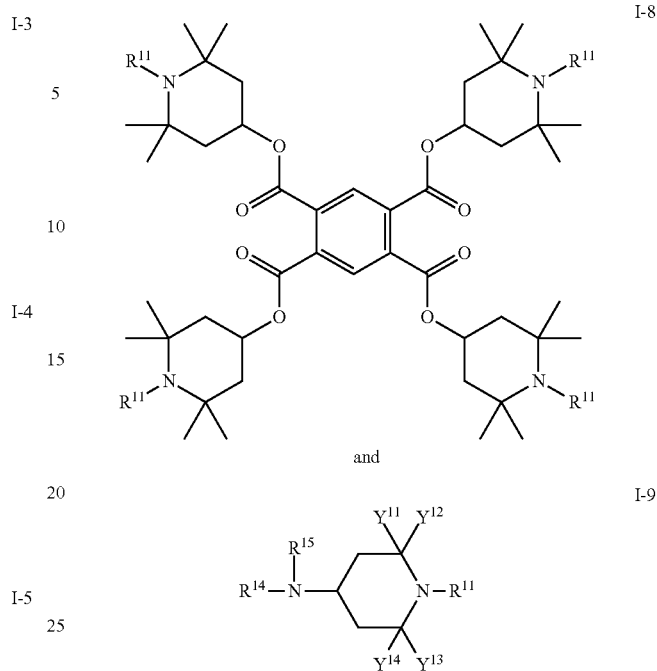

and

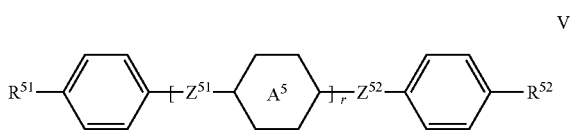

t denotes an integer from 1 to 12, $R^{17}$ denotes a straight-chain alkyl having 1 to 12 C atoms or branched alkyl chain having 3-12 C atoms, in which one —$CH_2$— group or a plurality of —$CH_2$— groups may be replaced by —O— or —C(=O)—, but two adjacent —$CH_2$— groups cannot be replaced by —O—, or denotes an aromatic or heteroaromatic hydrocarbon radical, in which one H atom or a plurality of H atoms may be replaced by $OR^{14}$, $N(R^{14})(R^{15})$ or $R^{16}$.

16. The medium according to claim 7, comprising one or more dielectrically neutral compounds of formula V $$R^{51}\!-\!\!\underset{}{\bigcirc}\!\!-\!\!\left[\!-Z^{51}\!-\!\!\underset{}{A^5}\!\!-\!\right]_r\!-Z^{52}\!-\!\!\underset{}{\bigcirc}\!\!-\!R^{52} \qquad V$$

in which $R^{51}$ and $R^{52}$ independently of one another, denote alkyl, alkoxy, fluorinated alkyl or fluorinated alkoxy having 1 to 7 carbon atoms, or alkenyl, alkenyloxy, alkoxyalkyl or fluorinated alkenyl having 2 to 7 carbon atoms,

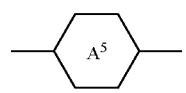

on each occurrence, independently of one another, denotes

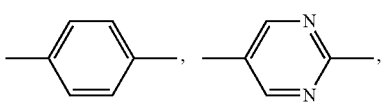

-continued

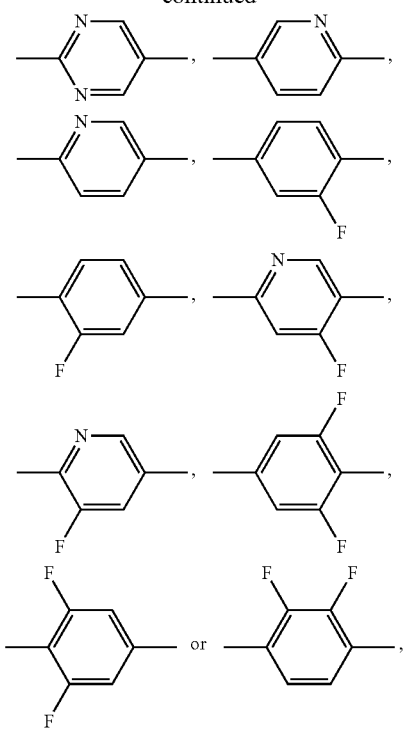

$Z^{51}$ and $Z^{52}$ independently of one another and, if $Z^{51}$ occurs twice, also these independently of one another, denote —$CH_2CH_2$—, —COO—, trans-CH=CH—, trans-CF=CF—, —$CH_2O$—, —$CF_2O$— or a single bond, and r denotes 0, 1 or 2.

17. A liquid-crystal display, containing the medium according to claim 7.

18. The display according to claim 17, which is addressed by an active matrix.

19. A method of using a medium according to claim 7, comprising operating said medium in a liquid-crystal display to generate an image in said display.

20. A process for the preparation of the medium according to claim 7, wherein the compound of the following formula

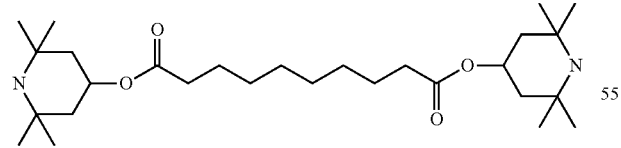

is mixed with one or more compounds of formula I, one or more compounds of formula II, one or more compounds of formula II-2 and with i) one or more compounds of formula III, ii) one or more compounds of formula IV, iii) one or more further mesogenic compounds, or iv) one or more additives or a combination thereof,

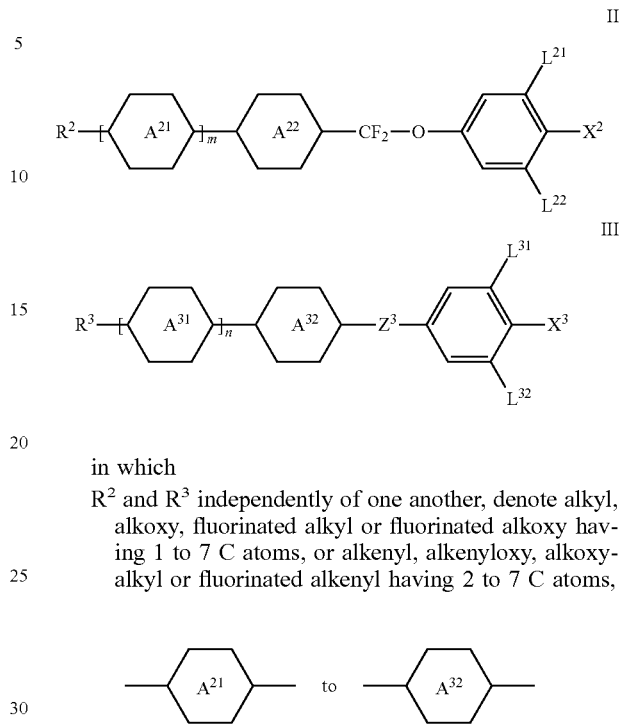

in which $R^2$ and $R^3$ independently of one another, denote alkyl, alkoxy, fluorinated alkyl or fluorinated alkoxy having 1 to 7 C atoms, or alkenyl, alkenyloxy, alkoxyalkyl or fluorinated alkenyl having 2 to 7 C atoms, on each appearance, independently of one another, denote

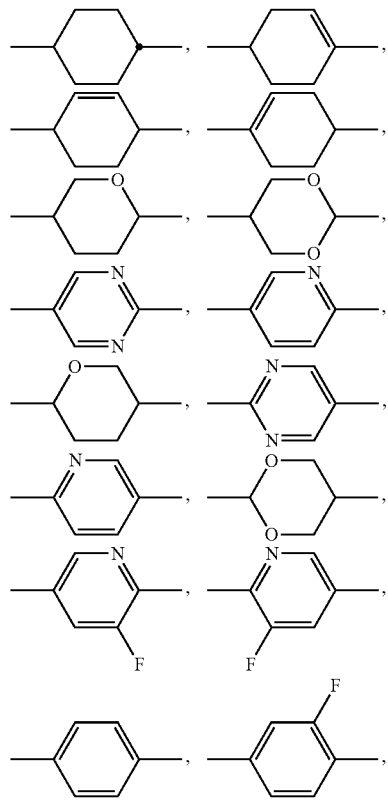

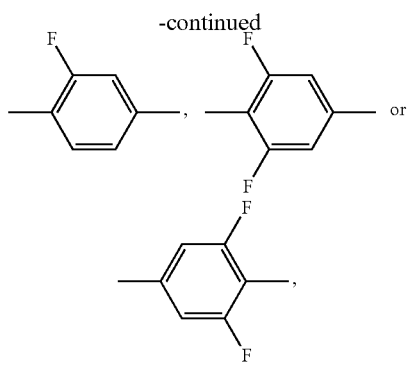

$L^{21}$, $L^{22}$, $L^{31}$ and $L^{32}$ independently of one another, denote H or F, $X^2$ and $X^3$ independently of one another, denote halogen, halogenated alkyl or alkoxy having 1 to 3 C atoms or halogenated alkenyl or alkenyloxy having 2 or 3 C atoms, $Z^3$ denotes —CH$_2$CH$_2$—, —CF$_2$CF$_2$—, —COO—, trans-CH=CH—, trans-CF=CF—, —CH$_2$O— or a single bond, and m and n independently of one another, denote 0, 1, 2 or 3,

IV

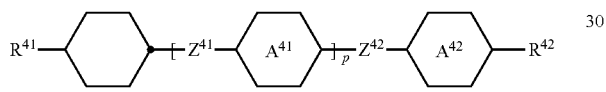

in which $R^{41}$ and $R^{42}$ independently of one another, denote alkyl, alkoxy, fluorinated alkyl or fluorinated alkoxy having 1 to 7 carbon atoms, or alkenyl, alkenyloxy, alkoxyalkyl or fluorinated alkenyl having 2 to 7 carbon atoms,

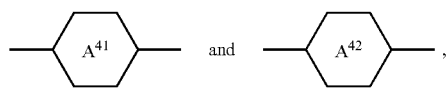

independently of one another and, if

occurs twice, also these independently of one another, denote

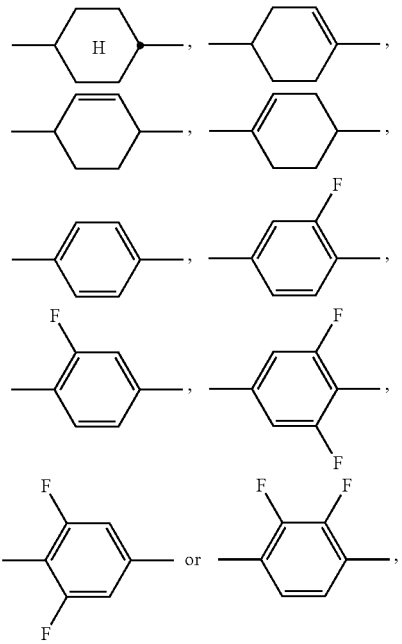

$Z^{41}$ and $Z^{42}$ independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

* * * * *